United States Patent [19]

Meckler

[11] Patent Number: 4,987,748
[45] Date of Patent: Jan. 29, 1991

[54] AIR CONDITIONING APPARATUS

[75] Inventor: Gershon Meckler, 1703 Channel Tower Dr., Monmouth Beach, N.J. 07750

[73] Assignees: Camp Dresser & McKee, Boston, Mass.; Gershon Meckler, Herndon, Va.; John C. Purdue, Toledo, Ohio

[21] Appl. No.: 304,938

[22] Filed: Feb. 2, 1989

Related U.S. Application Data

[63] Continuation of Ser. No. 49,260, May 12, 1987, abandoned, which is a continuation-in-part of Ser. No. 861,058, May 8, 1986, abandoned, which is a continuation-in-part of Ser. No. 841,454, Mar. 19, 1986, abandoned, which is a continuation-in-part of Ser. No. 732,561, May 9, 1985, abandoned, which is a continuation-in-part of Ser. No. 719,357, Apr. 3, 1985, abandoned.

[51] Int. Cl.$^5$ ............................................. F25D 17/08
[52] U.S. Cl. ...................................... 62/176.1; 62/271
[58] Field of Search ............. 62/93, 176.1, 271, 323.1; 98/38.7; 165/21; 236/49.4

[56] References Cited

U.S. PATENT DOCUMENTS

| | | | |
|---|---|---|---|
| 2,014,959 | 9/1935 | Anderegg | 165/21 |
| 2,287,268 | 6/1942 | Palmer | 62/176.1 X |
| 2,362,084 | 11/1944 | Miller | 62/323.1 X |
| 2,426,827 | 9/1947 | Hemming et al. | 165/21 |
| 3,102,399 | 9/1963 | Meckler | 62/332 |
| 3,247,679 | 4/1966 | Meckler | 62/271 |
| 3,401,530 | 9/1968 | Meckler | 62/93 X |
| 3,941,310 | 3/1976 | Travaglio et al. | 236/49 C |
| 3,951,205 | 4/1976 | Zilbermann | 98/38.7 X |

Primary Examiner—William E. Tapolcai
Attorney, Agent, or Firm—John C. Purdue; David C. Purdue

[57] ABSTRACT

Air conditioning apparatus is disclosed. The apparatus comprises compression refrigeration apparatus, a cogenerator operable to provide electricity and heat, an air handler, a plurality of mixing boxes operable to receive conditioned air, to cause a flow of recirculated air from a space to be conditioned, and to deliver to the space a mixture of conditioned air and recirculated air, a circulating system for circulating air to be conditioned through the air handle and then to the mixing boxes, a coil for heat transfer with air in the mixing boxes, and a sprinkler system through at least a part of which a heat transfer fluid is circulated to the coils. Preferred apparatus includes, in addition, at least one of absorption refrigeration apparatus and a dehumidifier which employs a desiccant, and means for using heat from the cogenerator as an energy source for the absorption refrigeration apparatus, for regeneration of the dehumidifier, or both.

Also disclosed is operation of the apparatus to produce air that has been dehumidified to a low moisture content, and controlling moisture content in the space by varying the rate at which that air is delivered, while controlling the temperature of the space by varying the rate at which heat is transferred from air circulated through the mixing box coils.

89 Claims, 37 Drawing Sheets

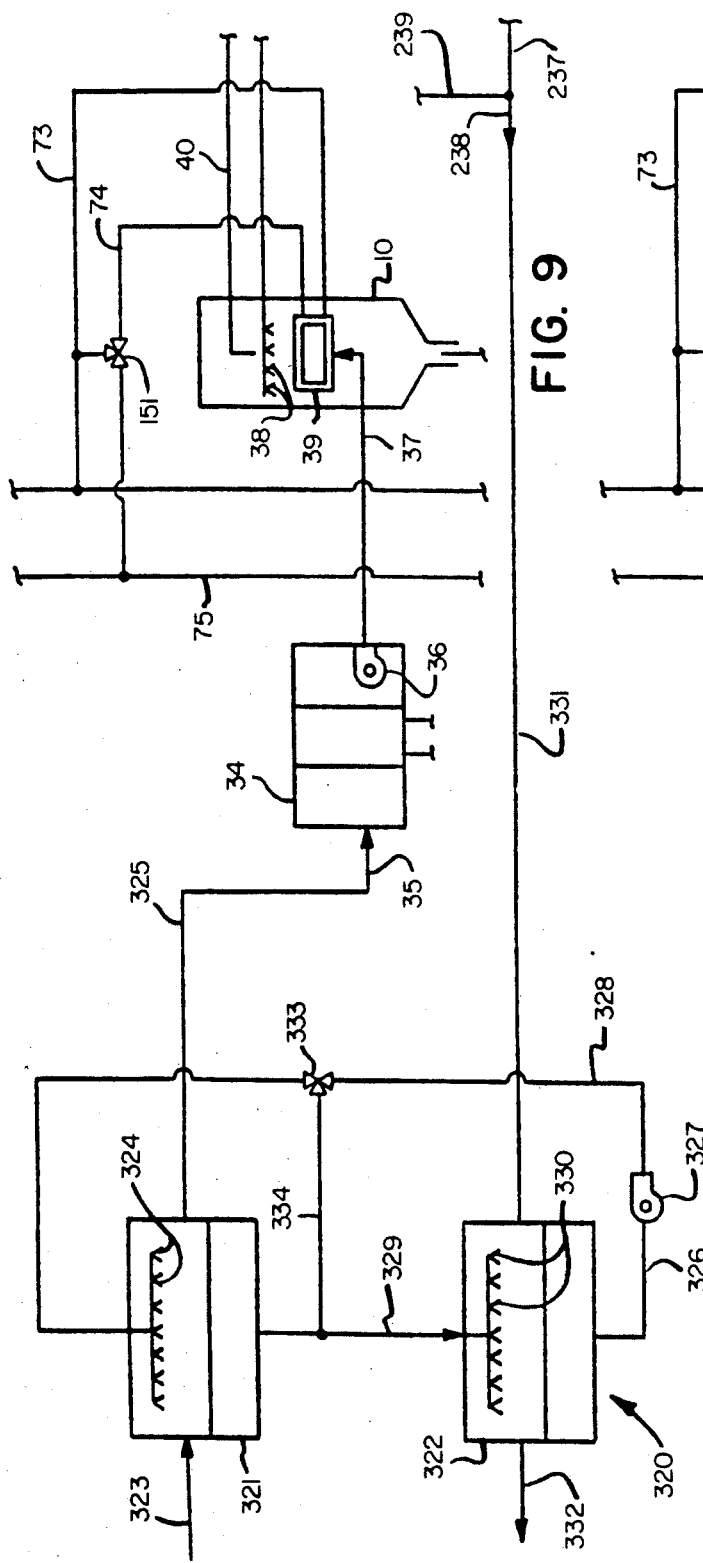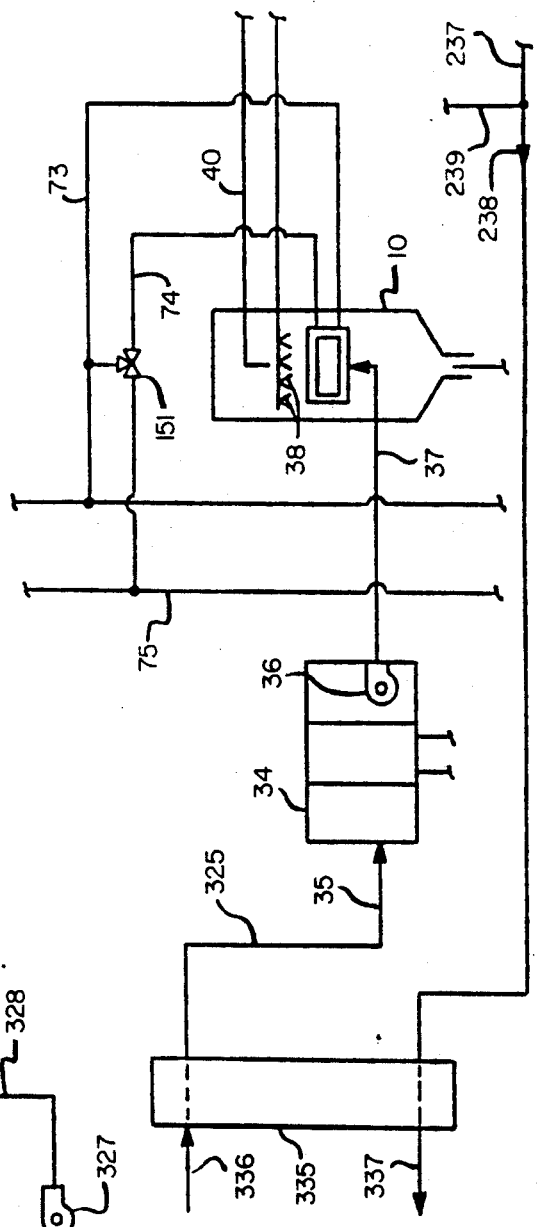
FIG. 9
FIG. 10

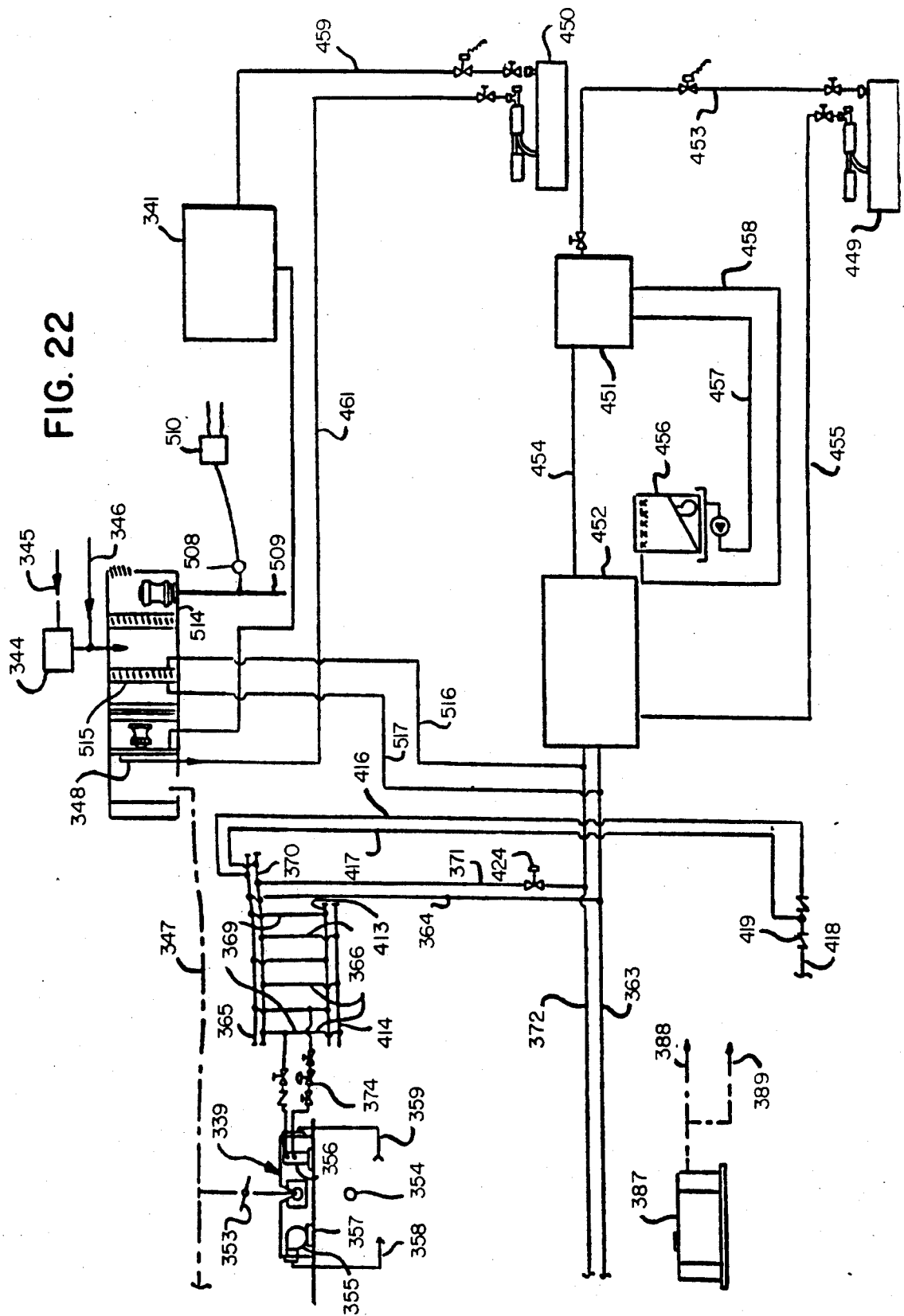

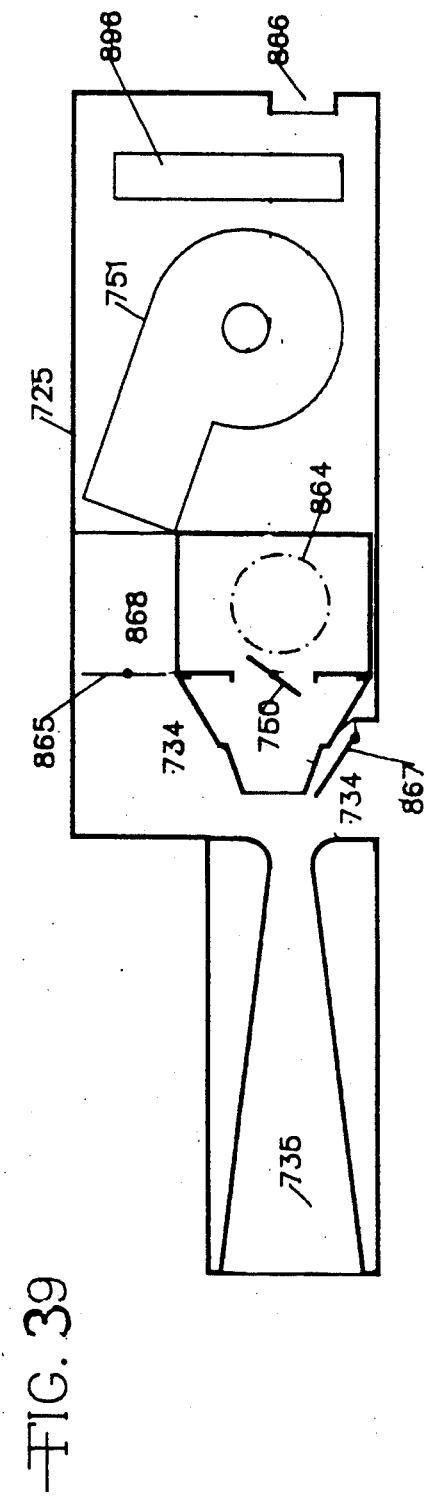
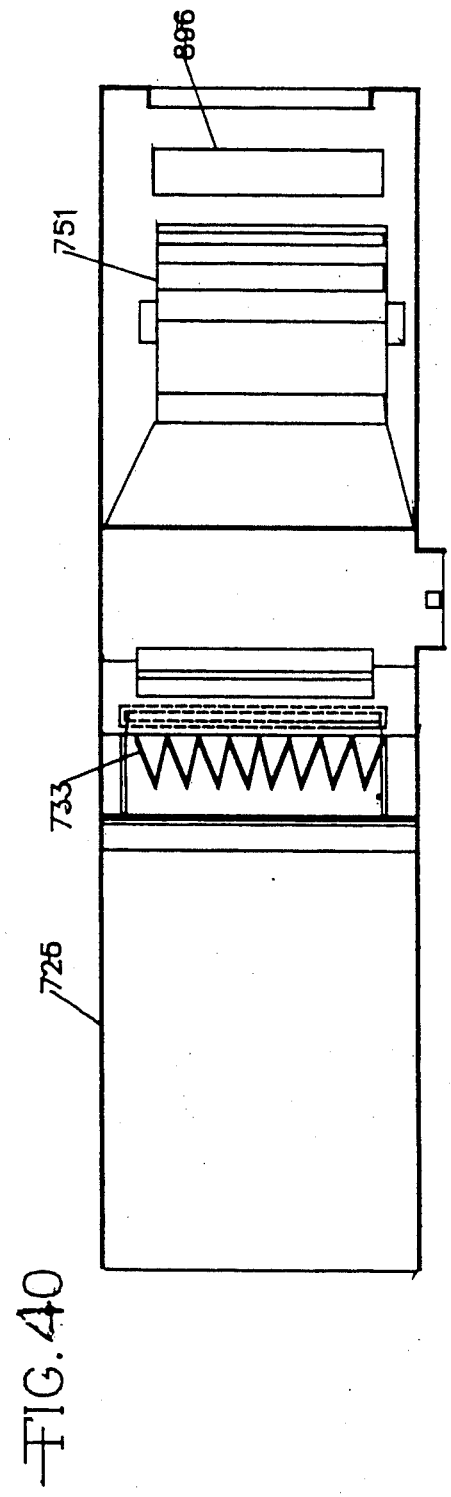
FIG. 39
FIG. 40

AIR CONDITIONING APPARATUS

REFERENCE TO RELATED APPLICATIONS

This is a continuation of application Ser. No. 07/049,260, filed May 12, 1987, now abandoned, as a continuation in part of application Ser. No. 861,058, filed May 8, 1986, now abandoned, it is also a continuation in part of application Ser. No. 841,454, filed Mar. 19, 1986, as a continuation in part of application Ser. No. 732,561, filed May 9, 1985, now abandoned, as a continuation in part of application Ser. No. 719,357, filed Apr. 3, 1985, now abandoned.

BACKGROUND OF THE INVENTION

1. Field of the Invention

This invention relates to air conditioning apparatus and to a method for operating that apparatus. The apparatus is admirably suited for a building which has a sprinkler system, an electrical grid, or both. Briefly, in one embodiment, the apparatus comprises an air handler, a plurality of induction-type mixing boxes, air circulating means, means for dehumidifying or for dehumidifying and cooling air circulated through the air handler, heat transfer means for carrying a part of the air conditioning load, cooling means for transferring heat from a heat transfer fluid, and a circulating system which preferably includes a part of the sprinkler system of the building for transferring heat from the heat transfer means to the cooling means. In another embodiment, the apparatus is a regenerator for an aqueous desiccant. In a third embodiment the apparatus is a sprinkler system, and in a fourth comprises compression and absorption refrigeration apparatus, a cogenerator, a dehumidifier, a regenerator for the dehumidifier, a storage tank, air circulating means and means for storing ice.

2. The Prior Art

Air conditioning apparatus for a building which has a sprinkler system, and which comprises an air handler, a plurality of induction-type mixing boxes, air circulating means, means for dehumidifying air circulated through the air handler, heat transfer means for carrying a part of the air conditioning load, cooling means for transferring heat from a heat transfer fluid, and a circulating system which includes a part of the sprinkler system of the building for transferring heat from the heat transfer means to the cooling means is suggested in "Westenhofer and Meckler", U.S. Pat. No. 4,826,667, 1981 (see, also, "Meckler", U.S. Pat. No. 4,033,740, 1977 and "Meckler (2)", U.S. Pat. No. 3,918,525, 1975). Such apparatus has been installed by The Social Security Administration in its Metro West Facility, Baltimore, MD, and in the Monroe County Court House, Stroudsburg, PA (see *Specifying Engineer,* January, 1986).

A variable air volume induction mixing box which induces room air to temper, or plenum air to reheat, primary, conditioned air is suggested in "Meckler (3)", U.S. Pat. No. 3,883,071, 1975.

The use of a cogenerator to produce both shaft work and heat has been suggested, for example by "McGrath", U.S. Pat. No. 2,242,588, 1941; "Miller", U.S. Pat. No. 2,284,914, 1942; "Meckler (4)", U.S. Pat. No. 3,247,679, 1966; "Meckler (5)", U.S. Pat. No. 3,401,530, 1968; and "Meckler (6)", U.S. Pat. No. 4,304,955, 1981.

Both Meckler (4) and Meckler (5) disclose apparatus which includes an internal combustion engine operatively connected to drive the compressor of compression refrigeration apparatus and means for conducting heat from the engine to regenerate a chemical desiccant.

McGrath discloses a "heating system" which includes two compressors, both driven by an internal combustion engine for pumping heat in two stages from ambient air to a building. The internal combustion engine also drives an electric generator and furnishes heat to the refrigerant of the heat pump. Heat is transferred to the refrigerant both from the exhaust gases of the internal combustion engine and from the cooling jacket thereof.

Miller discloses apparatus wherein the shaft of an internal combustion engine drives both an electric generator and the compressor of compression refrigeration apparatus. The apparatus also includes means for transferring exhaust heat from the internal combustion engine to the desiccant of a regenerator of a chemical dehumidifier to provide heat necessary for regeneration of the desiccant.

Meckler (6) discloses apparatus including an electric generator driven by an internal combustion engine and operation of the engine to supplement a solar collector, as required, to provide heat for the regeneration of a chemical desiccant; the electricity generated when the engine is operated provides energy for pumps, blowers and the like of an air conditioning system.

Apparatus which heats a house by pumping heat from low temperature water and produces ice for subsequent cooling is disclosed by "Schutt", U.S. Pat. No. 1,969,187, 1934.

Air conditioning apparatus in which a humidistat controls a humidified air valve is disclosed in British patent No. 1,077,372, 1967, "Ozonair".

BRIEF DESCRIPTION OF THE INVENTION

This invention relates to air conditioning apparatus which is admirably suited for a building having a sprinkler system, an electrical grid, or both. In one embodiment, the apparatus is designed to maintain a dry bulb temperature of X and a dew point of y in a conditioned space, and comprises an air handler, a plurality of induction-type mixing boxes, air circulating means, means for dehumidifying, cooling or both, air circulated through the air handler, heat transfer means for carrying a part of the air conditioning load, cooling means for transferring heat from a heat transfer fluid, and a circulating system which can include a part of the sprinkler system of the building for transferring heat from the heat transfer means to the cooling means. The means for dehumidifying, cooling or both, air circulated through the air handler is controlled so that the humidity of air leaving the air handler is sufficiently low that such air, at a given flow rate, can handle the maximum design humidity load, while the dry bulb temperature thereof is sufficiently high that, at such flow rate, that air has the capacity to handle not more than 60 percent of the maximum design sensible heat load. The cooling means is controlled to cool the heat transfer fluid to a temperature below X but above Y, and sufficiently low that the cooling means is operable to carry at least 40 percent of the maximum design sensible heat load, all that is not carried by the conditioned air circulated to the induction mixing boxes.

In another embodiment, the apparatus comprises compression refrigeration apparatus that is operable to make ice, absorption refrigeration apparatus, a cogenerator operable to provide electricity and heat, means for operably connecting the cogenerator to provide electricity to the electrical grid of the building, an air handler, a plurality of induction mixing boxes operable to receive conditioned air, to cause a flow of recirculated air from a space to be conditioned, and to deliver to the space a mixture of conditioned air and recirculated air, means for circulating air to be conditioned through the air handler and then to the induction mixing boxes, means for transferring heat from air in the air handler to ice which has been produced by the compression refrigeration apparatus, means operatively connecting the absorption refrigeration apparatus to pump heat to a heat sink from air in the induction mixing boxes or from air in the air handler, and means for transferring heat generated by the cogenerator into energizing relationship with the absorption apparatus.

In a preferred embodiment, the aparatus described in the preceding paragraph additionally includes a dehumidifier which uses an aqueous solution of a desiccant to remove moisture from air to be dehumidified, a regenerator for the aqueous desiccant solution, a tank for storing a quantity of the aqueous desiccant solution, and means for circulating air to be conditioned into dehumidifying relationship with the aqueous desiccant solution of the dehumidifier and then to the air handler. The compression refrigeration apparatus and the absorption refrigeration apparatus can be operatively connected to pump heat to a heat sink from dehumidified air in the air handler before it is circulated to the space. The apparatus can also include means for transferring heat in the air handler from air to ice which has been produced by the compression refrigeration apparatus. The apparatus is operated so that the last-named means transfers heat from dehumidified air from which heat has already been pumped by the compression refrigeration apparatus and by the absorption refrigeration apparatus, and lowers both the wet bulb and the dry bulb temperature of the air. Additionally, to compensate for decreases in the concentration of the aqueous desiccant solution in the dehumidifier which occur as dehumidification proceeds, the apparatus includes means for circulating desiccant solution between the storage tank and the dehumidifier and, to compensate for decreases in the concentration of the aqueous desiccant solution in the storage tank which occur as dehumidification proceeds, the apparatus includes means for circulating desiccant solution between the storage tank and the regenerator. The compression refrigeration apparatus is operatively connected to the building electrical grid for energization thereby. Finally, the apparatus comprises means for transferring heat generated by the cogenerator to the aqueous desiccant solution to enable the removal of water therefrom in the regenerator, and means for transferring heat generated by the cogenerator into energizing relationship with the absorption refrigeration apparatus.

The invention also includes a method for operating the apparatus described in the two preceding paragraphs. The method involves alternately circulating air to be dehumidified and cooled by the apparatus, and then interrupting the circulation of air to be conditioned. While air is being circulated to be conditioned, for example on summer-day cycle, the cogenerator is operated to provide electricity and heat, the former being introduced into the electrical grid of the building while the latter is transferred to energize the absorption refrigeration apparatus; electricity from the building grid is used to energize the compression refrigeration apparatus and heat is transferred from air in the air handler to ice which has been produced by the compression refrigeration apparatus. While the production of conditioned air is interrupted, for example on summer-night cycle, the concentration of the aqueous desiccant solution of the storage tank is increased while the cogenerator is operated to provide electricity and heat. The electricity is introduced into the electrical grid of the building, while the heat is transferred to the aqueous desiccant solution to enable the removal of water therefrom in the regenerator. Electricity is conducted from the building grid to energize the compression refrigeration apparatus to make ice by pumping heat from water to a heat sink.

The invention also includes a sprinkler through at least a part of which a heat transfer fluid is circulated between a heat transfer device of the HVAC system of the building and a device for transferring heat to or from the fluid. The sprinkler comprises two grids, each of which includes opposed headers, spaced conduits, and sprinkler heads at spaced intervals in the conduits. Each of the conduits is operably connected to at least one of the headers. Each header of the first grid is closely adjacent a header of the second grid. The sprinkler heads of the two grids are spaced from one another in a required pattern for a single area of the building.

BRIEF DESCRIPTION OF THE DRAWINGS

FIG. 9 is a fragmentary view showing a part of the apparatus of FIGS. 1 and 2 and a first stage dehumidifier that is advantageously used with the FIG. 1 and 2 apparatus and other apparatus under some operating conditions.

FIG. 10 is a fragmentary view similar to FIG. 9 showing a part of the apparatus of FIGS. 1 and 2 and a different first stage dehumidifier that is advantageously used with the apparatus of FIGS. 1 and 2 and with other apparatus under some operating conditions.

FIG. 22 is a schematic diagram of apparatus similar to that of FIG. 15 which additionally includes an induction mixing box that increases the energy efficiency of the apparatus.

FIG. 39 is a schematic diagram in elevation showing details of one of the induction mixing boxes of the apparatus of FIG. 29.

FIG. 40 is a schematic diagram in plan showing further details of the induction mixing box of FIG. 39.

DESCRIPTION OF PREFERRED EMBODIMENTS

Figure 1:
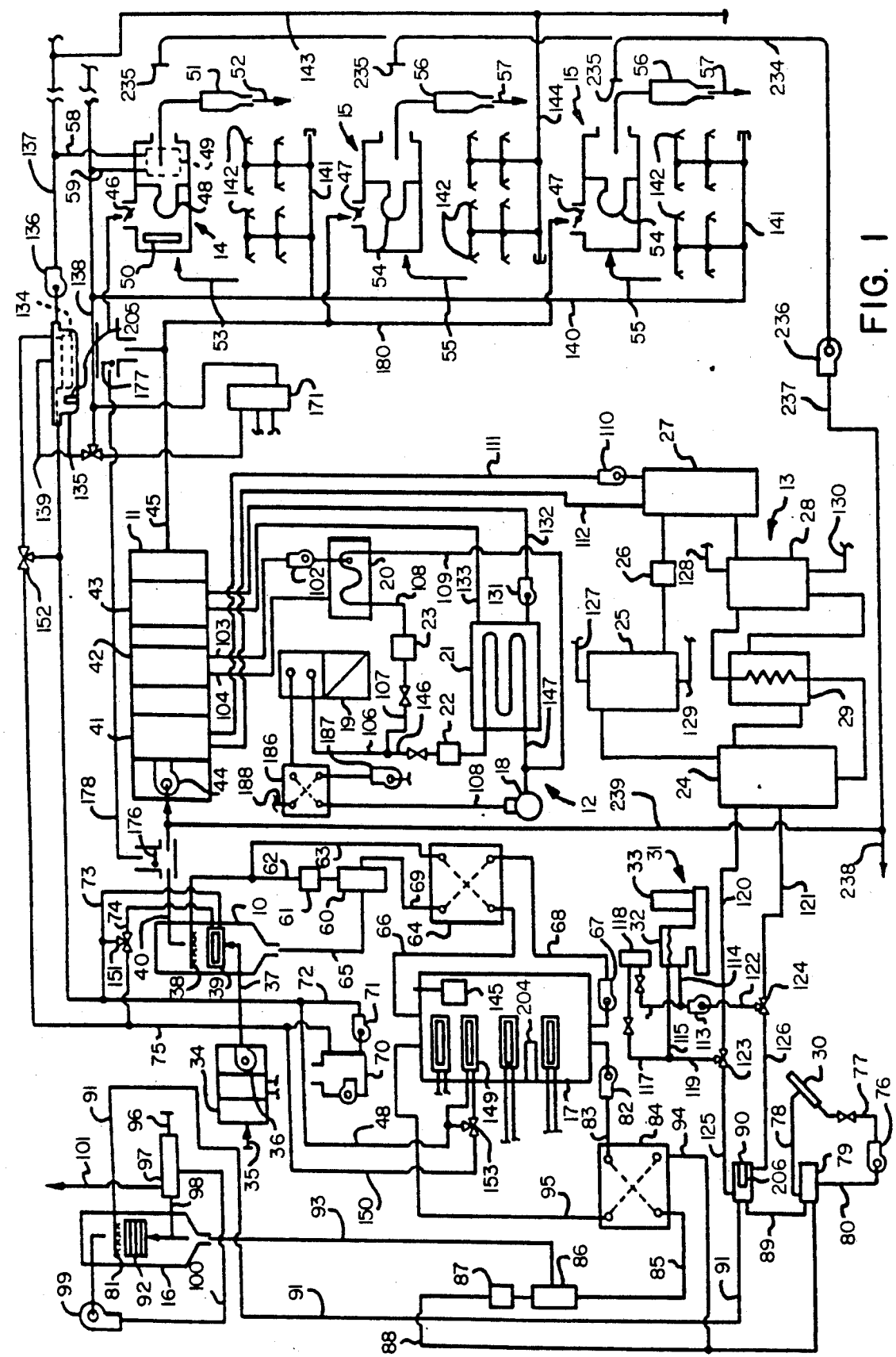
FIG. 1 is a schematic diagram of apparatus according to the instant invention, showing the connections among the components of the apparatus that are used on summer cycle.
Figure 2:
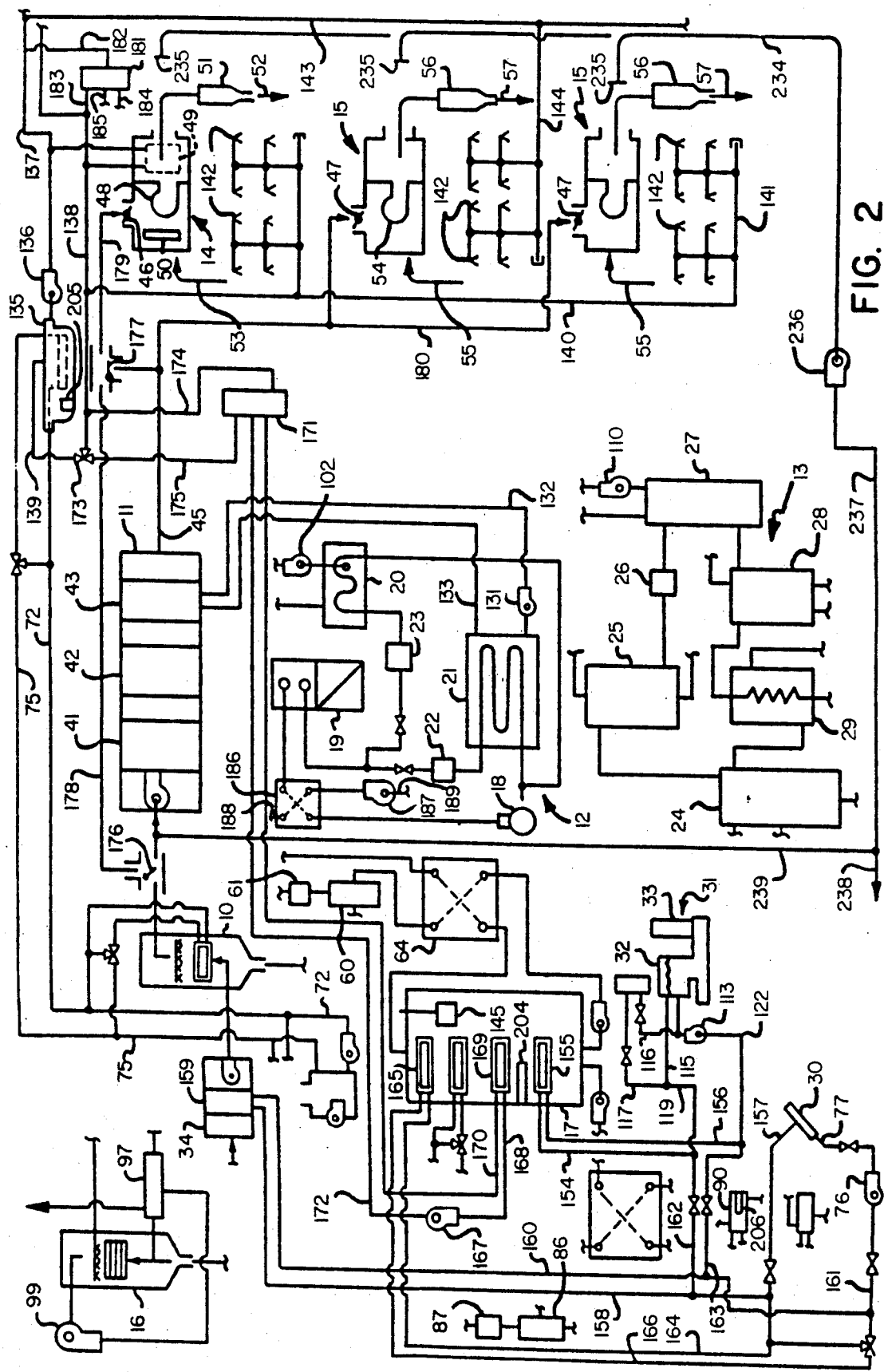
FIG. 2 is a schematic diagram of the apparatus of FIG. 1, but showing the connections among the various components of the apparatus that are used on winter cycle.

Preferred apparatus according to the invention is shown in FIG. 1 connected for operation on summer cycle and in FIG. 2 connected for operation on winter cycle.

The apparatus of FIGS. 1 and 2 comprises an air conditioner 10, an air handler 11 served by compression and absorption refrigeration apparatus indicated generally at 12 and 13, respectively, a plurality of induction mixing boxes (one is indicated generally at 14) for perimeter zones, and a plurality of induction mixing boxes (two are indicated generally at 15) for interior zones.

The conditioner 10 is a dehumidifier in summer operation and a humidifier in winter operation. It is associated with a regenerator 16, a storage tank 17 and heat exchangers, pumps and sumps as subsequently described in more detail.

The compression refrigeration apparatus 12 comprises a compressor 18, an evaporative condenser 19, evaporators 20 and 21 and expanders 22 and 23.

The absorption refrigeration apparatus 13 comprises a generator 24, a condenser 25, an expander 26, an evaporator 27, an absorber 28 and a heat exchanger 29.

The apparatus also comprises a solar collector 30 and a cogenerator indicated generally at 31, and comprising a diesel engine 32 and an operatively associated electric generator 33.

SUMMMER OPERATION OF THE APPARATUS OF FIGS. 1 AND 2

Day Cycle

Referring to FIG. 1, on summer operation, day cycle, ambient air enters the apparatus through a preheater 34 as indicated by an arrow 35, and is discharged by a blower 36, flowing therefrom through a line 37 and into the conditioner 10 where it is dehumidified by contact with a lithium chloride solution which is discharged from sprays 38 over a contactor 39. Heat of sorption is removed from the contactor 39 by cooling tower water circulated therethrough as subsequently described in more detail.

Dehumidified air flows from the conditioner 10 through a line 40 to the air handler 11 where it is cooled and dehumidified by contact with coils 41, 42 and 43, to which chilled water is circulated as subsequently explained in more detail. A blower 44 receives dehumidified air from the line 40, discharging into the air handler 11 from which cooled and dehumidified air flows into a duct 45 and ultimately is delivered to the induction mixing boxes 14 and 15 at a rate which depends upon the instantaneous setting of dampers 46 and 47 in the indcution mixing boxes 14 and 15, respectively.

Each of the induction mixing boxes 14 includes a constant speed fan 48 and a unitary heat pump having an element 49 which acts as a condenser on cooling cycle and as an evaporator on heating cycle, and a heat exchange coil 50. The fan 48 delivers air at a constant rate through a diffuser 51, as indicated by an arrow 52, the constant rate being substantially greater than the maximum at which conditioned air from the duct 45 enters the induction mixing box 14. As a consequence, the blower 48 induces a substantial flow of recirculated air from the space being conditioned, as indicated by an arrow 53, so that it is a mixture of recirculated air and conditioned air which is returned to the space from the diffuser 51.

The induction mixing boxes 15 are similar to the induction mixing boxes 14, including blowers 54 which induce a flow of recirculated air, as indicated by arrows 55, for mixture with conditioned air from the duct 45 and delivery therewith from diffusers 56 as indicated by arrows 57.

When the load on the space served by any one of the induction mixing boxes 14 is moderate, the heat pump in that induction mixing box is not energized, and a control temperature is maintained by adjusting the position of the damper 46 to cause the flow of primary conditioned air to vary between the minimum required for ventilation, say, 0.12 cubic foot of air per minute per square foot of floor space served by the induction mixing box 14, and a maximum when the damper 46 is in its fully opened position. Whenever the maximum flow of conditioned air from the duct 45 is insufficient to compensate for heat gains to the space served by one of the induction mixing boxes 14, the heat pump thereof is energized to pump heat from the coil 50 to the element 49. The coil 50 is positioned so that recirculated air from the space flows in heat transfer relation therewith; as a consequence, the recirculated air is cooled to, say, 64° F. (18° C.). The temperature of the mixture of recirculated and primary conditioned air delivered to the space from the diffuser 51 is lowered correspondingly; the heat pump is operated as necessary to maintain the set temperature. The recirculated air from the space has a dew point of about 57° F. (14° C.); accordingly, cooling that air to 64° F. (18° C.) does not cause dehumidification. Heat is removed from the element 49 by water circulated through lines 58 and 59, as subsequently explained in more detail. When the minimum ventilation air from the duct 45 causes excessive cooling of the space served by one of the induction mixing boxes 14, the heat pump is energized to pump heat to the coil 50 from the element 49 and water circulated through the lines 58 and 59.

The induction mixing boxes 15 deliver a mixture of conditioned air and recirculated air to maintain space temperature, the proportions in which conditioned air and recirculated air are combined to produce the mixture that is so-delivered depending upon the settings of the dampers 47.

A hygroscopic solution, preferably aqueous lithium chloride, is circulated from a sump 60 by a pump 61 through a line 62 to the sprays 38 and through a line 63 to a heat exchanger 64. The hygroscopic liquid from the sprays 38 flows over the contactor 39, dehumidifying air circulated through the conditioner 10 as previously described, and then flows from the bottom of the conditioner 10 through a line 65 back to the sump 60. Hygroscopic liquid from the line 63 flows through one side of the heat exchanger 64 and a line 66 to the storage tank 17, while a pump 67 circulates hygroscopic liquid from the storage tank 17 through a line 68, the other side of the heat exchanger 64 and a line 69 to the sump 60. The rates of flow to and from the sump 60 are correlated to maintain a constant liquid level therein. Heat of sorption is transferred to water circulated from a cooling tower 70 by a pump 71 through a line 72, a line 73, the contactor 39 and lines 74 and 75 back to the cooling tower 70.

As is subsequently explained in more detail, the storage tank 17, at the beginnning of summer-day cycle operation, can contain an aqueous 42 to 44 percent by weight solution of lithium chloride. As operation proceeds during the course of the day the solution in the tank 17 is gradually diluted by moisture removed from air in the conditioner 10. The lithium chloride concentration may be as low as 37 to 39 percent by weight at the end of a day of operation.

The solar collector 30 is operatively connected so that it can be used, whenever there is enough solar energy available, as a heat source for the regeneration of lithium chloride solution in the tank 17. This is done by operating a pump 76 to circulate water through a line 77, the solar collector 30, a line 78, a heat exchanger 79 and a line 80 back to the pump 76, while also circulating lithium chloride solution to be regenerated through the heat exchanger 79 and then to sprays 81 in the regenerator 16. When the solar collector 30 is being used to supply heat for lithium chloride solution regeneration, a pump 82 causes the lithium chloride solution to flow from the tank 17 through a line 83, one side of a heat exchanger 84 and a line 85 to a sump 86. A pump 87 causes lithium chloride solution to flow from the sump 86 through a line 88 to the heat exchanger 79 and from thence through a line 89, a heat exchanger 90 and a line 91 to the sprays 81. Lithium chloride solution discharged from the sprays 81 flows over a contactor 92 and from the bottom of the regenerator 16 through a line 93 to the sump 86. A portion of the lithium chloride solution flowing through the line 88 is diverted to a line 94 from which it flows through the heat exchanger 84 and a line 95 back to the storage tank 17.

Lithium chloride solution flowing over the contactor 92 in the regenerator 16 is in contact with air which flows through a line 96, a heat exchanger 97 and a line 98 into the regenerator 16, from which it is withdrawn by a blower 99; air discharged from the blower 99 flows through a line 100 and the heat exchanger 97 into a line 101 from which it is vented.

The conditions of air entering the air handler 11 from the line 40 depend upon the temperature that water circulated through the contactor 39 of the conditioner 10 is able to maintain and the concentration of the lithium chloride solution in the sump 60. For example, if the contactor 39 is able to remove enough heat of sorption that air leaves the conditioner 10 at 95° F. (35° C.), that air will contain 50 to 55 grains of water per pound of dry air when the solution in the sump 60 contains 44 percent by weight of lithium chloride, 65 to 70 grains of moisture per pound of dry air when the solution contains 37 percent by weight of lithium chloride.

In the air handler 11, dehumidified air from the line 40 is cooled by contact with the coil 41, cooled or cooled and dehumidified by contact with the coil 42 and cooled and dehumidified by contact with the coil 43. Heat is removed from the coil 42 by chilled water at, say, 58° F. (14° C.) circulated from the evaporator 20 of the compression refrigeration apparatus 12 by a pump 102 through a line 103, the coil 42 and, through a line 104, back to the evaporator 20. Refrigerant in the apparatus 12 is circulated from the compressor 18 through a line 105, the evaporative condenser 19, a line 106, a line 107, the expansion device 23, a line 108, the evaporator 20 and a line 109 back to the compressor 18. Air from which heat is removed by the coil 42 has previously given up heat to the coil 41, from which heat is removed by chilled water at, say, 58° F. (14° C.) circulated from the evaporator 27 of the absorption refrigeration apparatus 13 by a pump 110 through a line 111, the coil 41 and a line 112 back to the evaporator 27. The coils 41 and 42 supplement one another. For example, these coils can be designed, at maximum design load, to cool air circulated thereover from 95° F. (35° C.) to 72° F. (22° C.) and from 72° F. (22° C.) to 58° F. (14° C.), respectively. When the load is below the maximum, air from the line 40 and air leaving the coil 41 will be at lower temperatures; therefore, the compression refrigeration apparatus will operate less, and require less electrical energy to maintain an exit temperature of 58° F. (14° C.) from the coil 42.

The diesel engine 32 is operated to drive the generator 33, electricity from the latter being delivered to the building electrical grid and heat from the former being used to supply energy to the generator 24 of the absorption refrigeration apparatus 13. Heat is transferred from the diesel engine 32 to the generator 24 by a circulating system which includes a pump 113, the flow being through a line 114, through the water jacket of the diesel engine 32, through a line 115 and, in parallel through a line 116, a heat exchanger 118 through which exhaust gases from the diesel engine 32 are circulated and through a line 117; the flow from both of the lines 115 and 117 is through lines 119 and 120, the generator 24 and lines 121 and 122 back to the pump 113. Valves 123 and 124 prevent the flow of water through lines 125 and 126 to and from the heat exchanger 90.

Heat is removed from the condenser 25 and the absorber 28 of the refrigeration apparatus 13 by water circulated thereto from the cooling tower 70 or another cooling tower (not illustrated) through lines 127 and 128, respectively, and then back to the cooling tower through lines 129 and 130. Heat is removed from the coil 43 of the air handler 11 by water at, say, 34° F. (1° C.). The chilled water is circulated from the evaporator 21, which serves as an ice storage tank, as is subsequently explained in more detail, by a pump 131 flowing through a line 132, the coil 43 and a line 133 back to the evaporator 21. Air circulated in contact with the coil 43 is cooled and dehumidified, leaving the coil 43 at a dry bulb temperature of, say, 43° F. (6° C.) and containing substantially 40 grains of moisture per pound of dry air. This air enters the duct 45 for delivery to the induction mixing boxes 14 and 15.

Water from the cooling tower 70 is circulated through the line 72 to a heat exchanger 134 in a loop storage tank 135 and then through the line 75 back to the cooling tower 70. Water from the loop storage tank 135 is circulated by a pump 136 through a line 137, through the lines 58, the elements 49, the lines 59 and return lines 138 and 139 back to the loop storage tank 135. The lines 137 and 138 are a part of the building sprinkler system, the latter being connected to a supply header 140 through which sprinkler water can flow to supply lines 141 to serve sprinkler heads 142. The line 137 is connected to a header 143 through which water can be circulated to lines 144 (one being shown in FIG. 1) and additional sprinkler heads 142 or, for air conditioning purposes, to remove heat from condensers of compression refrigeration apparatus (not illustrated) if ever added to the induction mixing boxes 15 to enable the air conditioning system to accommodate increased interior loads.

Night Cycle

On night cycle, still referring to FIG. 1, the building is not being air conditioned; air does not enter the preheater 34; the conditioner 10, the air handler 11, the induction mixing boxes 14 and 15 and the absorption apparatus 13 are all idle.

The cogenerator 31 is operated to provide electricity for the compression refrigeration apparatus 12 and heat for the regeneration of lithium chloride solution from the storage tank 17. The valves 123 and 124 are set to direct hot water from the diesel engine 32 through the line 125 into the heat exchanger 90 and to return water from the heat exchanger 90 through the line 126, the line 122, the pump 113 and the line 114 to the diesel engine 32.

The pumps 82 and 87 and the blower 99 are operated. As a consequence, air is drawn into the regenerator 16 by the blower 99, and lithium chloride solution is circulated as previously described from the tank 17 through the heat exchanger 84 to the sump 86, from the sump 86 through the heat exchangers 79 and 90 to the sprays 81 in the regenerator 16, from the regenerator 16 to the sump 86, and from the sump 86 through the heat exchanger 84 and back to the storage tank 17. As a consequence of heat transferred thereto in the heat exchanger 90, and of the flow of air through the regenerator 16 caused by operation of the blower 99, the lithium chloride solution discharged from the sprays 81 is regenerated by the removal of water therefrom, and the lithium chloride solution returned to the storage tank 17 is of a higher concentration than that removed therefrom so that, as regeneration progresses, the volume of lithium chloride solution in the storage tank 17 decreases progressively. The apparatus also includes a float controller 145 with operable connections (not illustrated) to deenergize the pump 87 when the float controller 145 reaches a level which indicates that regeneration of the lithium chloride solution to, say, 42 to 44 percent by weight has been completed. After the pump 87 is deenergized, heat from the cogenerator 31 can be used to energize the absorption refrigeration apparatus 13 and the blower 44 can be energized to circulate air through the air handler 11 to be cooled by contact with the coil 41. In this mode of operation, the air circulated by the blower 44 is withdrawn from the space as subsequently explained in detail.

While the cogenerator 31 is operating to regenerate the lithium chloride solution in the storage tank 17, as just described, electricity from the generator 33 is used to energize the compression refrigeration apparatus 12. The compressor 18 operates to compress refrigerant and to circulate the compressed refrigerant through the line 105 to the evaporative condenser 19 and then to the line 106; from the line 106, however, the refrigerant circulates through a line 146 to the expander 22, through the evaporator 21 and then through a line 147 back to the compressor 18. The evaporator 21 is an ice maker in which water is frozen for use the next day to provide chilled water which is circulated through the coil 43 of the air handler 11, as previously described.

After regeneration of the lithium chloride solution in the storage tank 17 has been completed, as previously described, it is often advantageous to remove heat from the stored, concentrated solution therein. This can be accomplished by operating the cooling tower 70 and the pump 71 to circulate cooling tower water through the line 72 to a line 148, through a heat exchanger 149 in the storage tank 17, and from thence through a line 150 back to the line 75 and the cooling tower 70. The apparatus includes valves 151 and 152 to prevent the circulation of cooling tower water through the contactor 39 of the dehumidifier 10 and through the heat exchanger 134 of the loop storage tank 135 in this mode of operation. The apparatus also includes a valve 153 to prevent the circulation of cooling tower water through the heat exchanger 149 in the storage tank 17 in other modes of operation.

WINTER OPERATION OF THE APPARATUS OF FIGS. 1 AND 2

Day Cycle

Referring to FIG. 2, on winter operation, day cycle, the diesel engine 32 operates, electricity generated being delivered to the building electrical grid, while hot water from the line 119 flows through a line 154, a heat exchanger 155 in the storage tank 17 and a line 156 back to the line 122 and the pump 113. When sufficient solar energy is available, water can be circulated by the pump 76 through the line 77, the solar collector 30, lines 157 and 158, a coil 159 in the preheater 34, and lines 160 and 161 back to the pump 76; this circulation can preheat ambient air entering the system to, say, 90° F. (32° C.). When there is insufficient solar energy, hot water from the line 119 flows through a line 162, the line 158, the coil 159, the line 160 and a line 163 back to the line 122 to preheat the ambient air. When there is excess solar energy, water from the solar collector 30 can be circulated to the coil 159 as described and, in addition, from the line 157 through a line 164, a coil 165 in the storage tank 17, and a line 166 back to the line 161.

Heat is transferred from the storage tank 17 by a circulating system which includes a pump 167, a line 168, a heat exchanger 169 in the storage tank 17, a line 170, a heat exchanger 171, and a line 172. A valve 173 is set to prevent the flow of water from the line 138 to the line 139, forcing a flow through a line 174, the heat exchanger 171, a line 175 and the valve 173 to the line 139. As a consequence, heat is transferred from the storage tank 17 to water which is circulated by the pump 136 through the elements 49 of the induction mixing boxes 14. The heat pumps of the induction mixing boxes 14 are energized, as required, to pump heat from the elements 49 to the coils 50 and to recirculated air from the space to maintain the set space temperature.

On summer cycle, as previously described, all of the air leaving the conditioner 10 flows through the air handler 11 because, as shown in FIG. 1, dampers 176 and 177 are set to prevent the flow of air therearound through a by-pass duct 178. On winter cycle, as shown in FIG. 2, the damper 176 is in an intermediate position so that air flows from the line 40 both through the air handler 11 and through the by-pass duct 178. Air from the by-pass duct 178 flows through a line 179 to the induction mixing boxes 14, while air from the air handler 11 flows through the line 45 and a line 180 to the induction mixing boxes 15. The damper 177 prevents the flow of air from the line 45 to the line 179. The interior zones served by the induction mixing boxes 15 require heat removal even on winter cycle. Accordingly, chilled water is circulated to the coil 43 from the evaporator 21 (which is serving as ice storage) to maintain the air delivered to the line 45 at about 43° F. (6° C.); the dampers 47 vary the rate at which this air is delivered to the induction mixing boxes 15 to maintain space temperature in the interior zones.

Heat can also be added to water circulated in the lines 137 and 138 by a heat exchanger 181 connected therebetween by lines 182 and 183 by circulating heated water from the solar collector 30 to the heat exchanger and back through lines (not illustrated) and inlet and return lines 184 and 185 of the heat exchanger 181.

Night Cycle

The cogenerator 31 is operated, generating both electricity and heat. The former is delivered to the building electrical grid to power the fans 48 (which operate on demand), the pumps 113 and 136, the compressor 18 of the refrigeration apparatus 12, and the heat pumps of the induction mixing boxes 14, if required.

When heating is required by the perimeter space served by any of the induction mixing boxes 14, the fan 48 and the heat pump of that induction mixing box 14 are operated so that air is circulated and heat is pumped to the circulated air to maintain a night temperature of, say, 58° F. (14° C.).

Heat from the cogenerator 31 is circulated to the heat exchanger 155 for storage in the tank 17 until the maximum permissible temperature or the maximum temperature required for operation the next day is achieved.

The refrigeration apparatus 12 is operated as it is on summer-night cycle to make ice, which will be used as required the next day to provide chilled water for the coil 43, as described.

The refrigeration apparatus 12 also includes a heat exchanger 186 through which refrigerant flows on its way to the evaporative condenser 19. On winter-night cycle cooling water is circulated by a pump 187 through the heat exchanger 186 to a line 188 and from thence through lines (not illustrated) to the heat exchanger 181 and back to a line 189 and the pump 187, so that heat is added to the water circulated in the lines 137 and 138. As is subsequently explained in more detail, there may often be more heat available in the heat exchanger 186 (acting as a condenser) than is required to compensate for heat losses on winter-night cycle from the building served by the air conditioning system of the instant invention. If this is the case, the pump 187 can be operated intermittently, as required to maintain a control temperature of, say, 90° F. (32° C.) in the water leaving the heat exchanger 181 in the line 185. The evaporative condenser 19 is then operated, as required, to remove excess heat from the refrigerant circulated to the evaporator 21.

The Mixing Induction Boxes 14

Figure 4:
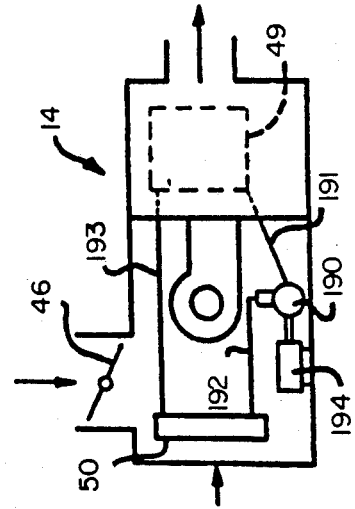
FIG. 4 is an enlarged view of an induction mixing box which is a part of the apparatus of FIGS. 1 and 2.

The induction mixing boxes 14 have been described as having unitary heat pumps including an element 49 which acts as a condenser on cooling cycle and as an evaporator on heating cycle, and a heat exchange coil 50. The unitary heat pumps are commercially available, and comprise many components in addition to the elements 49 and the coils 50, including, as shown in FIG. 4, compressors 190, lines 191, 192 and 193, and motors 194 which drive the compressors 190. Refrigerant from the compressors 190 flows in one direction when heat is being pumped to the coils 50, and in the opposite direction when heat is being pumped from the coils 50. The motors 194 are electrically connected to the building electrical grid in a conventional manner (not illustrated), and are energized as required by a temperature sensor and controller (not illustrated) which also actuates the dampers 46. Primary control of temperature in a zone served by one of the induction mixing boxes 14 is achieved by modulation of the damper 46 between a position where the flow of conditioned air from the duct 45 on summer cycle (FIG. 1) or from the duct 178 on winter cycle (FIG. 2) is the minimum required for ventilation and a fully open position. Whenever the minimum ventilation air more than compensates for heat gains or losses in a zone, at least one of the unitary heat pumps is energized to pump heat to on summer cycle or from on winter cycle the coil or coils 50. Whenever the maximum flow of conditioned air (with the damper or dampers 46 in a full open position) is insufficient to compensate for heat gains or losses, at least one of the unitary heat pumps is energized to pump heat from or to the coil or coils 50 serving that zone.

The Sprinkler System

As has been indicated above, the circulating system which includes the pump 136 and the lines 137 and 138 (FIGS. 1 and 2) is a part of the sprinkler system of the building in which the apparatus is installed. In ordinary operation, when the circulating system is being used for air conditioning purposes, makeup water is introduced into the line 137 from a line 195 (FIG. 3), flowing through an orifice 196 and a constant pressure regulating valve 197, as required, to maintain a constant pressure at a point 198 in the line 137. In this mode of operation, a valve 199 is open, while valves 200 and 201 in lines 202 and 203, respectively, are closed. However, whenever one of the sprinkler heads 142 opens there is a substantial flow of water therefrom and from the circulating system; as a consequence, a substantial flow of water from the line 195, through the orifice 196 and the constant pressure valve 197, is necessary to maintain the preset pressure at the point 198 and, because of the substantial flow therethrough, there is a relatively large pressure drop across the orifice 196. The circulating system includes means (not illustrated) to sense this pressure drop, to close the valve 199, to open one or both of the valves 200 and 201, to deenergize the pump 136 in the circulating system that is affected, and to sound an alarm. The lines 202 and 203 are connected to a supply (not illustrated) of water for fire purposes so that opening of one or both of the valves 200 and 201 puts the circulating system in "fire mode".

Figure 3:
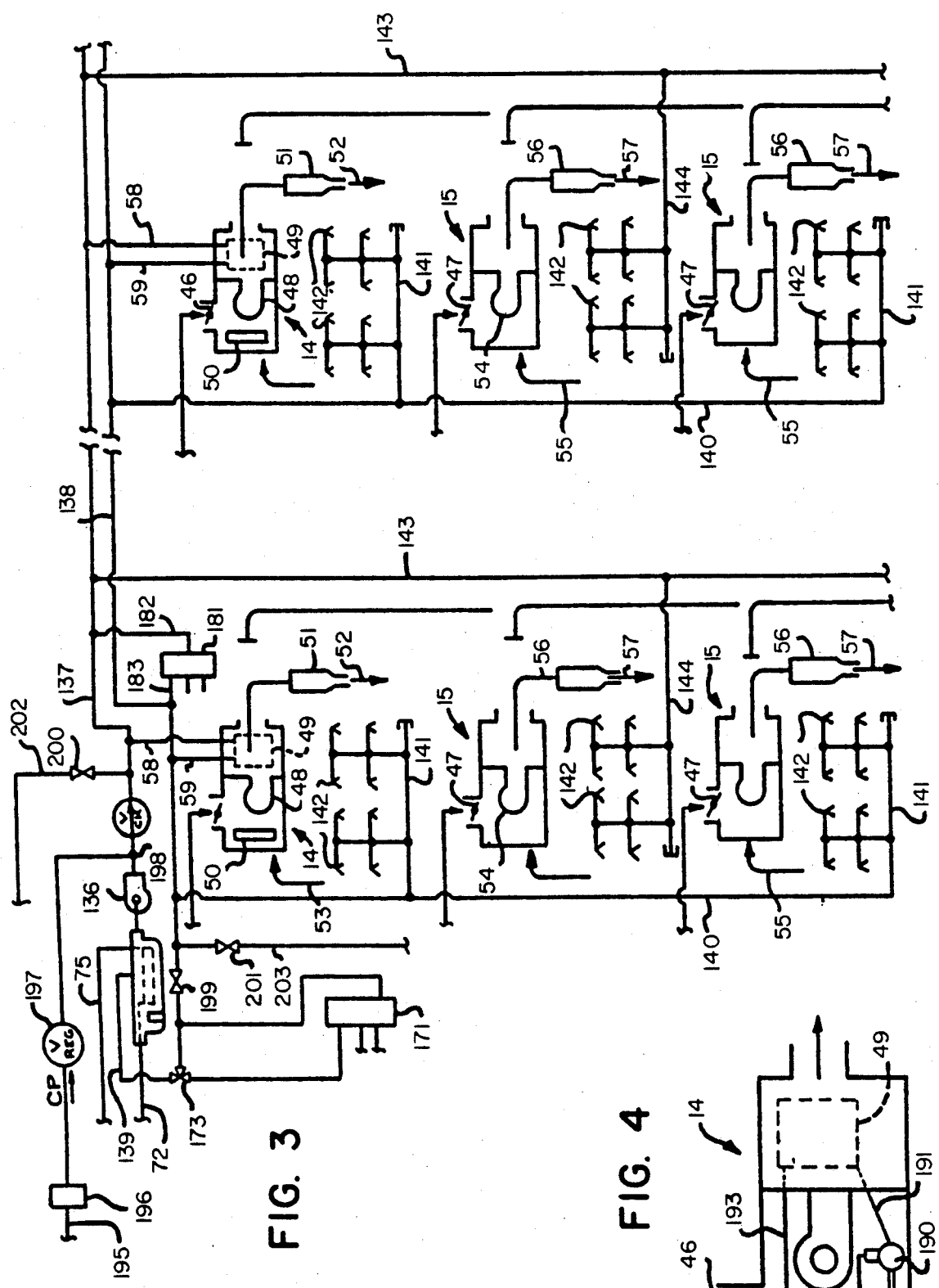
FIG. 3 is a schematic diagram showing a part of the piping of the apparatus of FIGS. 1 and 2 and the connections which enable that part of the piping to operate as a sprinkler system in the event of a fire.

It will be appreciated that a large building will include many circulating systems of the type shown in FIG. 3, and that each such system may include more or fewer than the two induction mixing boxes 14 and the four induction mixing boxes 15 shown in FIG. 3.

It is often desired to increase the air conditioning load therein after a building has been in service, for example, because it is decided to increase the amount of electronic equipment used in the building. The apparatus of the instant invention can readily be retrofitted to accommodate such an increased load. For example, compression refrigeration apparatus (not illustrated) can be added to the induction mixing boxes 15 to pump heat from recirculated air before it is mixed with primary, conditioned air and the condenser of the apparatus can be connected to the circulating system, for example, between the supply header 140 and 144. Similarly, the unitary heat pumps of the induction mixing boxes 14 can be oversized to accommodate a future increase in load or the induction mixing boxes 14 can be retrofitted with unitary heat pumps of increased capacity, as required.

As has been indicated above, on winter-night cycle, heat from the heat exchanger 186 (FIG. 2) is transferred to water circulated in the lines 137 and 138. The cogenerator 31 provides about 1 btu of usable heat per btu of electricity; 1 btu of electricity in the compressor 18 of the refrigeration apparatus 12 will make about 2 btu's of heat available in the heat exchanger 186.

On winter-day cycle, about one btu of heat will be required to heat outside air in the preheater 34 per btu of heat that must be introduced, to compensate for skin losses, into the circulating system which includes the pumps 136 and the lines 137 and 138. It has been found to be feasible to store in the tank 17 about one-half of the requirements of the system for heat; as a consequence, the available heat from the cogenerator 31 must equal approximately one-half of the total heat requirements of the apparatus, or must equal either the heat required to compensate for skin losses or the heat required in the preheater 34.

As has been indicated above, fresh air is not introduced into the system on winter-night cycle; as a consequence, the heat requirements at night are approximately one-half those during the day. Accordingly, on winter-night cycle approximately twice as much heat is available in the heat exchanger 186 as is required to be transferred in the heat exchangers 171 to the circulating system which includes the pumps 136 and the lines 137 and 138. As a consequence, as previously stated, it is usually necessary to operate the evaporative condenser 19 on winter-night cycle.

There are electric resistance heaters 204, 205 and 206 (FIGS. 1 and 2) in the storage tank 17, in the loop storage tank 135 and in the heat exchanger 90, respectively. On winter-night cycle, off peak electricity can be used to energize the heaters 204 and 205 to supplement heat from the cogenerator 31, or electricity from the cogenerator 31, should there be an excess, can be so used. Similarly, on summer-night cycle, off-peak electricity can be used to energize the heater 206 to supplement heat from the cogenerator 31 or in the place thereof, or excess electricity from the cogenerator 31, should there be any, can be so used. Similarly, off-peak electricity can be used to energize the resistance heaters 204, 205 and 206, as described, and the energy so introduced into the system can be supplemented by solar energy from the collector 30, when available. Indeed, when the heaters 204, 205 and 206 are so used, the apparatus of FIGS. 1 and 2 can be modified by elimination of the absorption refrigeration apparatus 13 and of the cogenerator 31. Apparatus shown in FIGS. 6 and 7 is a modification of that of FIGS. 1 and 2 where the absorption apparatus 13 and the cogenerator 31 have been omitted.

Figure 6:
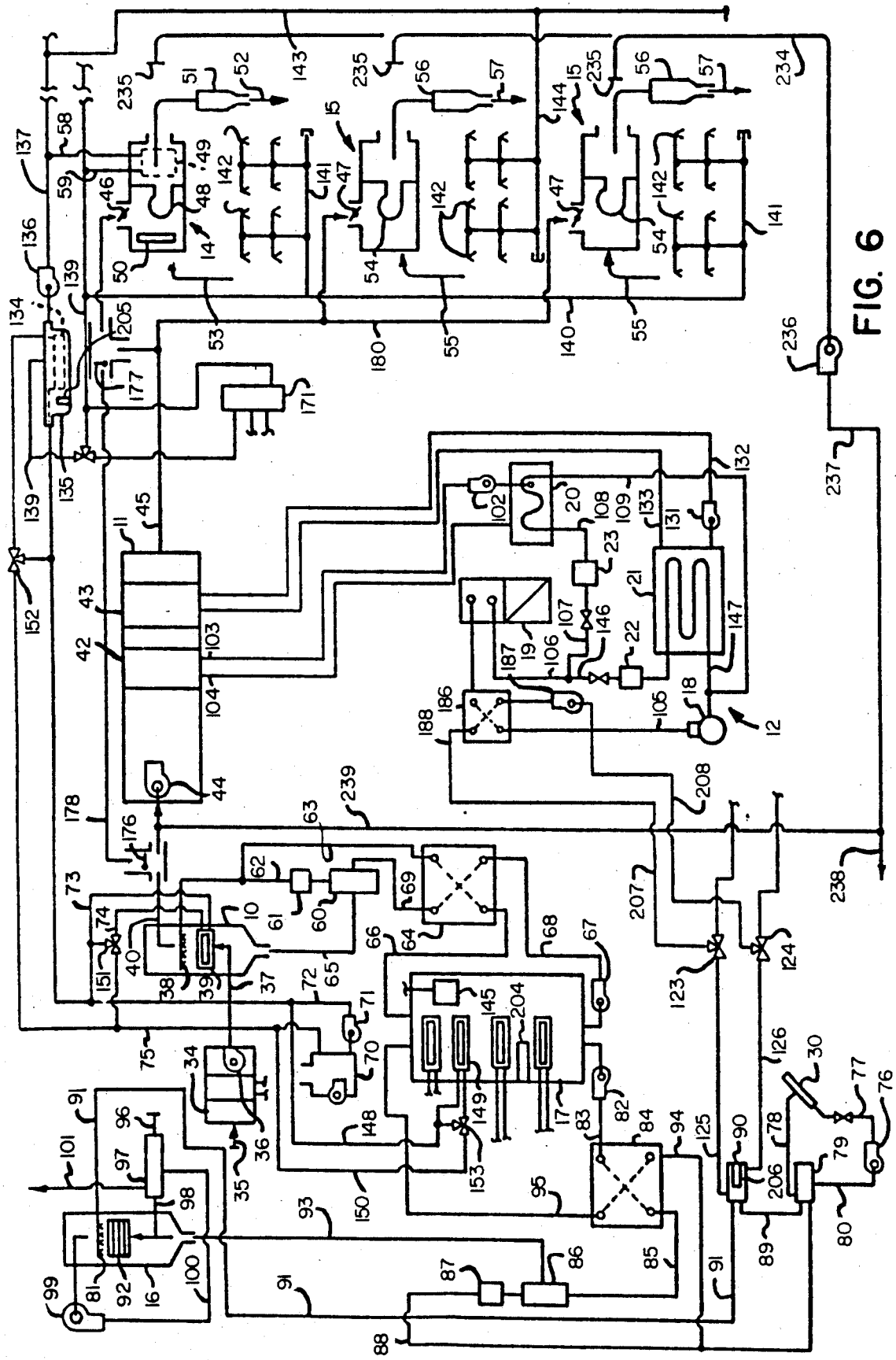
FIG. 6 is a schematic diagram of apparatus according to the instant invention that is similar to the FIG. 1 apparatus, but simplified in the sense that there are fewer components; the connections shown in FIG. 6 are those used on summer cycle.
Figure 7:
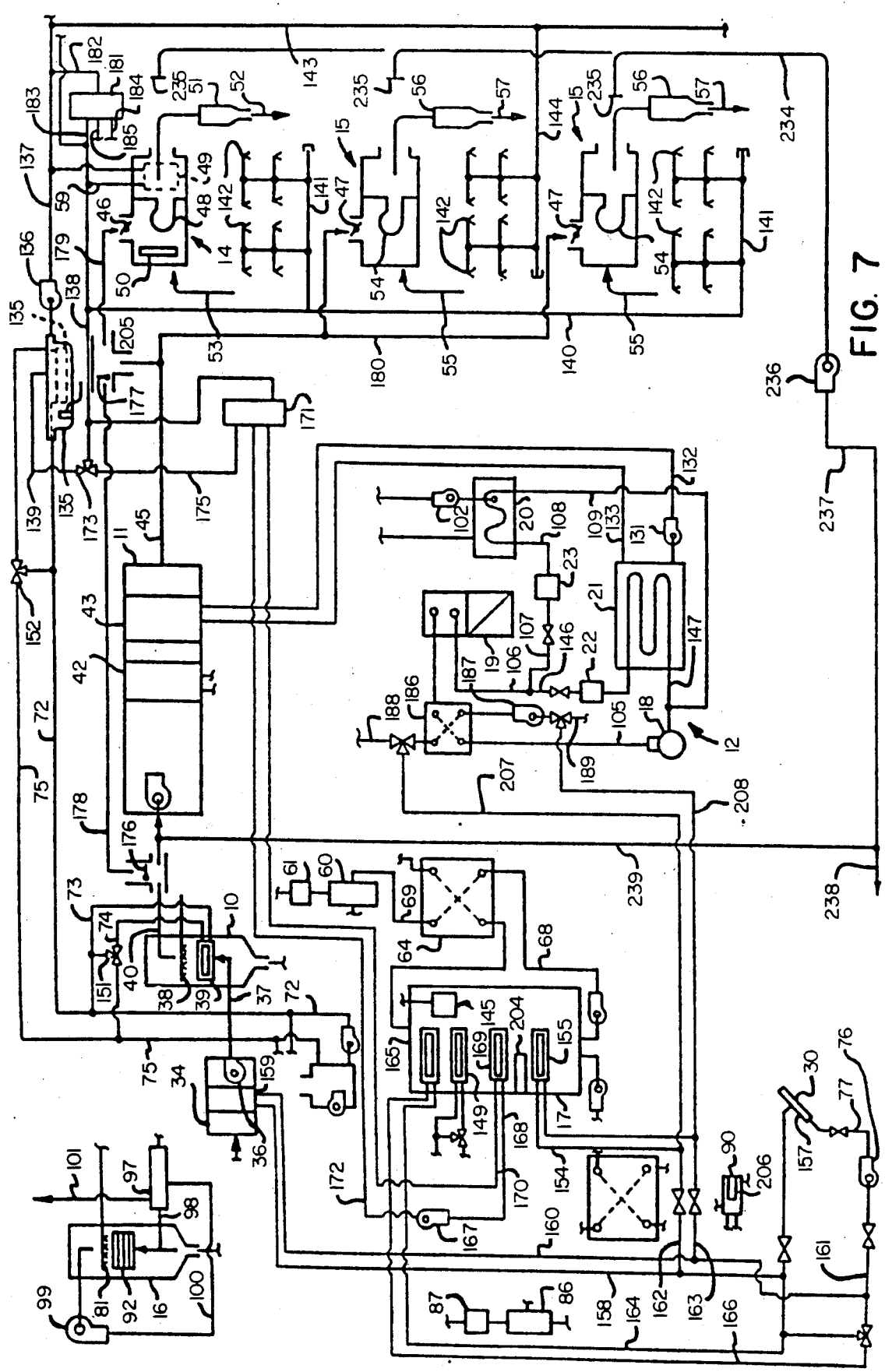
FIG. 7 is a schematic diagram of the apparatus of FIG. 6, but showing the connections among the various components that are used on winter cycle.

On summer-day cycle, referring to FIG. 6, the conditioner 10 operates as previously described, drawing desiccant solution from the storage tank 17, as required, and delivering dehumidified air to the air handler 11. The coils 42 and 43 are used as described above to remove sensible heat and moisture from the air circulated therethrough. Heat from the solar collector 30, when available, can be used as previously described to regenerate desiccant from the storage tank 17.

On summer-night cycle, the refrigeration apparatus 12 is operated as previously described to make ice, using off-peak electricity from a utility for power, while water circulated by the pump 187 through the heat exchanger 186 flows through the pipe 188, a pipe 207, the valve 123 and the pipe 125 to the heat exchanger 90, and from thence through the line 126, the valve 124, a line 208 and the line 189 back to the pump 187. Desiccant is circulated as previously described for regeneration, the necessary heat being transferred thereto in the heat exchanger 90, coming, ultimately, from the compressor 18.

On winter-night cycle (see FIG. 7), as previously described, the refrigeration apparatus 12 is operated to make ice, while heat therefrom is transferred to the heat exchanger 181, as required Off-peak electricity from a utility is used. The excess heat from the compressor 18, however, can be stored in the tank 17, being transferred to hygroscopic solution therein from the heat exchanger 186.

On winter-day cycle heat is transferred from the storage tank 17 to air in the preheater 34 and to water circulated by the pump 136 as previously described, while the heater 204 is used to provide additional heat, if required, in the tank 17.

According to a preferred embodiment, the refrigeration apparatus 12 is operated on winter-day cycle using the expander 23 and the evaporator 20. Heat is transferred from the hygroscopic solution in the storage tank 17 to refrigerant in the apparatus 12, for example in the evaporator 20, and heat is transferred from the heat exchanger 186 to air in the preheater 34 and to water circulated by the pump 136. This mode of operation is preferred because it makes significantly more effective use of electrical energy for heating than does the resistance heater 204.

Many of the advantages of the apparatus of the instant invention can be realized if the unitary heat pumps of the induction mixing boxes 14 are eliminated and, instead, chilled water from a source (not illustrated) is circulated to the induction mixing boxes 14 in the system which includes the pump 136 and the lines 137 and 138; if desired, chilled water can be so circulated to heat exchange coils (not illustrated) in the induction mixing boxes 15. In this mode of operation, separate lines to and from the induction mixing boxes 14 are required for the circulation of hot water thereto from a source (not illustrated).

Figure 5:
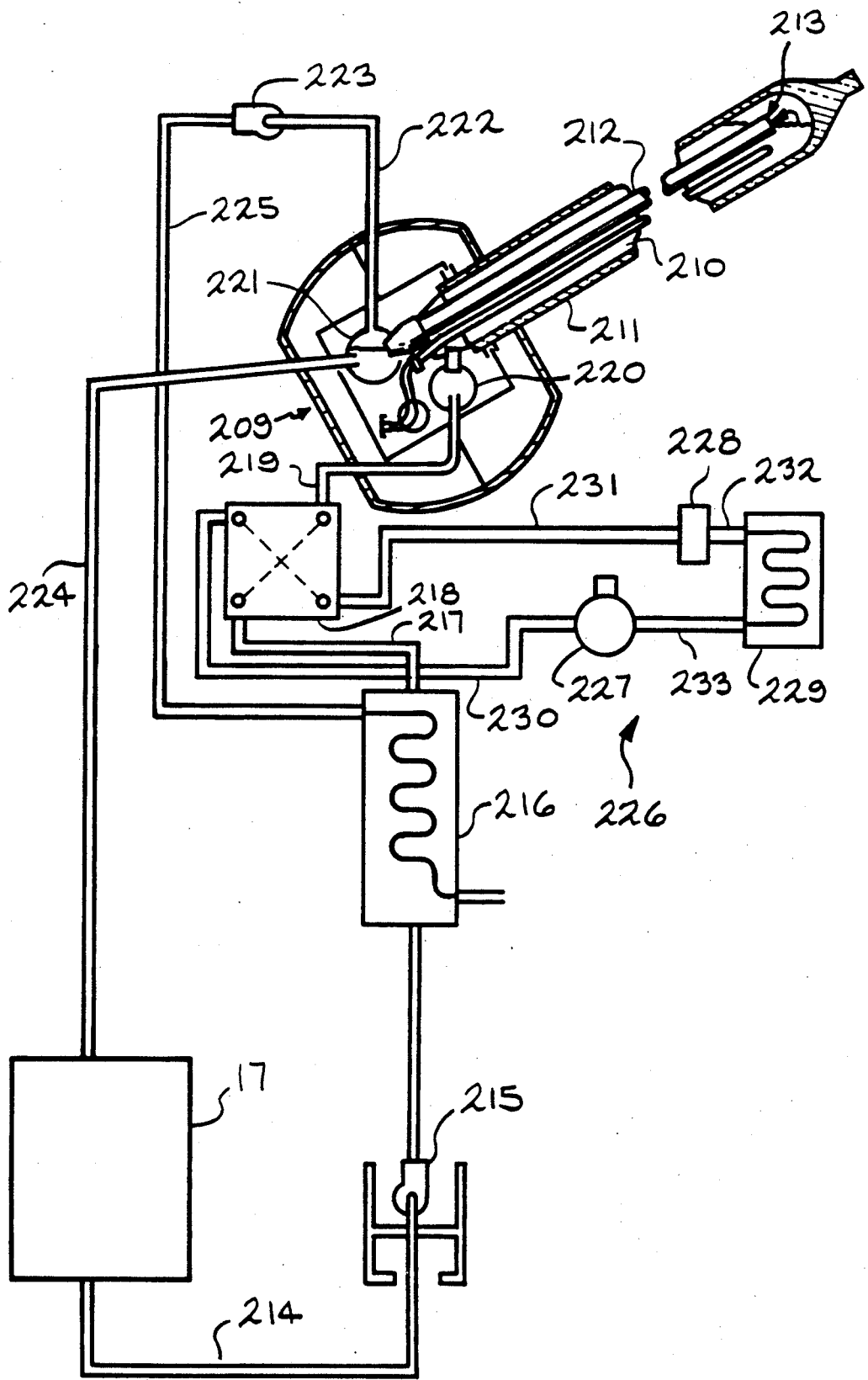
FIG. 5 is a schematic diagram showing apparatus according to the invention which includes a solar collector and is a regenerator for a liquid desiccant.

The solar collector 30 is shown in the drawings as being of the flat-plate type. Such a collector is operable, and can be used as explained above to heat desiccant in the heat exchanger 79. A different kind of solar collector can also be used in a different manner to regenerate a lithium chloride or other desiccant solution. The different type of solar collector, designated generally at 209 in FIG. 5, is one through which a liquid (water as the collector has heretofore been used) flows upwardly in an annular space 210 between two concentric tubes 211 and 212, and then flows downwardly through a restrictor 213, which merely provides a relatively small diameter opening (not illustrated) through which the liquid flows into the interior of the inner tube 212; the outer tube 211 extends slightly above the end of the inner tube 212, and has a closed end so that a liquid under a slight pressure head can be caused to flow into the annular space 210, through the restrictor 213 and then downwardly through the inner tube 212. An evacuated tube collector of this type is commercially available from Sunmaster Corporation, Corning, N.Y. A battery of collectors 209 can be used to concentrate desiccant from the storage tank 17 by pumping the lithium chloride or other aqueous desiccant solution from the tank 17, through a line 214, a pump 215, a heat exchanger 216, a line 217, a heat exchanger 218, a line 219, a receiver 220, and then upwardly through the annular spaces 210 for flow downwardly through the restrictors 213 and the interiors of the central tubes 212 into a closed vessel 221 from the top of which air and vapor are withdrawn through a line 222 by a vacuum pump 223 and from the bottom of which liquid flows through a line 224 to the storage tank 17. The desiccant solution is heated as it flows through the solar collectors 209 and, as a consequence, is concentrated after it flows through the restrictors 213 because some of the water vaporizes at the lower pressure caused by the pump 223. The effluent from the pump 223 passes through a line 225 and the heat exchanger 216 in thermal contact with desiccant solution on its way to the solar collectors 209 so that water vapor therein is condensed at the elevated pressure on the discharge side of the pump 223, and the heat of vaporization is transferred to desiccant solution on its way to the solar collectors 209.

The regenerator of FIG. 5 also includes compression refrigeration apparatus indicated generally at 226. The apparatus 226 includes a compressor 227, an expander 228 and an evaporator 229, which is an ice making device. When the refrigeration apparatus 226 operates, refrigerant is pumped by the compressor 227 through a line 230, the heat exchanger 218, a line 231, the expander 228, a line 232, the evaporator 229 and a line 233 back to the compressor 227. When the apparatus of FIG. 5 is used on summer day cycle to regenerate the desiccant in the storage tank 17, it operates as a solar regenerator whenever sufficient solar energy is available and as a heat pump at other times. On summer-night cycle, the compression refrigeration apparatus 226 of the regenerator of FIG. 5 is operated, acting as a heat pump which provides the heat necessary for regeneration and simultaneously produces ice that is stored for use at some future time, as previously described.

The desiccant in the storage tank 17 (FIGS. 1, 2, 6 and 7) can also be regenerated in a closed vessel divided into two compartments by a semi-permeable membrane. The dilute desiccant is pumped under pressure into the vessel on one side of the membrane while there is a more dilute desiccant solution on the other side of the membrane. Reverse osmosis of water through the membrane concentrates the desiccant from the tank 17, thereby effecting concentration. The concentrated material is then returned to the tank 17.

The apparatus of FIGS. 1, 2, 6 and 7 includes a line 234 into which air from the space being conditioned is drawn through return inlets 235 by a blower 236. Air discharged by the blower 236 enters a line 237 from which a portion is vented as indicated by an arrow 238 (or used as subsequently described with reference to FIGS. 9 and 10), while another portion flows through a line 239 to the duct 40 where it is mixed with air from the conditioner 10 and processed and delivered therewith, as previously described. In a typical installation, outside air may enter the preheater 34 at a rate of 0.13 cubic foot per minute per square foot of floor space in the building served by the apparatus, while air is recirculated through the line 239 at a rate up to 0.12 cubic foot per minute per square foot of floor space and relief air is discharged as indicated by the arrow 238 at a rate of 0.13 cubic foot per minute per square foot of floor space. The fan 44 is controlled to maintain an air flow of from 0.13 to 0.25, depending upon the positions of the dampers of the induction mixing boxes 14 and 15. The fan 236 follows the fan 44, returning air at the same rate that it is delivered by the fan 44. Relief air leaves the system, as indicated by the arrow 238, at a rate of 0.13.

Another embodiment of apparatus according to the invention is shown fragmentarily in FIG. 8, comprising the previously described cogenerator 31 and absorption refrigeration apparatus 13 (FIGS. 1, 2, 6 and 7), desiccant storage tanks 240 and 241, a conditioner/desiccant regenerator 242, an air handler 243, and various other components (not illustrated) of the apparatus of said FIGS., as subsequently described.

On summer-day operation, the cogenerator 31 is operated to furnish heat to the generator 24 of the absorption refrigeration apparatus and electricity for the electric grid (not illustrated) of the building served by the apparatus. Ambient air enters the apparatus of FIG. 8 as indicated by an arrow 244, flowing through an inlet 245, a damper 246, a filter 247, a heat exchanger 248, and a blower 249, from which it is discharged into the conditioner/regenerator 242, which is functioning as a conditioner. Dampers 250 and 251 are closed, while the damper 246 and a damper 252 in a duct 253 are open. As a consequence, air from the blower 249 which enters the conditioner/regenerator 242, after being dehumidified by cooled, concentrated desiccant from nozzles 254, flows through the duct 253, a bypass damper 255, a duct 256 and a blower 257 in the air handler 243. Heat is removed from the air by coils 258 and 259, being transferred in the former to chilled water from the evaporator 27 and, in the latter, to chilled water from the compression refrigeration apparatus 12 (not illustrated in FIG. 8; see FIG. 1). Chilled water from the evaporator 27 is circulated by a pump 260 through a line 261 to the coil 258 and then back through a line 262 to the evaporator 27. Chilled water from the compression refrigeration apparatus 12 is circulated to the coil 259 through lines 263 and 264, which are operably connected to the evaporator 21. Conditioned air leaves the air handler 243 of FIG. 8 in a duct 265 for delivery through ducts 266 (one of which is shown in FIG. 8) to induction mixing boxes 267 (one of which is shown in FIG. 8).

At the beginning of a summer day, the storage tank 240 contains a cool, concentrated, desiccant solution, preferably calcium chloride. The desiccant solution is used during the day to dehumidify air, flowing through a line 268, a pump 269, a line 270 and a line 271 to a sump 272. As is subsequently described, desiccant is pumped from the sump 272 to the nozzles 254 in the conditioner 242 to dehumidify air being conditioned; some of the desiccant solution sprayed from the nozzles 254 in the conditioner 242 flows by gravity through a line 273 to the storage tank 241, while the rest of the solution is returned to the sump 272. By the end of a summer day, a substantial proportion of the desiccant solution will have been transferred to the storage tank 241 in this way.

On summer-night cycle, heat from the cogenerator 31 is transferred to a heat exchanger 274 in the storage tank 241, the transfer being from water which flows thereto through lines 275 and 276 and returns through lines 277 and 278 to a surge tank 279.

When the desiccant in the storage tank 241 reaches an adequately high temperature for regeneration, the blower 249 is energized with the dampers 246 and 251 open and the dampers 250 and 252 closed so that there is a flow of air through the inlet 245, the blower 249, the conditioner/desiccant regenerator 242 (which is now operating as a regenerator) into the duct 253 and from thence through a duct 280, a heat exchanger 281, the damper 251 and an air outlet 282. Simultaneously, hot desiccant solution is circulated from the storage tank 241 through a line 283, the pump 269, the line 270, the line 271, a line 284 which bypasses the sump 272 and the spray nozzles 254, returning by gravity, as previously described, from the conditioner/desiccant regenerator 242 through the line 273 to the storage tank 241. A heat transfer fluid is circulated from the heat exchanger 281 through a line 285 and a pump 286 to the heat exchanger 248 and from thence through a line 287 back to the heat exchanger 281 so that heat is transferred from air leaving to air entering the conditioner/desiccant regenerator 242.

The hot desiccant solution is regenerated in the conditioner/regenerator 242 by removal of water, causing its total volume to decrease. Regeneration is continued until a float 288 reaches a level which indicates completion thereof. A valve 289 is then set to direct heat from the cogenerator 31 to the generator 24 of the absorption refrigeration apparatus 13, and valves 290, 291 and 292 are set so that hot, concentrated desiccant flowing from the storage tank 241 through the line 283 passes through a heat exchanger 293, the line 270, a line 294 and a line 295 into the storage tank 240. Chilled water from the evaporator 27 of the absorption refrigeration apparatus is circulated by the pump 260 through a valve 296, a line 297, a heat exchanger 298 in the tank 240 and back to the evaporator 27, while water is circulated from a cooling tower (not illustrated) through a line 299, the heat exchanger 293 and a line 300 back to the cooling tower. As a consequence, much of the heat in the desiccant solution in the storage tank 241 is rejected in the cooling tower (not illustrated) and heat is transferred from the concentrated desiccant in the storage tank 240 to the absorption refrigeration apparatus 13 to lower the desiccant temperature to about 58° F. (14° C.).

The storage tank 240 can reasonably be sufficiently large to hold the desiccant solution required for a full day of operation. However, even though the desiccant solution temperature at the start of a day of operation is 58° F. (14° C.), the tank would have to be excessively large for the thermal storage capacity to be sufficient for a full day of operation. Accordingly, the sump 272, from which desiccant solution is circulated for dehumidification, contains a heat exchanger 301 which is connected to the return line 264 from the coil 259 in the air handler 243 to enable the removal of heat from the desiccant solution as operation progresses through the course of a day.

On summer day cycle, desiccant solution flows from the sump 272 through a line 302, a pump 303 and a line 304 to the spray nozzles 254 from which it is sprayed for dehumidification as previously described. A part of the desiccant leaving the conditioner/desiccant regenerator 242 flows through the line 273 to the storage tank 241 as previously described, while the rest flows through a line 305 back to the sump 272. A valve 306 divides the flow of desiccant from the conditioner/desiccant regenerator 242 between the lines 273 and 305. In practice, concentrated desiccant from the storage tank 240 should be delivered to the sump 272 at the rate required to maintain the desired desiccant concentration therein, and desiccant from the conditioner/desiccant regenerator 242 should be delivered through the line 273 to the storage tank 241 at the same rate, to maintain a substantially constant volume of desiccant in the sump 272. Desiccant in the sump 272 is maintained at a substantially constant temperature of, say, 58° F. (14° C.) by controlling a valve 307 to cause return water from the line 264 to flow through the heat exchanger 301 or to divert the flow through a bypass line 308. In either case, the water returns through a line 309 to the evaporator 21 of the compression refrigeration apparatus 12 (not illustrated in FIG. 8; see FIG. 1).

The induction mixing box 267 (FIG. 8) has a fan 310 which induces air to flow from the space, as indicated by an arrow 311, and in contact with a coil 312, and delivers, as indicated by an arrow 313, a mixture of induced air from the space and primary air fron the duct 266. Chilled water from the line 261 is circulated through the coil 312, flowing thereto through a line 314 and returning to the line 262 through a line 315. The flow of chilled water through the coil 312 is controlled to maintain a desired space temperature by modulation of a valve 316 to cause chilled water to flow through a line 317, bypassing the coil 312, as required to avoid excessive cooling of the space.

Figure 8:
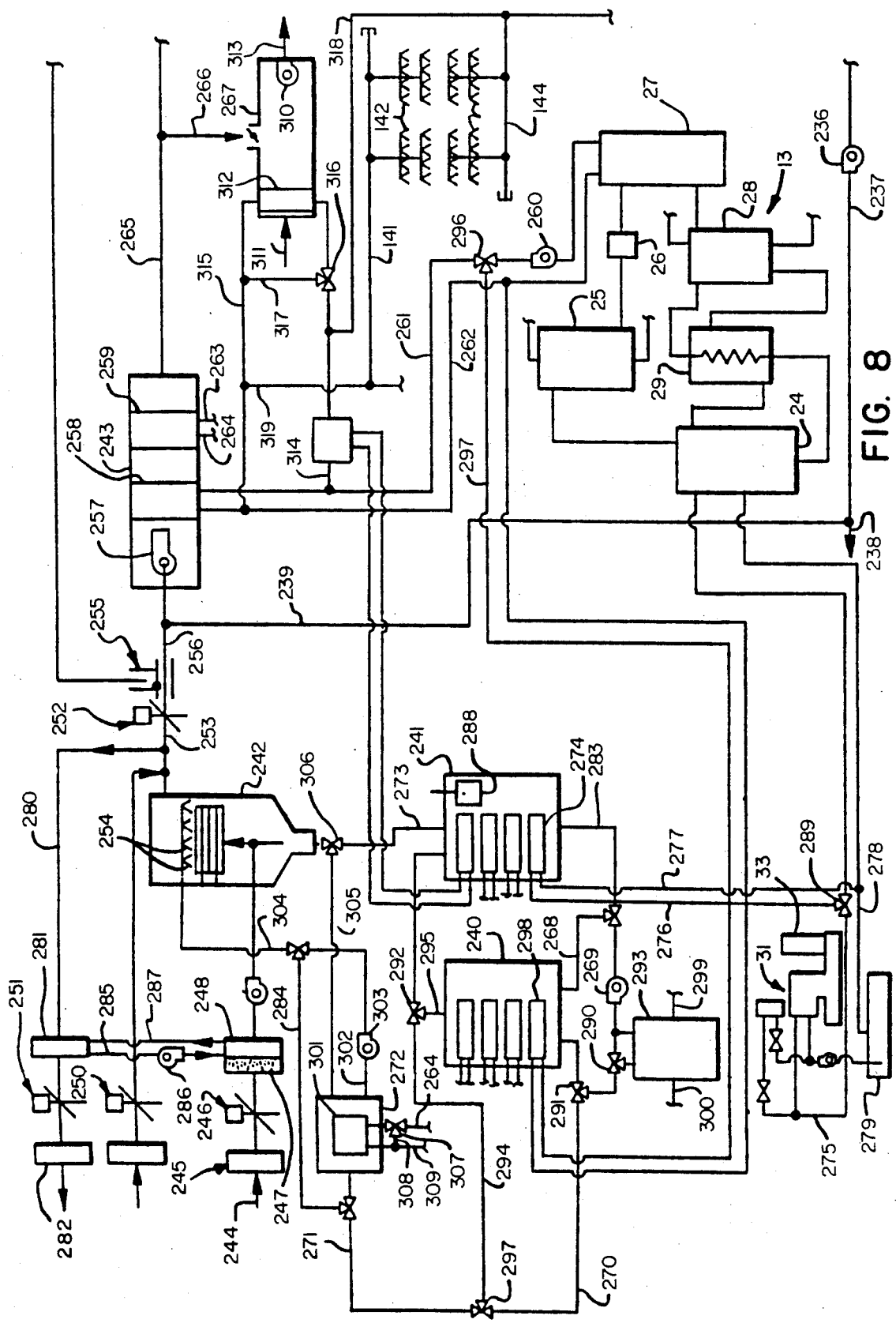
FIG. 8 is a schematic diagram of another embodiment of apparatus according to the instant invention, the embodiment of FIG. 8 being similar to that of FIGS. 1, 2, 6 and 7.

The circulating system which includes the pipes 314 and 315 is a part of the sprinkler system of the building served by the apparatus of FIG. 8, a pipe 318 being connected to the pipe 314 to circulate chilled water to the lines 144 (one of which is shown in FIG. 8) and associated sprinkler heads 142, and a pipe 319 being connected to the pipe 315 to circulate chilled water to the lines 141 (one being shown in FIG. 8) and associated sprinkler heads 142.

The apparatus of FIG. 9 includes a first stage dehumidifier indicated generally at 320 from which partially dehumidified air is delivered to the preheater 34, as indicated by the arrow 35. The dehumidifier 320 comprises a conditioner 321 and a regenerator 322. Ambient air is delivered to the conditioner 321, entering as indicated by an arrow 323, and is dehumidified by lithium chloride or the like desiccant solution sprayed from nozzles 324. Partially dehumidified air flows through a line 325 from the conditioner 321 to the preheater 34. The desiccant solution is circulated from the regenerator 322 to the conditioner 321 and back to the regenerator 322, flowing through a line 326, a pump 327 and a line 328 to the nozzles 324 in the conditioner 321, and flowing by gravity through a line 329 back to the regenerator 322, where it is sprayed from nozzles 330. Relief air leaving the space being conditioned, as indicated by the arrow 238, enters a line 331, from which it is delivered to the regenerator 322 and, after contact with the desiccant solution sprayed from the nozzles 330, is vented as indicated by an arrow 332. The rate at which desiccant solution flows from the regenerator 322 to the conditioner 321 can be controlled by modulating a valve 333 to bypass excess solution delivered by the pump 327 through a line 334 directly to the line 329.

In operation, ambient air at 91° F. (33° C.) and containing 125 grains of water per pound of dry air may enter the conditioner 321 of the first stage dehumidifier 320, and be cooled sensibly to 86.1° F. (30° C.) and dehumidified to a moisture content of 92.4 grains of water vapor per pound of dry air by contact with 32 percent by weight lithium chloride solution at a temperature of 88.5° F. (31° C.). The desiccant solution may be diluted in the conditioner 321 to 30 percent by weight lithium chloride, and heated to 90° F. (32° C.). This diluted desiccant may then be regenerated in the regenerator 322 by relief air at 83° F. (28° C.) and containing 72 grains of water vapor per pound of dry air to provide the desiccant solution containing 32 percent by weight of lithium chloride at a temperature of 88.5° F. (31° C.) for dehumidification.

The apparatus of FIG. 10 comprises a desiccant wheel 335 through which ambient air is directed as indicated by an arrow 336. Cooled and, dehumidified air flows through the line 325 to the preheater 34, while relief air leaving the space is directed through the wheel, being vented as indicated by an arrow 337 after it has been heated and humidified in regenerating the Wheel 335. Cargocaire Engineering Corporation markets a desiccant wheel which can be used in the FIG. 10 apparatus to achieve a result similar to that described above in connection with FIG. 9.

Figure 11:
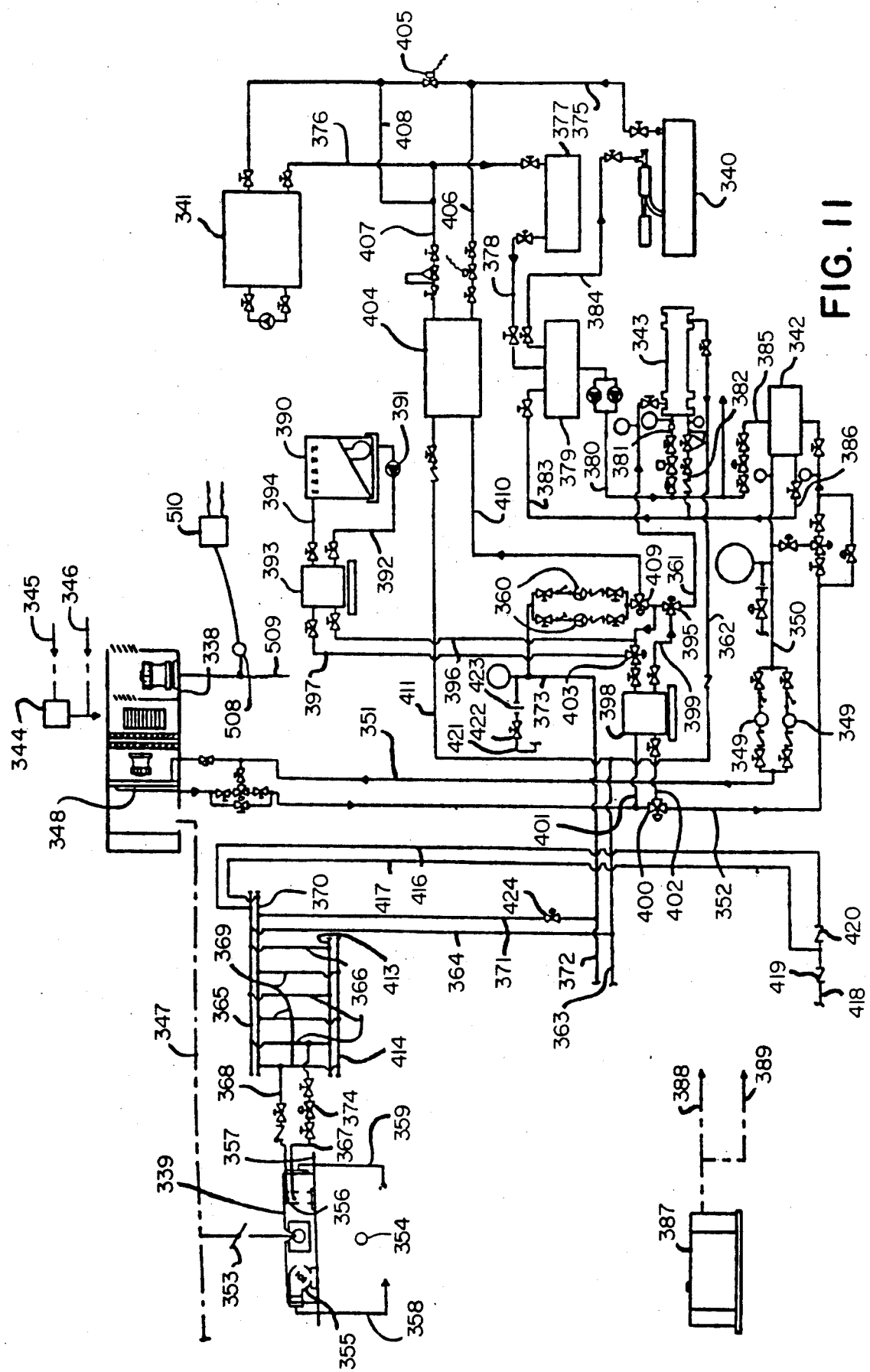
FIG. 11 is a schematic diagram of apparatus similar to that shown in FIGS. 1 and 2, differing mainly in that certain components have been omitted.

The apparatus of FIG. 11 comprises an air handler 338, a plurality of induction mixing boxes 339 (one of which is shown in FIG. 11) and refrigeration apparatus which includes a compressor 340, an evaporative condenser 341, and two different evaporators, one which serves an ice storage tank 342 and one which serves a water chiller 343. The evaporator which serves the ice storage tank 342 operates to produce ice when its operation does not increase the demand charge, for example, on night cycle when the building served by the apparatus is unoccupied, while the evaporator which serves the water chiller 343 operates when it is needed, for example, on day cycle.

Outside air can be directed through or by-passed around an indirect evaporative cooler 344, as indicated by arrows 345 and 346, before it is conditioned in the air handler 338 and distributed through risers (not illustrated) and ducts (one of which is shown in FIG. 11, designated 347) to the building. In the air handler 338, air is conditioned by contact with a coil 348 to a dry bulb temperature of substantially 42° F. (6° C.). Ice water from the ice storage tank 342 at, say, 38° F. (3° C.) is circulated by pumps 349, flowing through a line 350, the pumps 349, a line 351, the coil 348 and a line 352 back to the tank 342. The flow of ice water through the coil 348 is modulated to maintain the 42° F. (6° C.) temperature of the conditioned air leaving the air handler 338. Whenever the ambient air has a low moisture content, it is economically desirable to use the indirect evaporative cooler 344 and, thereby, to reduce the requirement for ice water in the coil 348.

Conditioned air from the duct 347 is delivered to the induction mixing boxes 339 at a rate which varies, depending upon the settings of individual dampers 353, each of which is actuated by a thermostat controller 354. The induction mixing boxes 339 are of the "fan/coil" type, having constant speed fans 355 and coils 356. The fans 355 have a capacity greater than the maximum flow of conditioned air to the induction mixing boxes 339 when the dampers 353 are in their full open position; as a consequence, air is caused to flow from a space served thereby into each of the induction mixing boxes, mixing with conditioned air, and being returned to the space from the fan discharge mixed with conditioned air. The spaces served by the induction mixing boxes 339 are below, while the boxes 339 are above, ceilings 357. The air flow described above is indicated in FIG. 11 by an arrow having a head 358 which represents the flow of a mixture of conditioned air and recirculated air from the induction box 339 and a tail 359 which represents the flow of air from the space into the box 339.

Chilled water flows through the coils 356, being circulated by pumps 360 through a line 361, the water chiller 343, a line 362, a main header 363, a supply line 364, a header 365 of a first sprinkler grid, one of several sprinkler conduits 366 of the first sprinkler grid, a supply line 367, the coil 356, a return line 368, one of several sprinkler conduits 369 of a second sprinkler grid, a header 370 of the second sprinkler grid, a return line 371, a main return 372 and a line 373 back to the pumps 360. The chilled water circulated through the coils 356 is at a comparatively high temperature, sufficiently high that moisture is not condensed when room air at design conditions flows over the coils 356. In a typical instance, the water in the coils 356 will be at 58° F. (14° C.), and the room air will be at 75° F. (24° C.) and 50% relative humidity. The capacity of each of the fans 355 is such that, when the air conditioning load is at the maximum design load, the associated damper 353 is in its full open position, and chilled water is flowing through the associated coil 356 at its maximum rate (as subsequently discussed in more detail), from 40 to 60% of the air conditioning load is carried by conditioned air and the rest of the load is carried by the coil 356. It has been found that, when the apparatus has these design parameters, significant savings are possible because the sizes of the ducts and blowers required to circulate conditioned air can be minimized. In a typical installation, the savings which can be realized by minimizing duct and blower sizes are nearly sufficient to offset the extra cost of the induction mixing boxes 339 and of the refrigeration apparatus including the compressor 340 which has the capability of making and storing ice and of providing chilled water when needed.

The operation of the induction mixing boxes 339 is controlled by the thermostat controllers 354. When the air conditioning load is the maximum design load in a space served by a given one of the boxes 339, that box operates as just described, with the associated damper 353 in its full open position, and chilled water flowing through the associated coil 356 at the maximum rate (because a valve 374 is in its full open position). As the load on that space decreases below the maximum design load, the valve 374 is throttled by the thermostat controller 354 to reduce the flow of chilled water through the coil 356 so that less heat is transferred from recirculated air in the induction mixing box. As the air conditioning load varies between the maximum design load and the maximum load that can be handled by conditioned air from the duct 347, the valve 374 is modulated between a fully open position and a fully closed position to maintain the design temperature as the air conditioning load varies. Whenever the load is less than that which can be handled by the maximum flow of conditioned air from the duct 347, the valve 374 remains closed, and the damper 353 is modulated (by the thermostat controller 354) so that the rate at which conditioned air is delivered to the indcution mixing box 339 from the duct 347 varies as required to maintain the design temperature as the air conditioning load varies. Ordinarily, it is necessary to maintain some minimum flow of ventilation air into the space being conditioned; as a consequence, the minimum setting for each of the dampers 353 is that setting which provides the minimum ventilation air, usually 0.10 to 0.15 cubic foot per minute per square foot of space served by a given induction mixing box. Accordingly, the system is designed for a minimum air conditioning load which can be accommodated by air from the duct 347 being delivered to the space at the minimum rate required for ventilation unless some expedient that is not illustrated in FIG. 11 is used to add heat to the air delivered by at least some of the induction mixing boxes 339. Heat can be added, for example, by unitary heat pumps (see discussion of the induction mixing boxes 14 of FIGS. 1 and 2), or by circulating warm water through a second circulating system (not illustrated) to all or some of the coils 356 in the apparatus of FIG. 11.

As has been stated above, the refrigeration apparatus includes the compressor 340, the evaporative condenser 341, and two different evaporators, one which serves the ice storage tank 342 and one which serves the water chiller 343. On day cycle, the ice storage tank 342 contains a supply of ice sufficient to provide all the chilled water required by the coil 348 until the evaporator which serves the ice storage tank 342 is again operated. Only the evaporator which serves the water chiller 343 is operated, the refrigerant flow being from the compressor 340 through a line 375, the evaporative condenser 341, a line 376, a high pressure receiver 377, a line 378, a low pressure receiver 379, a line 380, a line 381, the water chiller 343, lines 382 and 383, the low pressure receiver 379 and a line 384 to the suction side of the compressor 340. The evaporator which serves the water chiller 343 is controlled to maintain the required chilled water temperature in the coils 356 of the induction mixing boxes 339.

The refrigeration apparatus is also operated when the water chiller 343 is idle, but to produce ice. The refrigerant flow is from the compressor 340 through the line 375, the evaporative condenser 341, the line 376, the high pressure receiver 377, the line 378, the low pressure receiver 379, the line 380, a line 385, the ice storage tank 342, a line 386, the line 383, the low pressure receiver 379 and the line 384 to the suction side of the compressor 340. Enough ice is produced while the water chiller 343 is idle to provide all the chilled water required by the coil 348 during the next period of operation of the water chiller 343.

The apparatus of FIG. 11 is highly advantageous from the standpoint of the cost of energy (electricity) required for operation. It was designed to service an addition to a shopping mall which had an air conditioning system in which a mixture of ambient air and return air was cooled to a dry bulb temperature of 55° F. (13° C.), and the cooled air was circulated as required for air conditioning. It is by comparison with the existing system that, as stated above, the savings which can be realized by minimizing duct and blower sizes are sufficient to offset the extra cost of the induction mixing boxes 339 and a substantial portion of the cost of the refrigeration apparatus including the compressor 340 which has the capability of making and storing ice and of providing chilled water. In the existing mall, the energy costs are divided about equally between the requirements for lighting and the requirements of the HVAC system. A "demand" charge, which is a flat monthly fee based upon the maximum rate of energy usage, is a substantial part of the energy costs for the HVAC system; the demand charge, of course, reflects the high cost of new generating equipment, which makes it highly desirable for a utility, for the country, to keep the maximum rate at which electricity is used as low as possible. The apparatus of FIG. 11 makes ice when theres is no demand charge (because the usage of energy by the shopping mall, by the community served by the utility, is low), and then uses that ice during the day to carry about one-half of the peak air conditioning load. While the refrigeration apparatus operates during the time when the electricity it uses contributes to the demand charge, its energy requirements during this time are less than half of the total requirements of the HVAC system. Furthermore, the apparatus includes a gas engine-generator 387 which can be operated to generate electricity to be supplied to the electrical grid of the building (not illustrated) as indicated by an arrow 388, to provide emergency power as indicated by an arrow 389, or both. It has been estimated that one-half of the cost of energy required by the HVAC system can be saved by using the FIG. 11 apparatus instead of duplicating the existing equipment. It is highly advantageous to operate the gas engine-generator 387 whenever such operation prevents an increase in "demand".

The apparatus of FIG. 11 also includes a cooling tower 390 and a pump 391 for circulating tower water from the cooling tower 390 through a line 392, through a plate and frame heat exchanger 393, and through a line 394 back to the cooling tower 390. Whenever the ambient humidity is sufficiently low to make it worth while, the tower 390 can be operated, and cooled water can be circulated therefrom to the heat exchanger 393 as just described for heat transfer with heat transfer fluid discharged from the pumps 360 and diverted by a three-way valve 395 to flow through a line 396, the heat exchanger 393, a line 397, a plate and frame heat exchanger 398 and a line 399 before entering the line 361 for flow to the water chiller 343 and to the coils 356 as previously described. If the water from the tower is sufficiently cold, it is not necessary to operate the water chiller; if not, reduced operation is sufficient. The apparatus also includes a three-way valve 400 which can be used to divert heat transfer fluid in the line 352 (returning to the ice storage tank 342 from the coil 348) for flow through a line 401, through the heat exchanger 398 and through a line 402 back to the line 352 for return to the ice storage tank 342. When heat transfer fluid is diverted to flow through the heat exchanger 398, as just described, the valve 395 and a valve 403 can be used to divert the flow of heat transfer fluid discharged by the pumps 360 directly into the heat exchanger 398 for heat transfer to the fluid diverted from the line 352 and flow through the lines 399 and 361 to the water chiller 343. Such operation may be advantageous whenever the ice in the ice storage tank 342 has excess heat absorbing capacity, beyond that required by the coil 348 to provide air at 42° F. (6° C.) for the rest of the day of operation. Heat exchange between the two fluids, as described, reduces the requirement for refrigeration to provide water at 58° F. (14° C.) to serve the coils 356, and may eliminate that requirement altogether if the ice has sufficient excess capacity.

The apparatus of FIG. 11 also includes a heat recovery unit 404 which can be used on night cycle to provide warm heat transfer fluid, as required, for circulation to the coils 356. This is done by closing a valve 405 at least partially so that warm refrigerant from the compressor 340 flows from the line 375 through a line 406 to the unit 404, leaving the unit 404 through a line 407 and either flowing through a line 408 back into the line 375 or flowing directly into the line 376. In either event, there is warm refrigerant in the unit 404 from which heat can be transferred to the fluid circulated by the pumps 360. This is done by setting a valve 409 to divert heat transfer fluid discharged by the pumps 360 for flow through a line 410 to the unit 404. After heat has been transferred thereto from the refrigerant in the unit 404, the fluid flows through a line 411 to the main 363 and then through whichever ones of the coils 356 require heat and back to the pumps 360 as previously described.

Figure 12:
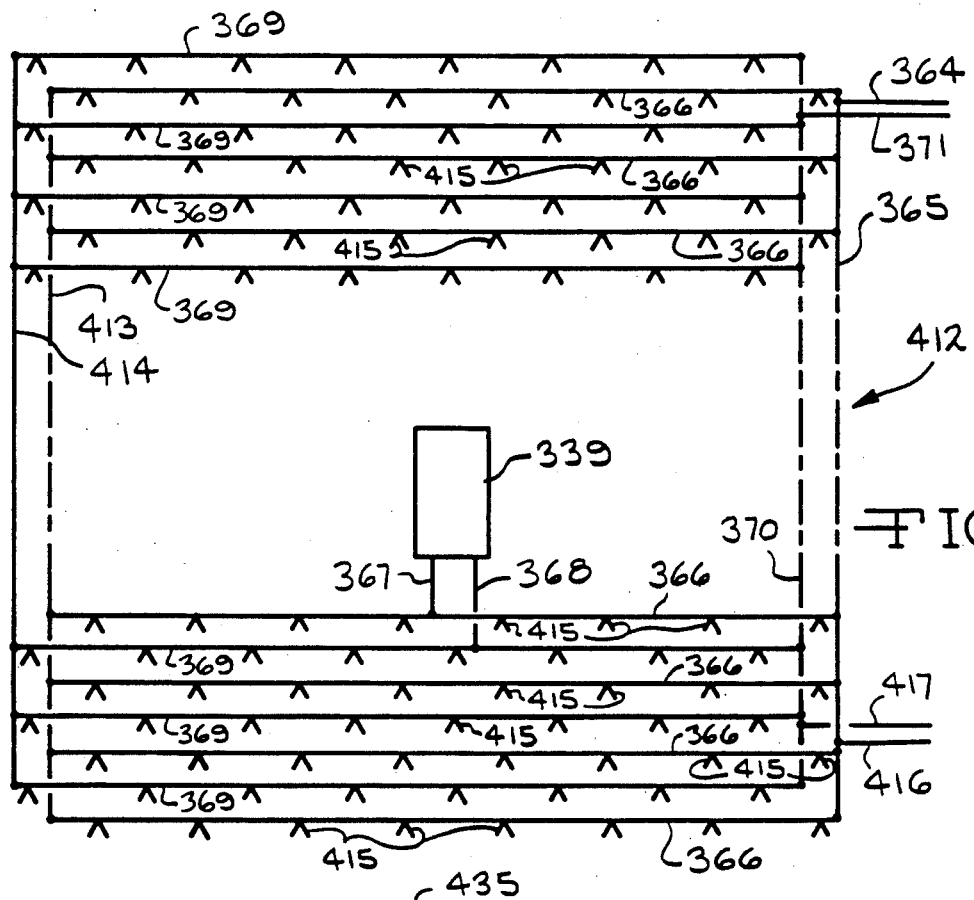
FIG. 12 is a fragmentary plan view showing a sprinkler system that is an important part of the apparatus of FIG. 11.

Further details of the sprinkler system of the apparatus of FIG. 11 are shown in FIG. 12 where the system is indicated generally at 412. The header 365, an opposed header 413 and the sprinkler conduits 366 make up a first sprinkler grid, while the header 370, an opposed header 414 and the sprinkler conduits 369 make up a second sprinkler grid. As previously described, the line 364 is connected to discharge heat transfer fluid into the header 365, while the line 371 is connected to receive heat transfer fluid from the header 370. There are sprinkler heads 415 spaced a given distance, which may be 10 feet (3.05 meters), from one another in the sprinkler conduits 366 and in the sprinkler conduits 369. The sprinkler conduits 366 are spaced a given distance, which may be 20 feet (6.1 meters), from one another, and the sprinkler conduits 369 are spaced the same distance from one another. Each of the sprinkler conduits 366 is spaced ½ the given distance from one of the sprinkler conduits 369 or from two of the conduits 369, depending upon its position in the grid. Accordingly, the two grids jointly constitute a sprinkler system in which conduits are spaced from one another by, say, 10 feet (3.05 meters) and in which sprinkler heads in a given conduit are spaced from one another by, say, 10 feet (3.05 meters). Each grid, however, as is subsequently explained in more detail, is independently connected to a source for water to be used in case of fire, the first grid by a line 416 which is operably connected to introduce water into the header 365, and the second grid by a line 417 which is operably connected to introduce water into the header 370. It will be noted that the two grids are completely independent of one another in the sense that water or heat transfer fluid introduced into one can not flow to the other, except through the induction mixing boxes 339, one of which is shown in FIG. 12 with a supply line 367 connected to one of the sprinkler conduits 366 of the first grid, and a return line 368 connected to one of the sprinkler conduits 369 of the second grid.

Referring, again, to FIG. 11, the lines 416 and 417 are operably connected to a line 418, which, in turn, is connected to a source (not illustrated) for water to be used in case of fire. When the apparatus of FIG. 11 is in normal operation, an alarm check valve 419 prevents the flow of water from the line 418 to the lines 416 and 417, and a check valve 420 prevents the flow of heat transfer fluid from the header 365 through the line 416 to either of the lines 417 and 418. Since heat transfer fluid is supplied to the first grid, entering the header 365, and returns from the second grid, leaving the header 370, the pressure in the header 365 and in the line 416 exceeds that in the header 370 and in the line 417; this pressure difference prevents a flow of heat transfer fluid through the check valve 420 from the line 417 to the line 416.

The apparatus also includes a make up line 421 for heat transfer fluid which flows from a source (not illustrated) through the line 421, a valve 422 and an orifice 423 to the return line 373. The valve 422 is controlled to maintain a constant pressure at the point where the lines 421 and 373 connect. Whenever there is an excessive loss of heat transfer fluid from the system, for example, because a sprinkler head has opened, there is a pressure drop across the orifice 423. This pressure drop is sensed by any suitable means (not illustrated) and the apparatus is put in fire mode by opening the alarm check valve 419 and closing the valve 422 and a valve 424 in the line 371. Opening the alarm check valve 419 enables water for fire purposes to flow from the line 418 into both of the lines 416 and 417. This water is at a pressure sufficiently high that it flows through the check valve 420 even if there is still a reverse pressure from heat transfer fluid on the valve. As a consequence, the water flows through both of the lines 416 and 417, to the first and second sprinkler grids, and through the grids, as required, to the one or ones of the sprinkler heads 415 from which heat transfer fluid had started to flow. Closing the valves 422 and 424 prevents the flow of heat transfer fluid to the coils 356 by stopping the return to the pumps 360.

Figure 13:
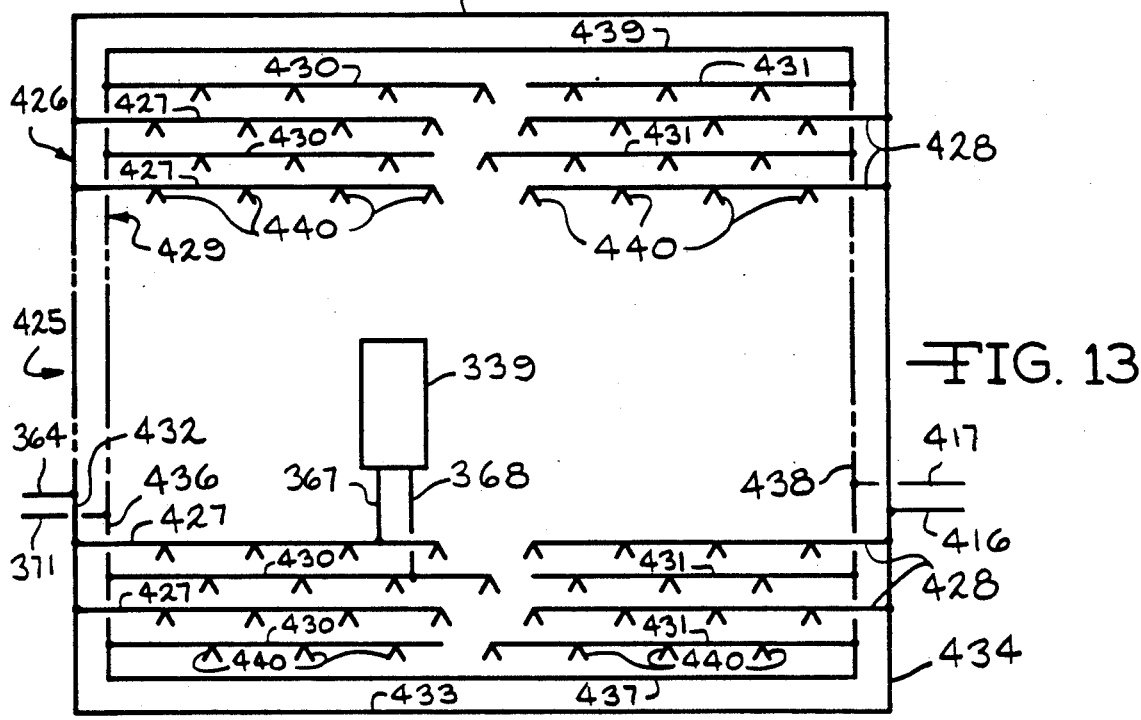
FIG. 13 is a fragmentary plan view showing another embodiment of a sprinkler system that can be used in the apparatus of FIG. 11.

Another sprinkler system according to the instant invention is indicated generally at 425 in FIG. 13. This system comprises a first grid made up of a loop 426 and sprinkler conduits 427 and 428, and a second grid made up of a loop 429 and sprinkler conduits 430 and 431. The loop 426 is composed of four conduits, 432, 433, 434 and 435 which are operably connected so that a liquid could flow around the loop 426. The sprinkler conduits 427 are operably connected to the conduit 432 while the sprinkler conduits 428 are operably connected to the conduit 434. The loop 429 is also composed of four conduits, 436, 437, 438 and 439, which are operably connected to one another. The sprinkler conduits 430 are operably connected to the conduit 436, while the sprinkler conduits 431 are operably connected to the conduit 438. There are sprinkler heads 440 in the sprinkler conduits 427, 428, 430 and 431. The heads 440 are spaced from one another a given distance, say 10 feet (3.05 meters) in each of the conduits, and the sprinkler conduits of each grid are spaced from one another a given distance, say 20 feet (3.1 meters). Each of the sprinkler conduits of the first grid is spaced ½ the given distance from one of the sprinkler conduits of the second grid or from two such conduits, depending upon its position in the grid. Accordingly, the two grids jointly constitute a sprinkler system in which conduits are spaced from one another by, say, 10 feet (3.05 meters) and in which sprinkler heads in a given conduit and in an aligned conduit are spaced from one another by, say, 10 feet (3.05 meters). The first grid, however, is connected to the line 416 as a source for water to be used in case of fire, while the second grid is connected to the line 417. Similarly, the line 364 is connected to discharge heat transfer fluid into the first grid, while the line 371 is connected to receive heat transfer fluid from the second grid. The two grids are completely independent of one another in the sense that water or heat transfer fluid introduced into one can not flow to the other, except through the induction mixing boxes 339, one of which is shown in FIG. 13 with a supply line 367 connected to one of the sprinkler conduits 427 of the first grid, and a return line 368 attached to one of the sprinkler conduits 430 of the second grid.

Figure 14:
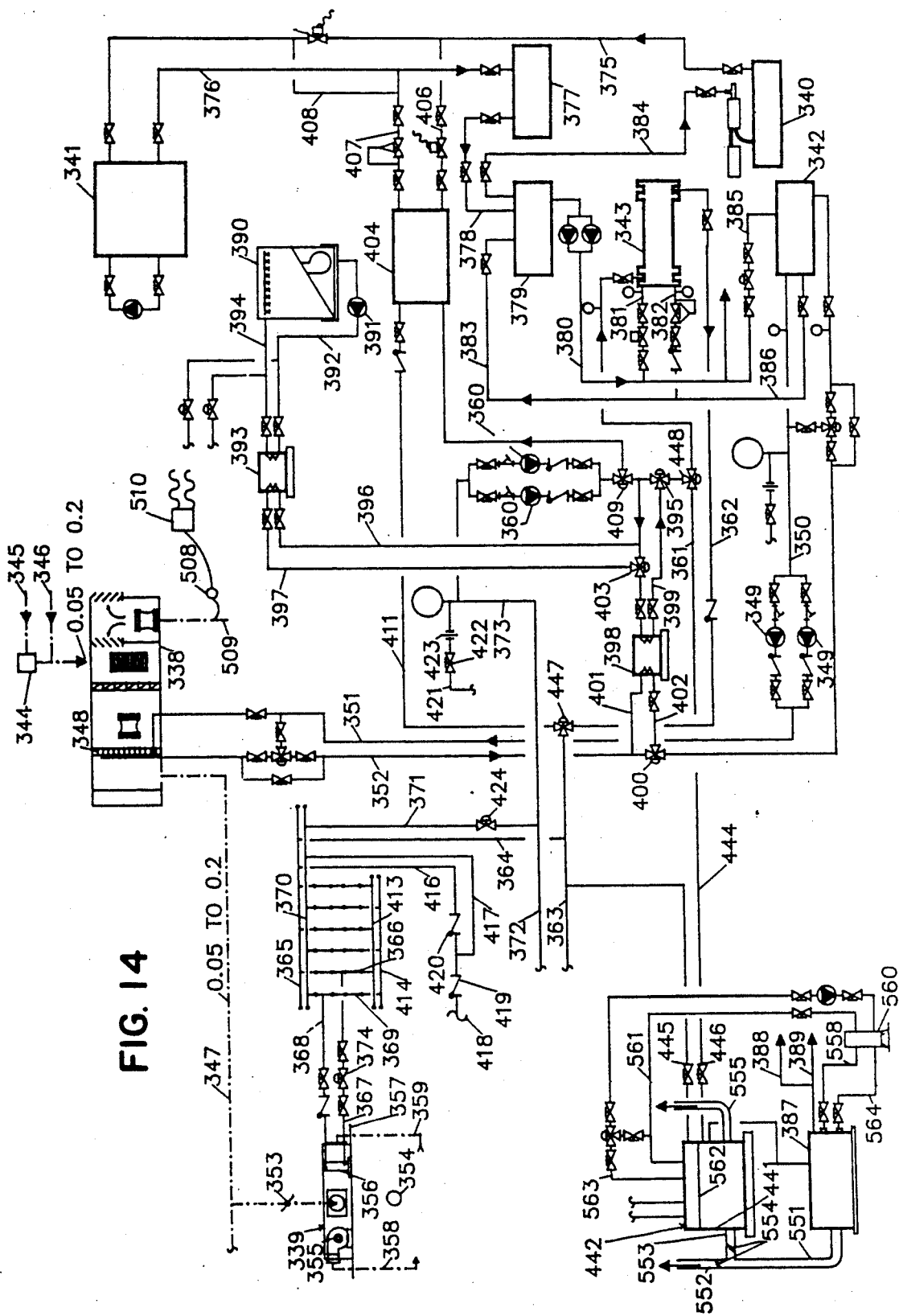
FIG. 14 is a schematic diagram of apparatus similar to that shown in FIG. 11, differing mainly in that certain components have been added.

The apparatus of FIG. 14 includes all of the elements of that of FIG. 11, all designated by the same reference numerals, and, in addition, a waste heat recovery unit 441, absorption refrigeration apparatus indicated generally at 442, pipes 443 and 444, and valves 445, 446, 447 and 448. The unit 441 is operably connected to supply heat to energize the apparatus 442. When the gas engine generator 387 is operating and the apparatus of FIG. 14 is being used on summer cycle to air condition a building, the valves 445 and 446 are open and the valves 447 and 448 are set so that heat transfer fluid discharged from the pumps 360 is directed into the line 444, flows through the absorption apparatus 442, and is cooled before flowing through the line 443 to the main header 363 and from thence, as previously described, through the coils 356 and back to the pumps 360. In this mode of operation, there is no need for the compressor 340 to operate, as the chilled water required for the coils 356 is provided by the absorption refrigeration apparatus 442, supplemented, if required, by heat transfer from the heat transfer fluid in the heat exchanger 398 as previously described. Heat from the absorber and condenser (not illustrated) of the apparatus 442 can be transferred to the cooling tower 390.

Figure 15:
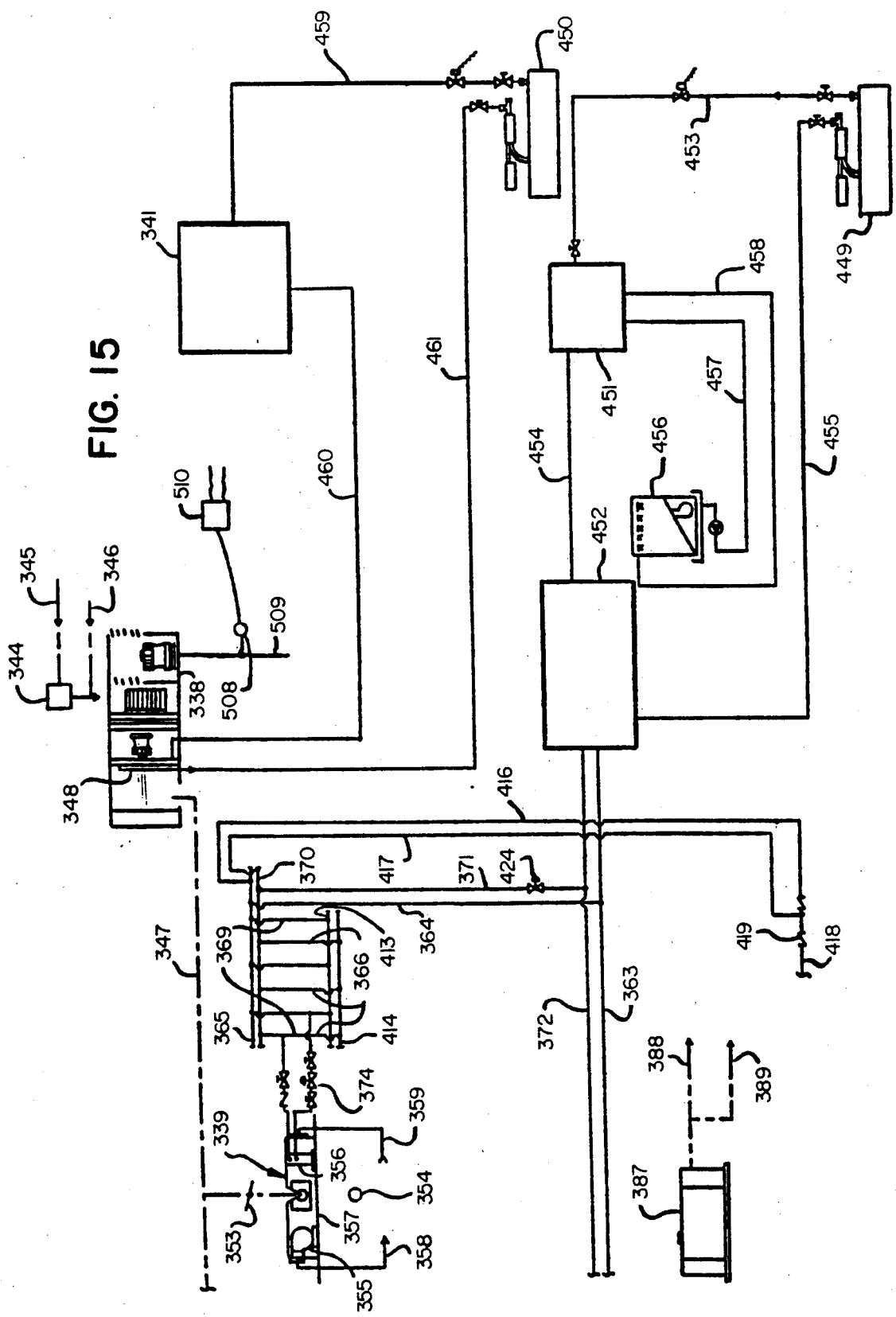
FIG. 15 is a schematic diagram of apparatus similar to that shown in FIGS. 11 and 14, differing mainly in that all components which are not absolutely essential, with the exception of a generator powered by a gas turbine, have been omitted.

The apparatus of FIG. 15 includes some of the elements of that of FIG. 11, specifically, the air handler 338, the induction mixing boxes 339 (one of which is shown in FIG. 15), the sprinkler system comprising the headers 365 and 370 and the sprinkler conduits 366 and 369, the supply and return lines 364 and 371 for circulating chilled water through the sprinkler system to the coils 356 of the induction mixing boxes 339, and the lines 416 and 417 for supplying water to the sprinkler system when the apparatus is in fire mode. Cooling is provided by compression refrigeration apparatus which includes a compressor 449 and by compression refrigeration apparatus which includes a compressor 450. The compressors 449 and 450 both operate on day cycle; refrigerant from the former flows to a heat exchanger 451, to an evaporator 452, and back to the compressor 449, the flow being through lines 453, 454 and 455. In the heat exchanger 451 heat is transferred from the refrigerant to water that is circulated from a cooling tower 456 through a line 457 to the heat exchanger 451 and, through a line 458, back to the cooling tower 456. The refrigerant is expanded in the evaporator 452 as required to provide chilled water at, say, 58° F. (14° C.) for circulation as previously described from the main header 363 to the coils 356 of the induction mixing boxes 339 and back to the main return 372 and the evaporator 452. Refrigerant flows from the compressor 450 through a line 459 to the evaporative condenser 341 and from thence through a line 460 to the coil 348, where it is expanded to maintain the air leaving the air handler 338 and entering the duct 347 at a temperature of, say, 42° F. (6° C.), returning to the compressor 450 through a line 461.

It will be appreciated that, on summer day cycle, the apparatus of FIG. 15 is identical with that of FIG. 11, insofar as the operation of the air handler 338 and of the induction mixing boxes 339 is concerned. However, both the compressor 449 and the compressor 450 operate when the load is at a peak; as a consequence, the peak load and the demand charge associated therewith are nearly as high as with the previously described existing equipment, the only energy saving being that attributable to the lesser quantity of colder air that is required to be circulated. It has been determined, however, that the first cost is less than 75 percent of that of duplicating the existing equipment, the lowered cost being attributable to the savings in ductwork and air moving apparatus (fans and motors) which were possible because of the reduced volume of conditioned air to be circulated. As is subsequently explained in more detail with reference to FIG. 22, the energy efficiency of the apparatus of FIG. 15 can be improved significantly by modifying the air handler 338, specifically, by adding a second coil and transferring heat from a mixture of return air and outside air to 58° F. (14° C.) water circulated through that coil from the evaporator 452. This is true because the energy requirement is about 0.5 kilowatt per ton of refrigeration to produce water at 58° F. (14° C.) but about 0.85 kilowatt per ton to cool air to 42° F. (6° C.). Accordingly, shifting one third of the load in the air handler 338 to 58° F. (14° C.) water effects about a 15% energy savings for refrigeration therein. Apparatus which includes such a modified air handler, but is otherwise substantially identical to the FIG. 15 apparatus, is shown in FIG. 22 and described subsequently with reference thereto.

It is possible, in the apparatus of FIGS. 11, 14 and 15, as well as in that of FIG. 22, to use the sprinkler system to provide a chilled plenum, or to perform localized cooling. All that is necessary is to connect the sprinkler conduits 366 and 369, or some of them, by lines which contain control valves (not illustrated in FIGS. 11, 14, 15 and 22). When the valves are closed, the apparatus delivers chilled water only to the induction mixing boxes 339, as previously described. However, chilled water flows through each line when the appropriate valve is open and, in addition, through the associated sprinkler conduits 366 and 369. This flow of chilled water is operable to transfer heat from a plenum which contains the sprinkler system, or from selected portions thereof.

Figure 16:
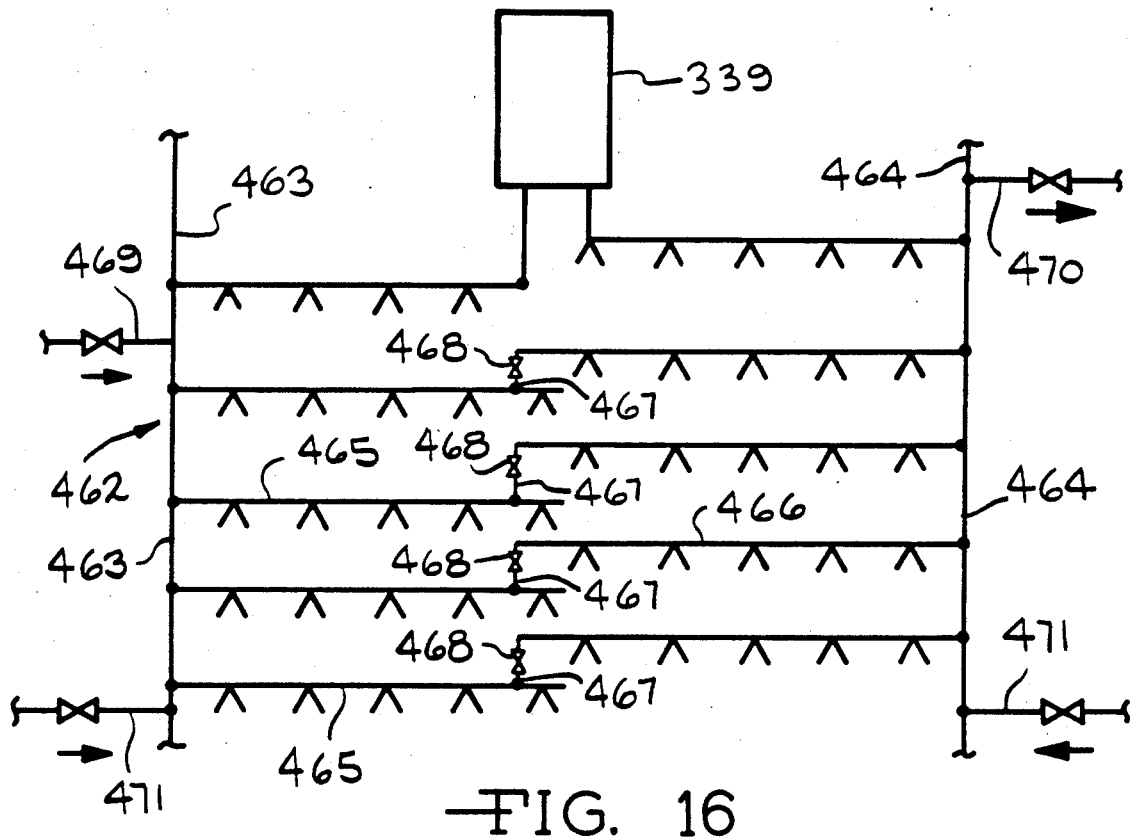
FIG. 16 is a fragmentary plan view showing a sprinkler system that can be used in the apparatus of FIGS. 1, 2, 6, 7, 8, 11, 14, 15, 22, 24, 25, 26, 27, 29 and 30, and to produce a cooled plenum.

Sprinkler apparatus which includes such lines and valves is indicated generally at 462 in FIG. 16. The sprinkler system 462 includes headers 463 and 464 and sprinkler conduits 465 and 466 operatively associated, respectively, with the headers 463 and 464. Conduits 467 connect adjacent ones of the sprinkler conduits 465 and 466. Valves 468 control the flow of heat transfer fluid through the conduits 467. If desired, the valves 468 can be controlled by thermostat controllers, or by a single thermostat controller (not illustrated), so that the flow of heat transfer fluid through the conduits 467 is modulated, as required, to maintain a desired temperature in the associated plenum. For example, the valves 468 can be modulated to maintain the plenum at a temperature of 60° F. (16° C.); heat will then be transferred to the plenum from the adjacent space, thereby reducing the load that must be carried by the coils 356 (FIGS. 11, 14, 15, and 22) in the induction mixing boxes 339 and by the coil 348 in the air handler 338. Fins (not illustrated) can be added to the sprinkler conduits 465 and 466 (FIG. 16) and to the conduits 467 to increase heat transfer from the plenum, if desired. Heat transfer fluid is delivered to the apparatus 462 from a supply line 469 and leaves through a return 470, while water for fire purposes can be supplied to both of the headers 463 and 464 through conduits 471.

Figure 17:
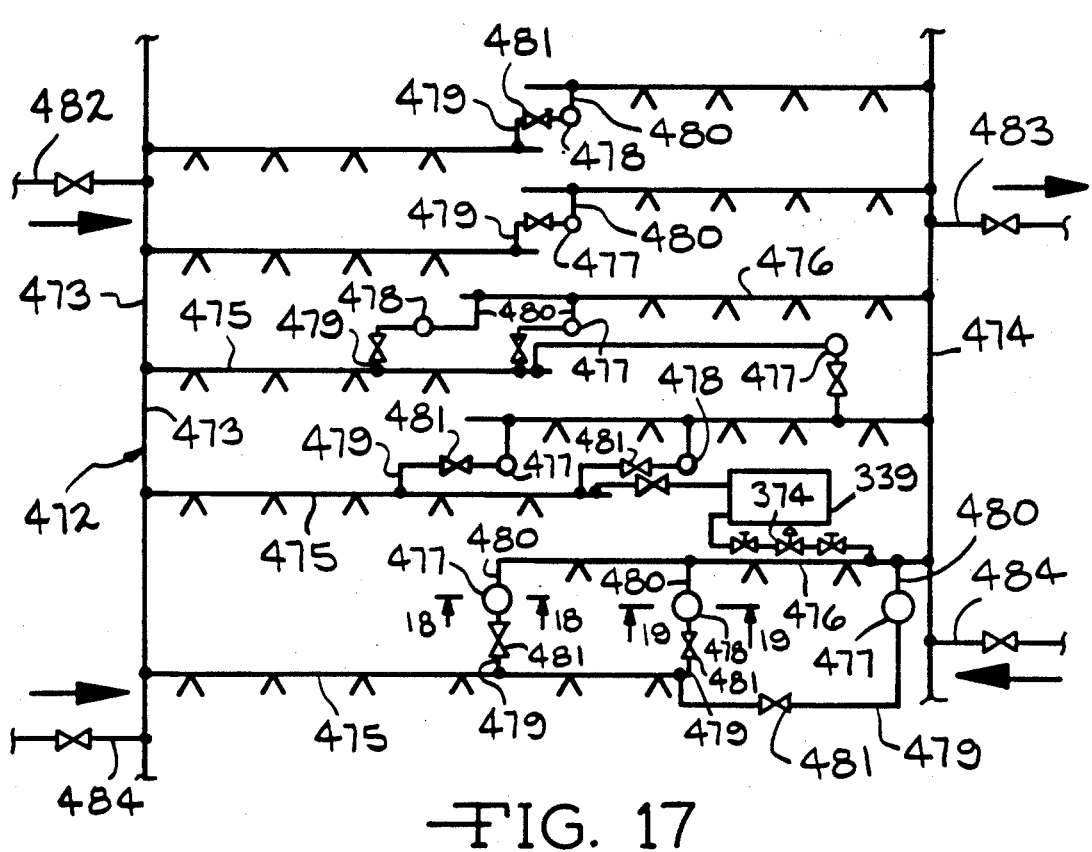
FIG. 17 is a fragmentary plan view showing a sprinkler system similar to that of FIG. 16, and additionally including a simplified induction mixing box and a cooled light.

Apparatus indicated generally at 472 in FIG. 17 is also a sprinkler system, comprising headers 473 and 474 and operatively associated sprinkler conduits 475 and 476, an induction mixing box 339 operatively connected between one of the conduits 475 and one of the conduits 476 and, in addition, simplified induction mixing boxes 477 and cooled lights 478, both of which are served with chilled water from adjacent ones of the sprinkler conduits 475 and 476. The chilled water flows from the sprinkler conduits 475 through conduits 479 to the induction mixing boxes 477 and to the lights 478 and then through conduits 480 to the sprinkler conduits 476, under the control of valves 481. The apparatus 472 also includes a supply line 482 and a return 483 for a heat transfer fluid, and conduits 484 through which water for fire purposes can be supplied to the headers 473 and 474.

Figure 18:
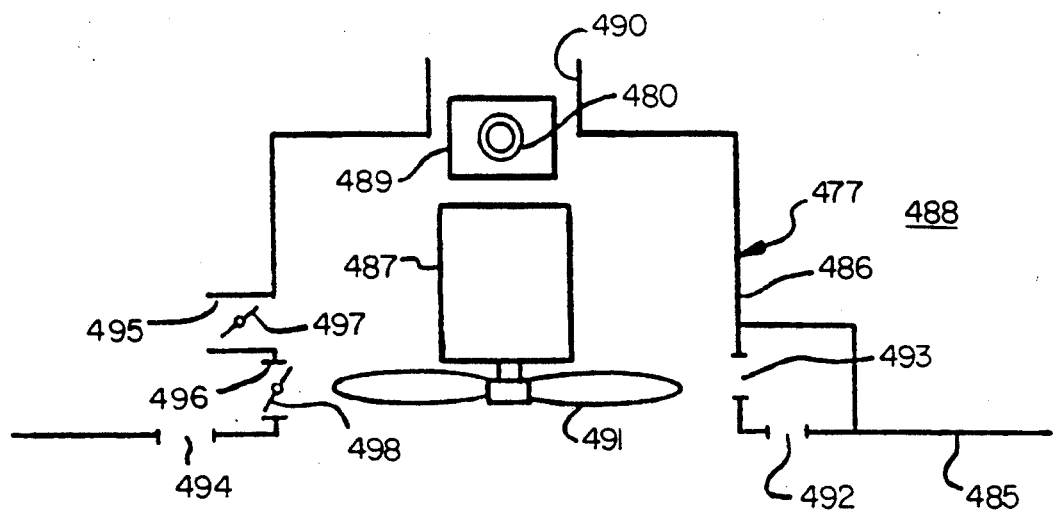
FIG. 18 is a vertical sectional view of the simplified induction mixing box of FIG. 17.

One of the induction mixing boxes 477 is shown in more detail in FIG. 18, mounted so that its bottom is flush with a ceiling 485 of a space it serves and a housing 486 in which a two speed electric motor 487 is mounted extends above the ceiling in a plenum 488. One of the conduits 480 which carries fins 489, extends through a collar 490 which is a part of the housing 486. When the motor 487 is energized, a fan 491 discharges air downwardly from the housing 486 and induces a flow of air into the housing. The induced air can flow (1) directly from the space through an opening 492 in the ceiling and an opening 493 in the wall of the housing 486, (2) directly from the plenum through the collar 490 which extends upwardly from the top of the housing 486, or (3) partially from the space through an opening 494 in the ceiling 485 and partially from the plenum into one or both of two openings 495 and 496, depending on the positions of dampers 497 and 498.

In operation, the induction mixing box 477 discharges air into the space it serves at a rate which depends upon the speed of the motor 487. Some of this air is induced to flow from the space through the openings 492 and 493; some is induced to flow from the plenum through the collar 490; and some may be induced to flow through one or both of the openings 495 and 496, depending on the positions of the dampers 497 and 498. The induction mixing box 339 (FIG. 17) is used as previously described to introduce conditioned 42° F. (6° C.) air into a zone served by the induction mixing box 339 and a plurality of the induction mixing boxes 477, the rate of delivery of the conditioned air being sufficient to provide humidity control for the entire zone. Each of the motors 487 (FIG. 18) of the induction mixing boxes 477 can operate at high speed or at low speed, or can be de-energized, depending on the air conditioning load in the zone and whether or not the zone or a portion thereof is occupied. For example, if the apparatus of FIG. 17 serves a multi-story department store, the induction mixing boxes 339 can be energized at the start of a business day, and operated to deliver a mixture of 42° F. (6° C.) primary air and recirculated air as previously described, and motors 487 (FIG. 18) of the induction mixing boxes 477 can remain de-energized until a motion sensor (not illustrated) indicates that the zone they serve is occupied. The motion sensor, which can be, for example, of the type disclosed in U.S. Pat. No. 4,485,864, can be operably connected to energize the motors 487 of the induction mixing boxes 477 which serve the space in which motion has been sensed, and to continue them in an energized condition so long as motion continues to be sensed. While the motors 487 are energized, the operation of the induction mixing boxes 477 and of the valves 481 (FIG. 17) can be controlled by a thermostatically operated controller (not illustrated). If a temperature substantially higher than the control temperature is sensed in an occupied zone, some or all of the valves 481 which serve that zone can be opened to enable a flow of heat transfer fluid at 58° F. (14° C.) through the conduits 479 and 480 which serve the relevant ones of the induction mixing boxes 477 or which serve the relevant portion of the entire sprinkler system. If all of the valves 481 in the relevant portion of the sprinkler system are opened, that portion of the plenum will be cooled, and then, maximum cooling from the induction mixing boxes 477 can be achieved by inducing a maximum flow of air into the induction boxes 477 from the plenum. If only the valves 481 which control the flow of heat transfer fluid through those of the conduits 479 and 480 which serve the relevant boxes 477 are opened, maximum cooling can be achieved by inducing a maximum flow of air into the induction mixing boxes 477 in heat transfer relationship with the ones of the conduits 479, 480, or both through which the heat transfer fluid is flowing. As the sensed temperature approaches the control temperature, all of the relevant ones of the valves 481 which were opened, can be modulated or closed, the dampers 497 and 498 (FIG. 18) can be controlled to reduce heat transfer to the circulated fluid, or both. In general, the maximum flow of induced air from the plenum 488 occurs when the damper 497 is open and the damper 498 is closed, while the maximum flow of induced air through the collar 490 occurs when both of the dampers 497 and 498 are closed. The temperature of the plenum 488 will be a function of heat gains attributable to the lights 478, to other lights and electronic equipment (not illustrated) in the space, and the like and of heat losses to fluid circulated through the sprinkler system 472 (FIG. 17). Accordingly, the apparatus 472 can be controlled so that heat is transferred to the space therefrom, or so that heat is transferred thereto from the space, and the amount of heat so transferred can be controlled in a simple manner to maintain a desired space temperature. The amount of heat so transferred can also be changed by changing the speed of the motors 487, the maximum transfer being accomplished at the high speed, and a lesser transfer at the low speed.

In general, the flow of heat transfer fluid through the sprinkler apparatus 472 can be controlled to maintain the entire plenum 488 (FIG. 18) or the portion thereof in the vicinity of any one or any desired group of the induction mixing boxes 477 at a desired temperature, which can range from 60° F. (16° C.) to 80° F. (27° C.). The flow of conditioned air from the induction mixing boxes 339, as is subsequently explained in detail, can be controlled by a humidistat/controller (not illustrated in FIGS. 17 and 18) to effect humidity control in the space and, because there is a flow of air thereinto from the space, in the plenum. Humidity control is necessary in the plenum to prevent condensation on the heat transfer devices which are used as described above to control temperature, including the headers, sprinkler conduits and other conduits through which a heat transfer fluid at, say, 58° F. (14° C.) may be circulated. The induction mixing boxes 477 which serve a given zone of the space can be controlled together, in response to signals from a single thermostat, or can be so controlled individually to provide several different temperature zones in the zone for which a single induction mixing box 339 provides humidity control.

Figure 19:
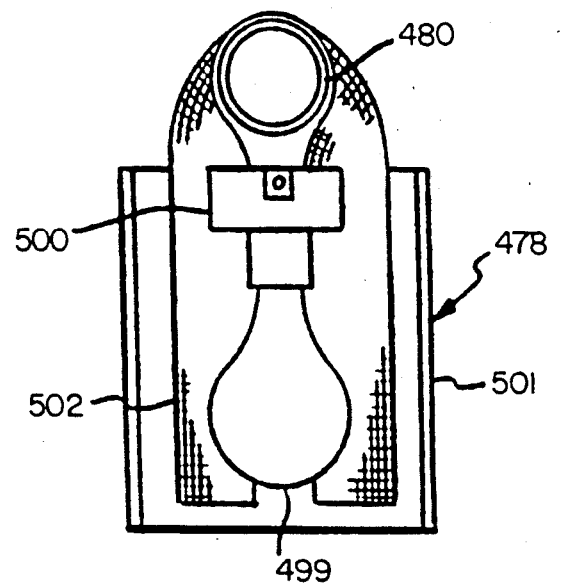
FIG. 19 is a view in vertical section of the cooled light of FIG. 17.

The light 478 (FIG. 17) is shown in more detail in FIG. 19, comprising a high intensity bulb 499 received in a socket 500 which is mounted in a housing 501. A sheet 502 of metal fabric is draped over the conduit 480 and extends downwardly on both sides of the bulb 499 where it is heated by thermal energy it intercepts and also by radiant energy. Because the sheet 502 is a fair conductor of heat and is in thermal contact with the conduit 480, heat is transferred therefrom to the conduit 480 and to heat transfer fluid circulated through the conduit 480, thus minimizing the storage of heat from the bulb 499 in the building structure and ultimate release of the stored heat at times of maximum air conditioning load.

Lighting fixtures which are disclosed in U.S. Pat. No. 3,828,180 and other water-cooled lighting fixtures can also be connected between the conduits 475 and 476, and the flow of heat transfer fluid therethrough can be controlled so that lighting heat is either used for reheat or transferred to a major extent to the heat transfer fluid. For example, whenever the air conditioning load on a space served by one or a plurality of the induction mixing boxes 339 is such that heating is required, the flow of heat transfer fluid to the lighting fixtures that serve that zone can be modulated so that as much of the lighting heat as is required is available to the space.

Specifically, the lighting fixtures of the '180 patent have dampers which can be opened when lighting heat is required in the space; when the dampers are open, air can flow from the space into the lighting fixtures and through openings in the fixtures into a plenum from which the induction mixing boxes 339 induce a flow of air. Such flow through the fixtures is prevented when the dampers are closed. Lighting fixtures of this type can also be used in conjunction with the apparatus of FIGS. 25-27 which is subsequently described in detail.

Figure 20:
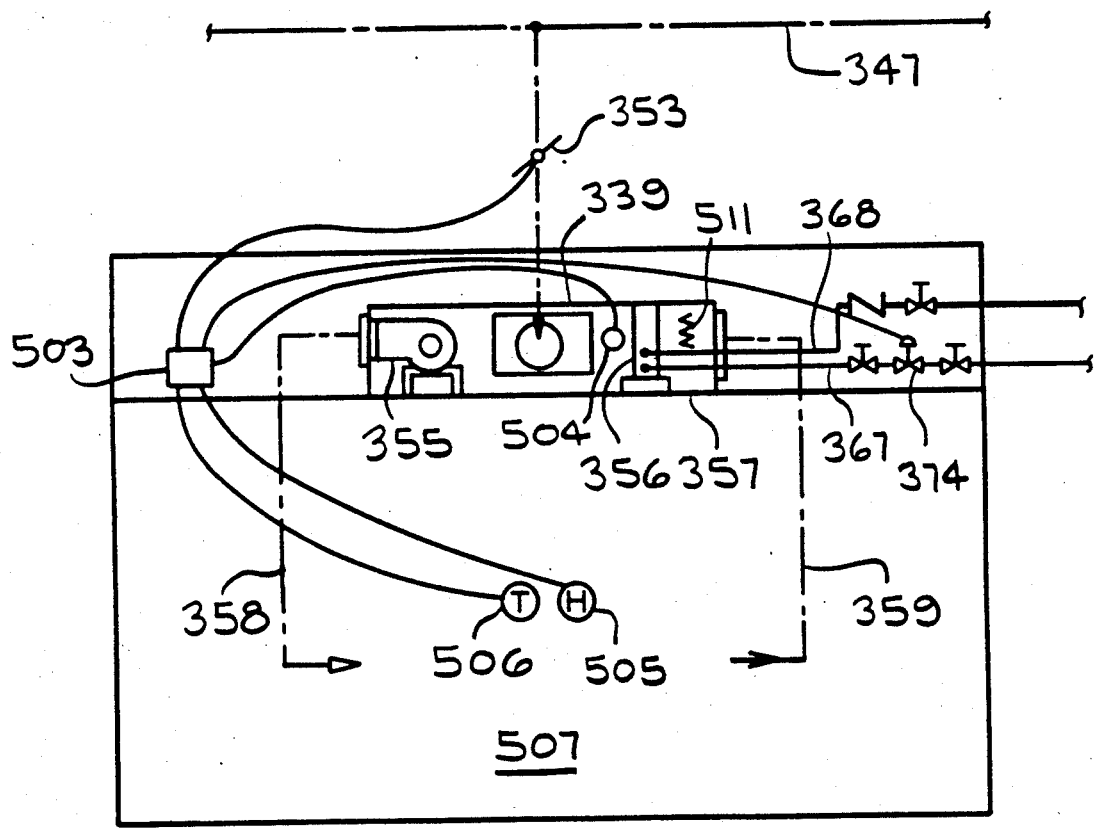
FIG. 20 is a partially schematic view of an induction mixing box which is an important part of the apparatus of FIGS. 11, 14 and 15, and additionally including an improved control.

A particularly advantageous control device for the induction mixing box 339 of FIGS. 11, 14, 15 and 22 is shown, somewhat schematically, in FIG. 20. The device comprises a controller 503 for the damper 353 and for the valve 374. Signals from a humidstat or thermostat 504, from a humidistat 505 and from a thermostat 506 are input to the controller 503 which then controls the damper 353 and the valve 374. The humidistat 505 and the thermostat 506 sense conditions in a space 507 served by the induction mixing box 339, while the humidistat or thermostat 504 senses conditions inside the induction mixing box 339, specifically of air that has been induced to flow from the space 507 into the induction box 339 and has been cooled by heat exchange with the coil 356. This combination of sensors with the controller 503 is well suited for use when different spaces served by different ones of the induction mixing boxes 339 are to be maintained at different humidities or have substantially different humidity loads. It is important to prevent condensation, which occurs whenever air is cooled to a relative humidity of 70% or higher, on the coils 356. The controller 503 prevents such condensation; when the induction mixing box 339 is first energized, the controller closes the valve 374, keeps it closed until a signal received from the thermostat or humidistat 504 indicates a relative humidity below 70% and thereafter controls the valve 374, if necessary, to keep the relative humidity below 70%, its function in this mode being in the nature of a limit switch. The controller 503 also opens or closes the damper 353 initially, when the induction mixing box 339 is first energized, as required to establish and maintain the control temperature as sensed by the thermostat 506 or the control humidity as sensed by the humidistat 505, and thereafter as required to maintain or to establish and maintain, as the case may be, the control humidity as sensed by the humidistat 505. The controller 503, when it is in the latter mode, controlling the damper 353 to maintain the control humidity as sensed by the humidistat 505, also controls the valve 374 to maintain the control temperature as sensed by the thermostat 506, the limit on opening of the valve being that position at which the signal from the humidistat or thermostat indicates a relative humidity of 70%, as described above.

The signal from the humidistat or thermostat 504 is a direct indication of relative humidity only when the instrument is a humidistat; the signal must be compared with the signal from the humidistat 505 for the required indication of relative humidity when the instrument is a thermostat.

The controller 503 can also operate in another manner, modulating the damper 353, when the air conditioning load in the space is comparatively light, to maintain the absolute humidity sensed by the humidistat 505 at a set point, say, 64 grains of water vapor per pound of dry air, and (1) if the humidistat 504 senses a relative humidity not greater than, say, 70 percent, modulating the valve 374 to maintain the space temperature sensed by the thermostat 506 at a set point, say, 78° F. (26° C.), or (2) if the humidistat 504 senses a relative humidity greater than, say, 70 percent, closing the valve 374, if open, or keeping the valve 374 closed, if it is already closed, to reduce the relative humidity. This mode of operation also prevents condensation on the coil 356. However, whenever the valve 374 is closed because the humidistat 504 senses a humidity greater than, say 70 percent, the controller 503 modulates the damper 353 to control both the temperature and the humidity of the space. Ordinarily, increasing primary to lower space temperature will soon lower the humidity to such an extent that the valve 374 can be opened to shift a part of the sensible load to the coil 356.

In general, dehumidified air is a relatively expensive utility. It is, therefore, desirable to use only as much as is needed for humidity control and to transfer as much of the sensible load as possible to chilled water. This can be accomplished as just described by using the damper 353 under the control of the humidistat/thermostat controller 503 to maintain the desired humidity and transferring as much of the sensible load as possible, without risking condensation, to the coil 356. However, if humidistat control is not available, it is desirable to avoid the risk of condensation by transferring heat to the coil 356 only after the apparatus has been operating sufficiently long to establish humidity control, and only when primary air is being delivered to the space at a rate higher than some predetermined minimum, sufficiently high to indicate a low humidiy.

When the apparatus of FIG. 20 is operated in either of the modes described above and the air conditioning load is sufficiently high that the valve 374 is in its fully open position and the temperature sensed by the thermostat 506 is above the current set point, the set point for the humidistat 505 can be lowered and the set point for the thermostat 506 can be raised. If the valve 374 again reaches a full open position, the set points can be reset again. Other suitable set points, where the entries under the heading "Humidistat 505", are moisture contents in grains of water vapor per pound of dry air, are:

| Humidstat 505 | Thermostat 506 |
| --- | --- |
| 60 | 80° F. (27° C.) |
| 56 | 82° F. (28° C.) |
| 52 | 84° F. (29° C.) |

Ordinarily, it is desirable for apparatus according to the instant invention to be designed so that changing the set point for the humidistat 505 is necessary only when the air conditioning load is heavy. This is true because the use of primary conditioned air at 42° F. (6° C.) is a considerably more expensive way to counteract sensible heat gains than is the use of 58° F. (14° C.) water in the coil 356. Consequently, the controller 503 reverts to the next higher humidity set point for the humidistat 505 and the corresponding set point for the thermostat 506 after it has operated for, say, thirty minutes at any given reduced humidity set point. If the thermostat 506 senses too high a temperature with the valve 374 in its full open position, the lowered humidity and increased temperature set points will be reinstated, as described above, and will remain in effect for another short period of time, say, thirty minutes, unless, in the meantime, the thermostat 506 senses too high a temperature with the valve 374 in its full open position. When the load decreases again, the original set points will be reinstated in the manner just described.

It is also possible for the controller 503 to revert to the next lower humidity set point for the humidistat 504 whenever the valve 374 is throttled to its closed position or to any desired position between full open and closed, but reversion on the basis of elapsed time is preferred. A humidistat/thermostat controller which can be programmed to operate in any of the ways the controller 503 is described herein as operating can be purchased from VAISALA, Inc., Woburn, Ma.

In installations where substantially the same relative humidity, say 50%, is to be maintained in all of the spaces served by air conditioning apparatus according to the instant invention, simpler control apparatus than that shown in FIG. 20 can be used for summer operation. Specifically, the humidistat or thermostat 504 and the humidistat 505 can be eliminated, and the signal from a humidistat 508 (FIGS. 11, 14, 15 and 22) can be used to control each of the induction mixing boxes 339 as described below. The humidistat 508 senses the absolute humidity of return air from all of the spaces served as that air flows through a duct 509. On start-up of the apparatus, a signal from the humidistat 508 is input to a controller 510 for the pumps 360, which are energized only when that signal indicates that the absolute humidity of the return air in the duct 509 is at or below a set point, say 64 grains of water vapor per pound of dry air. A signal from the humidistat 508 is also input to each of the controllers 503 (FIG. 20), as is a signal from the thermostat 506 associated therewith. Each of the controllers 503 operates the damper 353 associated with it to maintain a set temperature, say 78° F. (26° C.), in the space it serves and opens the valve 374 associated with it whenever the relative humidity of recirculated room air in the induction mixing box 339, at the lowest temperature to which the coil 356 is capable of cooling it and at the absolute humidity sensed by the controller 508 (FIGS. 11, 14, 15 and 22), is less than 70%. When the apparatus is controlled as just described, only air from the duct 347 is available to lower the temperature of the space served by each of the induction boxes 339 during the first part of morning start-up. Since this air has a low humidity, being saturated at 42° F. (6° C.), each of the spaces is also dehumidified even though the dampers 353 are controlled only on the basis of dry bulb temperature. However, as soon as the humidistat 508 senses a humidity sufficiently low to indicate that humidity control has been established, the pumps 360 are energized to circulate chilled water from the water chiller 343, and the valves 374 are opened to make that chilled water available to remove heat from the space served by each of the induction mixing boxes 339. As soon as a signal from one of the thermostats 506 (FIG. 20) indicates that the space served by the associated one of the induction mixing boxes 339 has reached the set temperature, the controller 503 throttles and then modulates the damper 353 (FIGS. 11, 14, 15 and 22) to maintain the set temperature. The air handler 338 is operated to maintain a predetermined static pressure at a point in the duct 347; accordingly, when the dampers 353 are throttled, as just described, the rate at which conditioned air is delivered to the duct 347 and the rate at which ice is used to produce the conditioned air are both reduced. The valves 374 remain in their fully open positions unless the temperature in a space served by one of them is below the set point with the relevant damper closed to the point where only the minimum ventilation air is being supplied; that one of the valves 374 is then modulated by the controller 503 for temperature control and, if necessary, a resistance heater 511 is energized. A heat pump (not illustrated) can also be added to the induction mixing boxes 339 to pump heat from the heat transfer fluid circulated through the sprinkler system (see FIGS. 11, 14, 15 and 22) to a coil (not illustrated) in the induction box 339 in heat transfer relationship with air circulated therethrough; preferably, the coil (not illustrated) is in heat transfer relationship with the mixture of recirculated air and conditioned air so that, when the air conditioning load is high, heat can be pumped from the air to the heat transfer fluid with only a minimal risk of condensation because the mixture has a low humidity.

Figure 21:
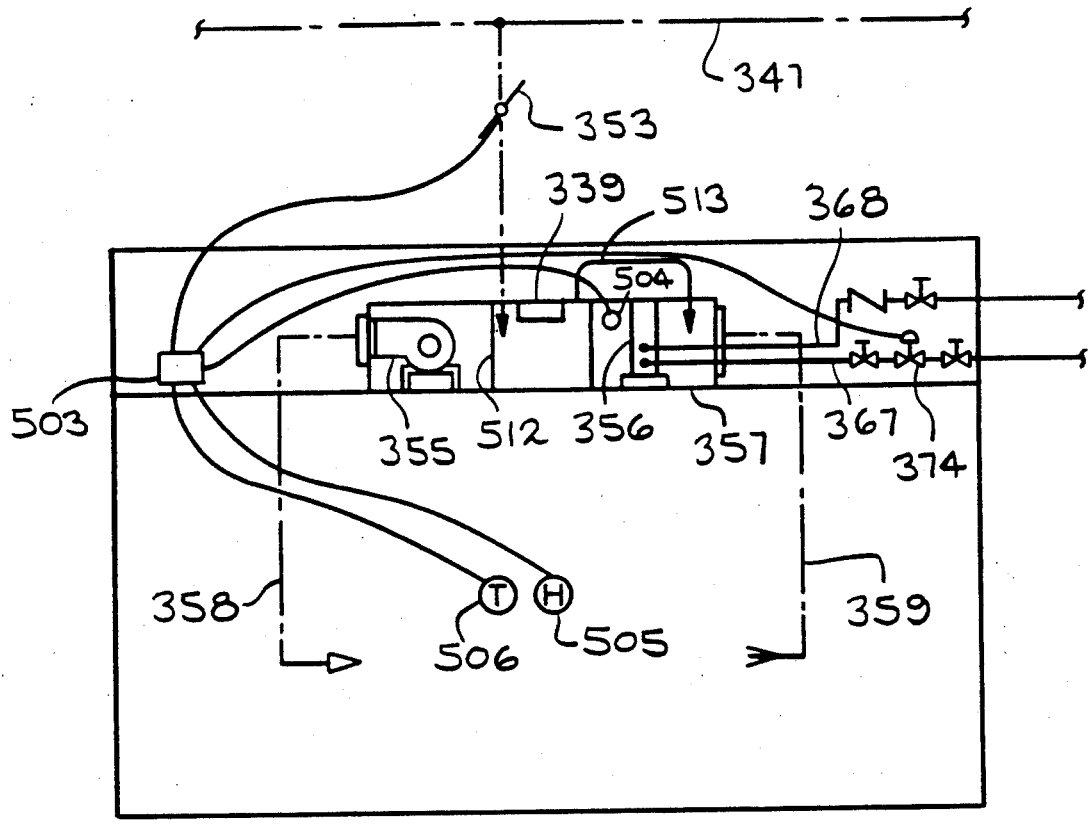
FIG. 21 is a partially schematic view of an induction mixing box similar to that of FIG. 20 and additionally including a heat exchanger.

The induction mixing box 339, equipped with the controller 503 of FIG. 20, is shown in FIG. 21 with a heat exchanger 512 added. Primary air from the duct 347 (at 42° F., 6° C.) enters one side of the heat exchanger 512, leaving through a duct 513 from which it enters the induction box 339 where it is mixed with recirculated air from the space. The mixture of recircluated air from the space and of primary air from the duct 513 flows in thermal contact with the coil 356 and then through a second side of the heat exchanger 512. Heat is transferred, in the heat exchanger 512, from the mixture of primary air and recirculated air to incoming primary air, and the air which flows in heat transfer relationship with the coil 356 is cooler and drier, other factors being equal, than in the induction boxes 339 of FIGS. 11, 14, 15, 20 and 22; as a consequence, the likelihood of condensation on the coil 356 is reduced.

The apparatus of FIG. 22 includes all of the elements of that of FIG. 15, as indicated by the use of the same reference numerals, except that the air handler 338 has been replaced by an air handler 514 in the FIG. 22 apparatus. The air handler 514 has the coil 348 which cools air circulated thereover to 42° F. (6° C.) and, in addition, has a coil 515 to which water at, say, 58° F. (14° C.) is circulated through lines 516 and 517. The load that must be carried by the coil 348 is reduced as a consequence of heat transfer to the coil 515; as is explained above, shifting load from the coil 348 to the coil 515 saves energy because only about 0.5 kilowatt per ton of refrigeration is required to produce 58° F. (14° C.) water instead of about 0.85 kilowatt per ton of refrigeration to cool air to 42° F. (6° C.).

Figure 23:
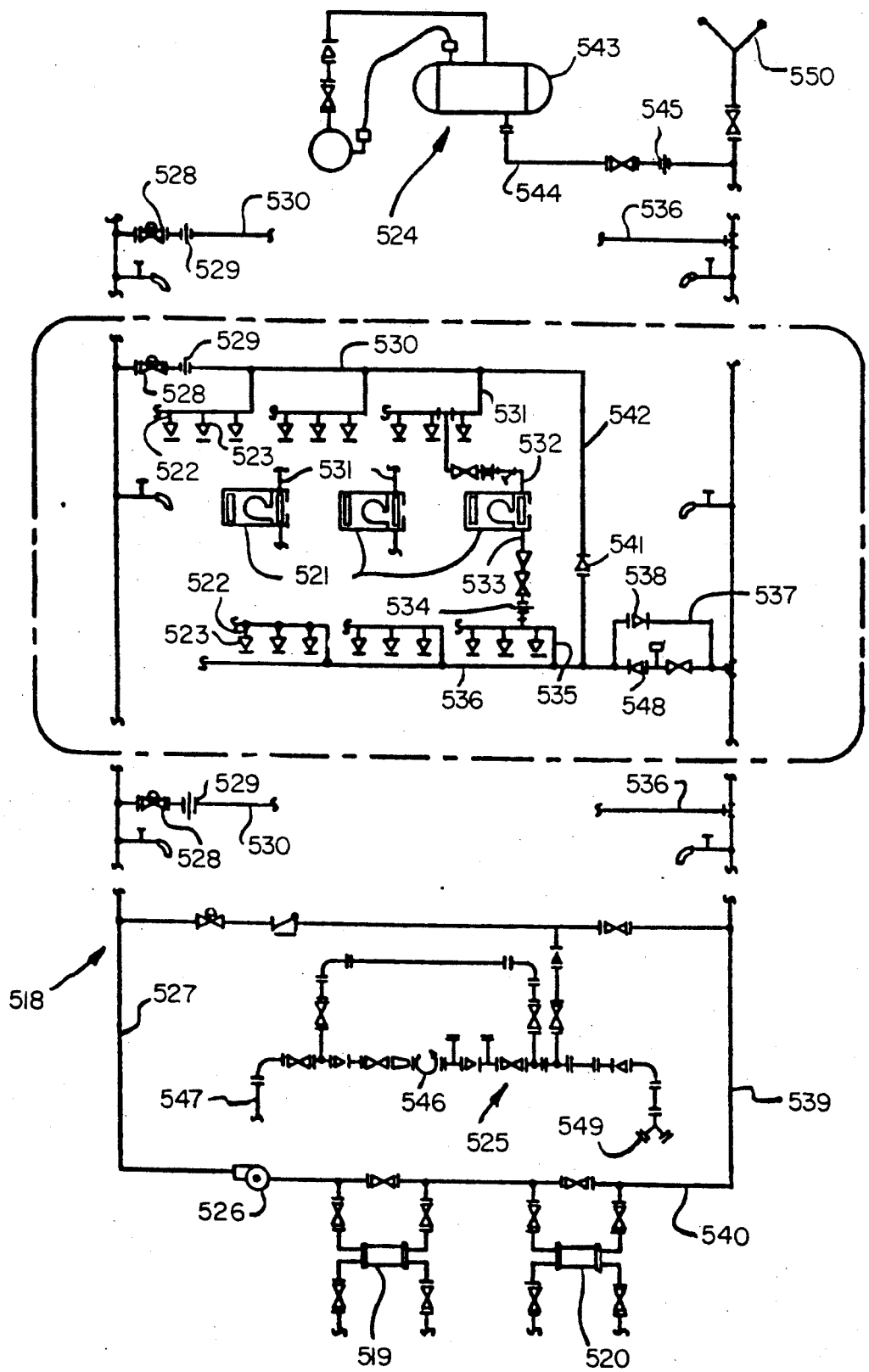
FIG. 23 is a fragmentary plan view showing another embodiment of a sprinkler system that can be used in the apparatus of FIGS. 1, 2, 6. 7, 8, 11, 14, 15, 22, 24, 25, 26, 27, 29 and 30.

Another sprinkler system according to the invention is indicated generally at 518 in FIG. 23. The sprinkler system 518 comprises a water chiller 519, a water heater 520, fan coil induction mixing boxes 521, sprinkler conduits 522, sprinkler heads 523, make-up apparatus indicated generally at 524 to maintain a constant heat transfer fluid pressure in the system in normal operation, means indicated generally at 525 for introducing water for fire purposes into the apparatus, a pump 526 and piping, valves, orifices and the like for circulating a heat transfer fluid to the induction boxes 521 in normal operation and water for fire purposes to the affected ones of the sprinkler heads 523 in fire mode.

The apparatus 518 serves a multi-story building; enough of the portion thereof for one floor to explain the operation is shown, enclosed within a broken line, together with fragments thereof for other floors. In normal operation, which is the same for all floors, the pump 526 causes a heat transfer fluid to flow through a supply line 527, valves 528, orifices 529, headers 530, conduits 531, supply pipes 532, the induction mixing boxes 521, return pipes 533, orifices 534, conduits 535, return headers 536, pipes 537 with check valves 538 therein, a return line 539, a pipe 540 and the heater 520 or the chiller 519 back to the pump 526. Check valves 541 prevent the flow of heat transfer fluid from the headers 530 through lines 542 to the return headers 536, forcing the flow, instead, through the induction boxes 521, as described.

The make-up apparatus 524 comprises a pressurized tank 543 which is connected by a pipe 544 to the return line 539. In normal operation, the pressure of the tank 543 is imposed on the heat transfer fluid in the return line 539 and there will be a minor flow of fluid from the tank 543 to the return line 539 or vice versa to accomodate minor losses of heat transfer fluid from the apparatus, expansion and contraction of the heat transfer fluid in the apparatus, and the like. If one of the sprinkler heads 523 is fused by a fire, heat transfer fluid flows from that head 523 at a comparatively rapid rate and, as make-up, from the tank 543 through the pipe 544 and through a restricting orifice 545 therein. A pressure drop across the orifice 545 is sensed by a sensor-controller (not illustrated), which then puts the apparatus 518 in fire mode by closing the valves 528, de-energizing the pump 526, energizing a fire pump 546 and setting valves in the means 525 so that fire water from a main 547 is delivered to the return line 539 from which it flows through one of the return headers 536, through a check valve 548 therein, and to the fused head or heads 523. The check valves 541 do not interfere with the flow of fire water from the side of the return line 539 through the lines 542. Water for fire purposes can also be introduced into the apparatus 518 through a siamese 549 or through a siamese 550.

Figure 24:
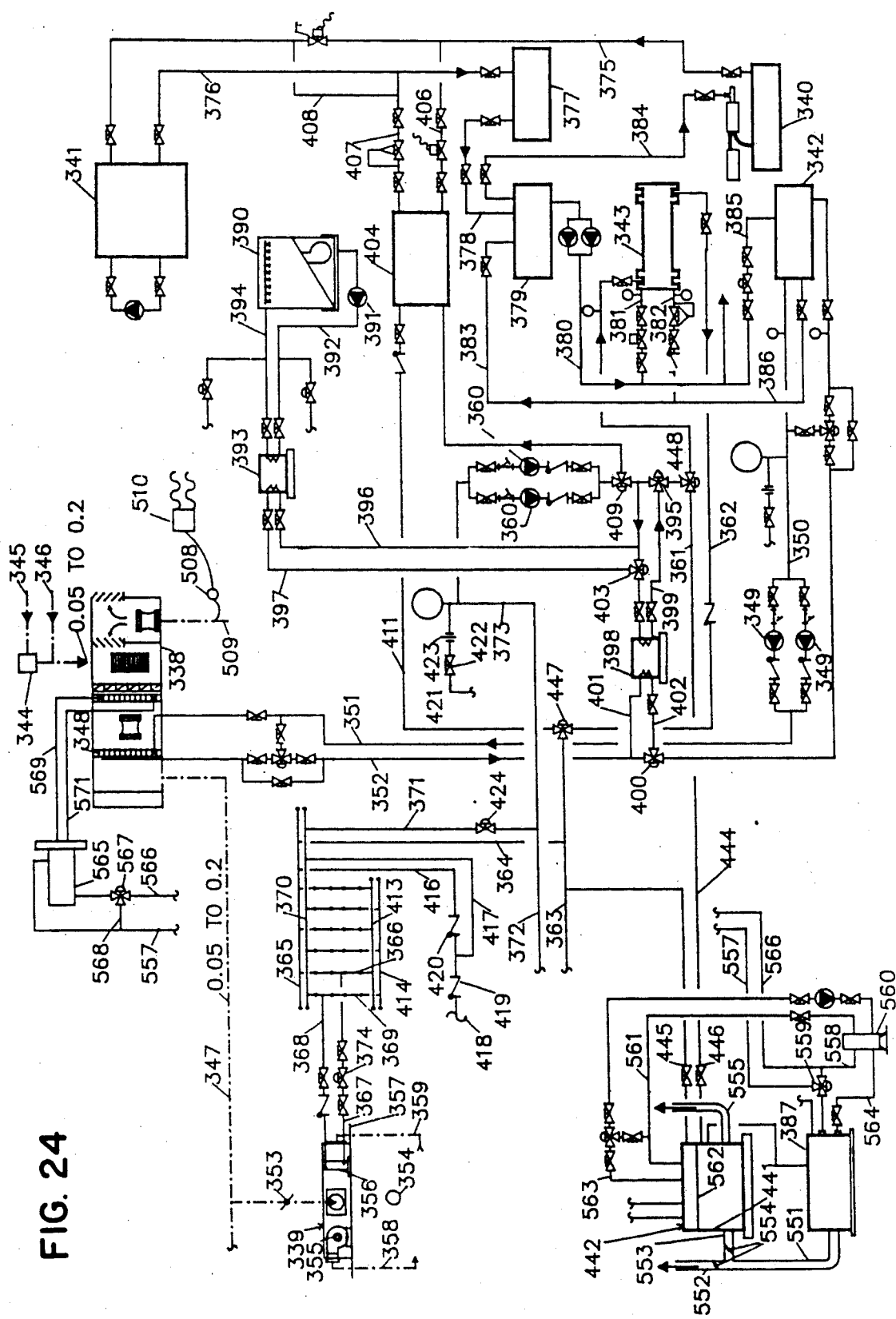
FIG. 24 is a fragmentary diagram of the apparatus of FIG. 14 showing connections for heating incoming air.

Referring to FIG. 24, which is a schematic diagram of the apparatus of FIG. 14 showing features which were omitted from FIG. 14, and from which certain features have been omitted to facilitate the showing of the new features, heat from both the exhaust gases and the jacket water from the engine-generator 387 can be transferred to the absorption refrigeration apparatus 442. The exhaust gases are discharged from the engine generator 387 through a stack 551, and are either vented through a discharge 552 or directed through a branch line 553 into heat exchange relationship with the absorption refrigeration apparatus 442, depending upon the setting of a damper 554. Exhaust gasses which are directed through the branch line 553, after having furnished heat to energize the apparatus 442, flow into and are vented from a stack 555. Jacket water leaves the engine-generator 387 through a line 556, and is directed into a line 557 or into a line 558, depending on the setting of a valve 559. On summer cycle when chilled water from the absorption apparatus 442 is required, the water is circulated through the line 558, a heat exchanger 560, a line 561, a heat exchange jacket 562 of the apparatus 442, a line 563, the heat exchanger 560 and a line 564 back to the engine-generator 387, providing energy for the apparatus 442. Whenever heat is required in the air handler 338, the valve 559 is set so that jacket water from the engine-generator 387 is circulated through the line 557, a sheet and tube heat exchanger 565, and a line 566 to the line 558, and then, as previously described, through the heat exchanger 560, the heat exchange jacket 562, the heat exchanger 560 and back to the engine-generator 387. A valve 567 is modulated, as required, to maintain a desired temperature; in one position, the valve 567 causes circulated jacket water to flow through the heat exchanger 565 while, in the other, it causes water to flow through a line 568, bypassing the exchanger 565. Jacket water flowing through the exchanger 565 heats a heat transfer fluid, for example ethylene glycol, which is circulated from the heat exchanger 565 through a line 569, a coil 570 in the air handler 338, and a line 571 back to the exchanger 565.

Figure 25:
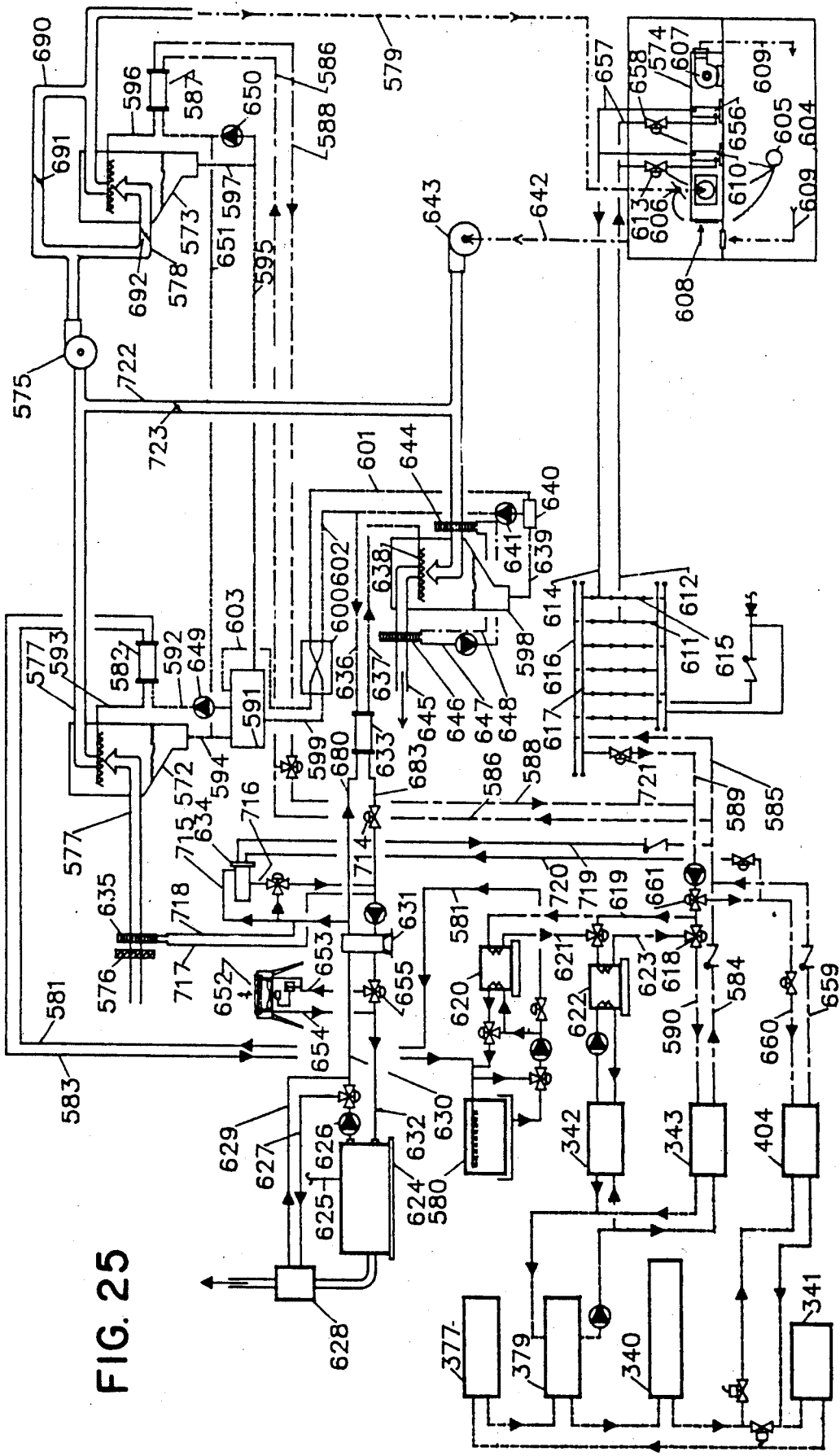
FIG. 25 is a schematic diagram of apparatus that is similar in function to that of FIGS. 14 and 24, except that heat from a cogenerator is used to regenerate a liquid desiccant, and the desiccant is used in two stages of chemical dehumidification to dehumidify air that is circulated to the space to be conditioned.

Apparatus shown in FIG. 25 is similar to that of FIG. 11, the main differences being that: the air handler 338 is not included in the FIG. 25 apparatus; dehumidifiers 572 and 573 have been added to perform the function of dehumidifying air; and, on day cycle, ice from the ice storage tank 342 can be used to provide chilled water for induction mixing boxes 574, one of which is shown in FIG. 25. The following elements of the FIG. 11 apparatus are included: the compressor 340, the evaporative condenser 341, the ice storage tank 342, the water chiller 343, the high pressure receiver 377, the low pressure receiver 379 and the heat recovery unit 404, all of which perform substantially the same as in the FIG. 11 apparatus, except as described below.

Ambient air is introduced into the apparatus of FIG. 2 by a blower 575, flowing through a filter 576, a duct 577 and the dehumidifier 572 and then into the blower 575, which discharges into a duct 578 from which the air flows through the dehumidifier 573, and then through a duct 579 to the induction boxes 574.

The apparatus also includes a cooling tower 580 from which evaporatively cooled water is circulated through a line 581 to a heat exchanger 582 and then through a line 583 back to the cooling tower 580. Chilled water from the water chiller 343 is circulated through lines 584, 585 and 586 to a heat exchanger 587 and then through lines 588, 589 and 590 back to the water chiller 343.

In operation, a desiccant, e.g., an aqueous lithium chloride solution, is circulated from a sump 591, through a line 592, the heat exchanger 582 and a line 593 from which it is sprayed in the dehumidifier 572 in contact with air flowing therethrough, returning by gravity through a line 594 to the sump 591. Similarly, the desiccant is circulated from the sump 591 through a line 595, the heat exchanger 587 and a line 596 from which it is sprayed in the dehumidifier 573 in contact with air flowing therethrough, returning by gravity through a line 597 to the line 595.

Desiccant in the sump 591 is maintained at a predetermined concentration, say 40 to 42 weight percent lithium chloride, by a regenerator 598 to which desiccant flows from the sump 591 through a line 599, a heat exchanger 600 and a line 601, and from which concentrated desiccant is returned to the sump 591, flowing through a line 602, the heat exchanger 600 and a line 603.

Typically, the dehumidifiers 572 and 573 can operate to condition ambient air, which may have a dry bulb temperature of 91° F. (33° C.) and a moisture content of 124 grains of water vapor per pound of dry air so that the air in the duct 577 has a dry bulb temperature of 94° F. (34° C.) and a moisture content of 42 grains of water vapor per pound of dry air, while the air in the duct 579 has a dry bulb temperature of 75° F. (24° C.) and a moisture content of 31 grains of water vapor per pound of dry air. A space condition of, say, 76° F. (24° C.) dry bulb temperature, 50 percent relative humidity (67 grains of water vapor per pound of dry air), is maintained by controlling the rate at which air from the duct 579 is delivered to each of the spaces served by the apparatus (one space, designated 604, is shown in FIG. 25) to maintain humidity, and by controlling the temperature, as subsequently explained, at which a mixture of air from the duct 579 and recirculated air is delivered to the space. A thermostat-humidistat controller 605 controls a damper 606 to vary the rate at which air from the duct 579 is delivered to each of the spaces 604. The rate may vary between 0.1 and 0.2, or even 0.3 cubic foot per minute per square foot of floor space in a given zone; the controller 605 opens the damper 606 incrementally whenever the humidity is too high and closes it incrementally whenever the rate is above the minimum required for ventillation and the humidity is too low.

Each of the induction mixing boxes 574 includes a blower 607 which induces a flow of air from a plenum, as indicated by an arrow 608, and delivers to the space 604 it serves a mixture of that induced air and conditioned air from the duct 579. The flow of induced air from the plenum into the induction box 574 causes a flow of air from the space 604 into the plenum; two arrows 609 indicate the delivery to the space 604 of a mixture of induced air and conditioned air and the flow of air from the space 604 into the plenum. Inside the induction mixing box 574, the mixture of conditioned air and induced air flows in heat exchange relationship with a coil 610. When the apparatus is in cooling mode, chilled water is circulated, as subsequently described in detail, to a sprinkler conduit 611. This water flows through a line 612, a control valve 613, the coil 610 and a line 614 back to a sprinkler conduit 615. The controller 605 also modulates the valve 613, closing it incrementally whenever the space temperature is below the control temperature, and opening it incrementally whenever the temperature is above.

A sprinkler main 616 is connected to the line 585 and to the sprinkler conduit 611, while a sprinkler main 617 is connected to the line 589 and to the sprinkler conduit 615. As a consequence, chilled water at, say, 58° F. (14° C.) from the water chiller 343 is delivered to the coils 610 for temperature control. Water in the line 589 returning from the coils 610 and from the heat exchanger 587 can be diverted by a valve 618 so that it flows through a line 619 to a heat exchanger 620, returning through a line 621 to a heat exchanger 622, and through a line 623 and the valve 618 to the line 590. Heat can be transferred in the heat exchanger 620, when conditions are appropriate, to evaporatively cooled water from the cooling tower 580, and more heat can be transferred in the heat exchanger 622 to ice in the ice storage tank 342. Accordingly, the compressor 340 can be operated on summer night cycle to produce ice that is used on summer day cycle to carry all or any part of the sensible load on the coils 610 and all or any part of the load on the heat exchanger 587.

The apparatus of FIG. 25 also includes an engine generator 624 which furnishes electricity as indicated at 625 to the pumps, blowers and the like of the apparatus, to the electrical service of the building it serves, or both. Heat from a cooling jacket (not illustrated) of the engine-generator 624 is transferred to water circulated by a pump 626 through a line 627, a heat exchanger 628, lines 629 and 630, a heat exchanger 631 and a line 632 back to the cooling jacket of the engine-generator 624.

In the heat exchanger 628, heat is transferred from exhaust gases from the engine-generator 624 to water circulated therethrough. In the heat exchanger 631, heat is transferred from the water circulated by the pump 626 to a heat transfer fluid that is circulated to a heat exchanger 633 and, on winter cycle, to a heat exchanger 634, and to a heating coil 635.

On summer day cycle, a part of the desiccant solution flowing in the line 602 is diverted, flowing through a line 636, the heat exchanger 633 and a line 637 to spray nozzles 638 from which it is sprayed in the regenerator 598 to remove water from desiccant therein, so that highly concentrated desiccant solution flows from the bottom of the regenerator 598 through a line 639 to a sump 640. It is to the sump 640 that dilute desiccant flows through the line 601, and from the sump 640 that a pump 641 delivers relatively concentrated desiccant solution to the line 602, as described. Relief air from the building served by the apparatus is delivered through a duct 642 to a blower 643, from which it is discharged through a heat exchanger 644 into the regenerator 598, leaving through a duct 645 and a heat exchanger 646. A heat transfer fluid is pumped from the heat exchanger 646 through a line 647 to the heat exchanger 644 and through a line 648 back to the heat exchanger 646 to recover heat from air leaving the regenerator 598 and to transfer that heat to air entering the regenerator 598.

The concentrated desiccant returned through the line 602 to the sump 591 may have a concentration of 42 percent by weight of lithium chloride, and may maintain a concentration of 40 percent by weight in the sump 591. A pump 649 delivers desiccant from the sump 591 directly to the line 592, so the concentration of the desiccant sprayed in the dehumidifier 572 is also 40 percent by weight. A pump 650 receives desiccant from the line 595, but this desiccant is a mixture of desiccant from the sump 591 and more dilute desiccant from the dehumidifier 573. As a consequence, the desiccant delivered to the line 596 may contain 38 percent by weight of lithium chloride; a part of this desiccant is sprayed in the dehumidifier 573, as previously described, while the rest is returned to the sump 591, flowing through a line 651 and the line 594.

Any excess heat from the engine generator, beyond that used by the apparatus of FIG. 25, as described above, can be rejected through a roof-mounted fan radiator 652 to which water circulated by the pump 626 can flow through a line 653, returning through a line 654. The rejection of heat in this manner can be controlled by a valve 655 which is modulated, as required, to prevent the temperature of the water from becoming excessively high.

It will be appreciated that the conditioned air delivered to the induction mixing boxes 574 when the FIG. 25 apparatus is operated as described above is essentially neutral air, so far as temperature control is concerned. That is, the air temperature is about the same as that to be maintained in the spaces it serves. Accordingly, when the rate at which conditioned air is delivered to any given one of the spaces is varied because of changes in the humidity load, the variations do not increase or decrease the sensible load that must be transferred to heat transfer fluid from circulated air in the coil or coils 610. The reason for this is that all of the air that enters the induction mixing boxes 574 is neutral so far as temperature control is concerned; when the rate at which conditioned air is delivered to any given one of the induction mixing boxes 574 increases, the rate at which plenum air is delivered thereto decreases correspondingly, so that the total flow of air into the induction box 574 remains constant. The apparatus of FIG. 25 is significantly different, in this respect, from that of FIGS. 11, 14, 15 and 24, where the conditioned air is both cold and dry, so that a change in the rate at which it is delivered to a given space changes the sensible load that must be carried by heat exchange from circulated air (which is recirculated air in those embodiments of the invention). However, as is subsequently explained in more detail, the apparatus of FIG. 25, as well as that of FIG. 27, can be operated so that the temperature of the dehumidified air which is circulated through the duct 579 to the induction mixing boxes 574 is above the temperature maintained in the spaces 604, for example, from the temperature maintained up to about 90° F. (32° C.).

Because the conditioned air delivered by the apparatus of FIG. 25 is relatively warm, insulated ducts are not required for the circulation thereof; the air is not capable of causing condensation. Indeed, the conditioned air can be delivered from a riser of a multistory building to a header on each floor, and can then be circulated as required for a given floor through a cellular deck, for example of the type shown in U.S. Pat. Nos. 3,013,397 and U.S. Pat. No. 3,148,727.

The induction mixing box 574 of the FIG. 25 apparatus also includes a unitary heat pump 656 which has a heat exchange coil (not separately illustrated) between the coil 610 and the blower 607, a compressor (not separately illustrated) and a condenser or evaporator (not separately illustrated). Two lines 657 operably connect the condenser or evaporator of the heat pump 656 to the lines 612 and 614; when a valve 658 is opened by the controller 605, water flowing through the lines 657 constitutes a heat source or a heat sink for the condenser or evaporator of the heat pump 656, returning to the line 614 after it has served its purpose in the heat pump 656. There are times when the cooling tower 580 provides all of the cooling that is required by most zones of the building served by the apparatus of FIG. 25, but is not quite adequate for a few of the zones. At these times, water from which heat has been transferred by the cooling tower 580 can be circulated to the induction mixing boxes 574, and, under the control of the thermostat-humidistat controllers 605, the heat pumps 656 can be energized to pump heat from the heat exchange coils of the heat pumps 656 which serve the zones where additional cooling is required. When such additional cooling is required, it is important to prevent condensation on the evaporator of the heat pump 656. To that end, it is desirable that the thermostat-humidistat controller 605 include a humidistat (not illustrated) which senses the humidity of the air between the heat pump 656 and the blower 607, and de-energizes the heat pump 656, opens the damper 606, or both, whenever that relative humidity exceeds 70 percent.

When the compressor 340 is operating to produce ice in the storage tank 342 and heat is required by the building served by the apparatus of FIG. 25, water that has been heated by heat from the heat recovery unit 404 can be circulated through a line 659 to the line 585 and then, as described above, to the coils 610, returning to the heat recovery unit from the line 589 through a line 660. In this mode of operation, a valve 661 is positioned so that all of the fluid returning in the line 589 is directed into the line 660; as a consequence, there is no fluid flow in the line 619 or in the line 590, and there is no heat transfer from the circulating system to the water chiller 343, to the storage tank 342 or to the cooling tower 580. The heat pumps 656, in this mode of operation, can be operated to pump heat from the fluid circulated thereto through the lines 657 if additional heating is required in the zones served by some of the induction mixing boxes 574.

Figure 26:
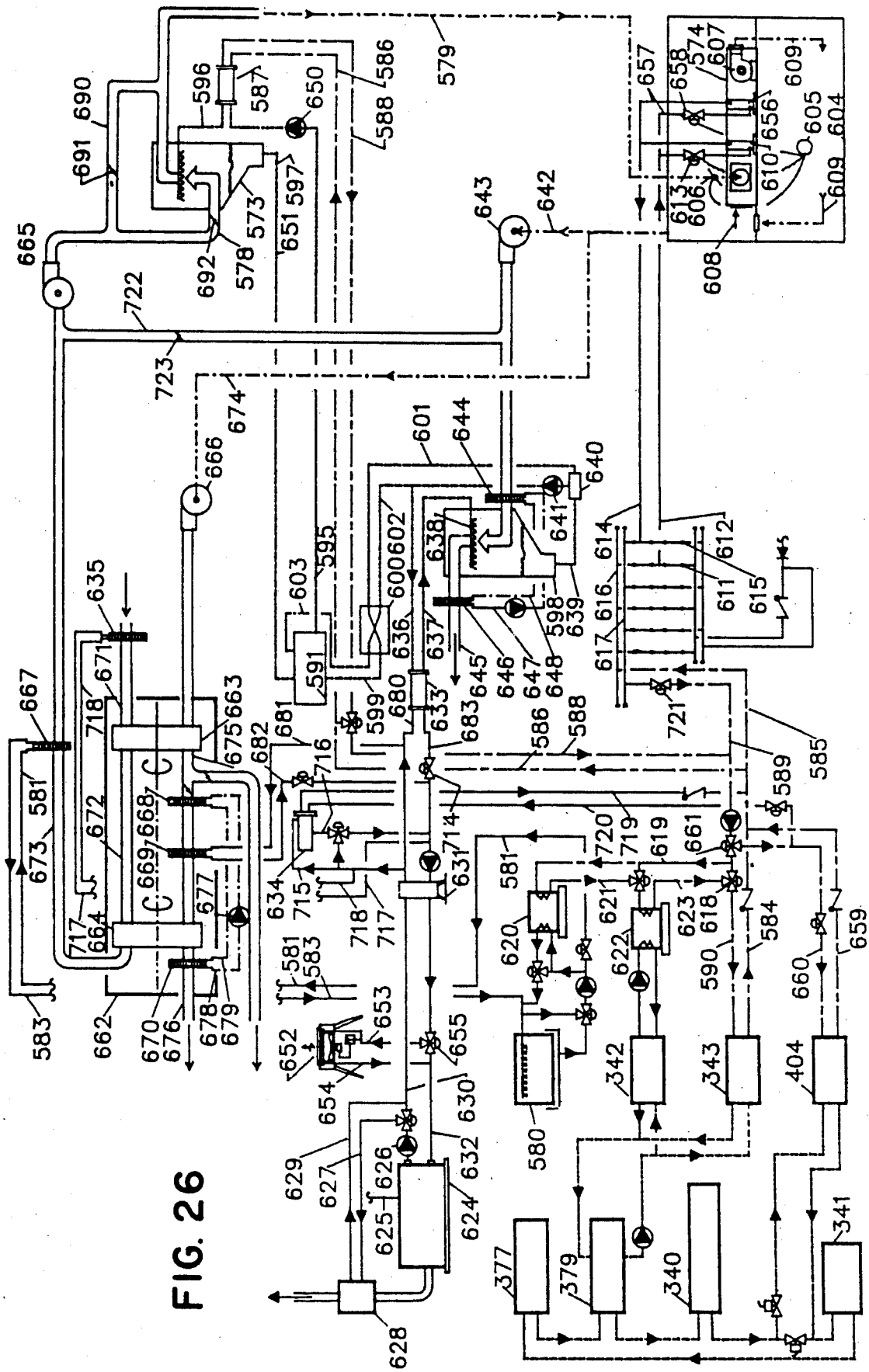
FIG. 26 is a schematic diagram of apparatus that is similar to that of FIG. 25, except that the first stage of chemical dehumidification uses a solid desiccant.

The apparatus of FIG. 26 is identical in most respects with that of FIG. 25, the principal difference being that the FIG. 25 dehumidifier 572 has been replaced, in the FIG. 26 apparatus, by a solid desiccant dehumidifier indicated generally at 662. The dehumidifier 662 comprises two desiccant wheels 663 amd 664, two blowers 665 and 666, and heat exchangers 667, 668, 669 and 670. In operation, the desiccant wheels 663 and 664 rotate slowly, while air to be dehumidified enters a conduit 671, flows through a segment of the desiccant wheel 663, through a conduit 672, through a segment of the desiccant wheel 664, through a conduit 673 into the blower 665 and into the conduit 578. The air is dehumidified when it flows through each of the wheels 663 and 664, as just described, by contact with a solid desiccant, e.g., activated alumina, silica gel or lithium chloride on a paper carrier. For example, ambient air may enter the conduit 671 at a dry bulb temperature of 93° F. (34° C.) and a moisture content of 105 grains of water vapor per pound of dry air, leave the desiccant wheel 664 at a dry bulb temperature of 104° F. (40° C.) and a moisture content of 56 grains of water vapor per pound of dry air, be cooled by the heat exchanger 667 to a dry bulb temperature of 91° F. (33° C.) with no change in moisture content, and leave the dehumidifier 573 at a dry bulb temperature of 75° F. (24° C.) and a moisture content of 31 grains of water vapor per pound of dry air. In the heat exchanger 667 heat is transferred from the dehumidified air to evaporatively cooled water which is circulated from the cooling tower 580 through the line 581 to the heat exchanger 667 and through the line 583 back to the cooling tower 580.

Relief air from the building served by the dehumidifier 662 is used for regeneration, entering the blower 666 from a conduit 674, flowing through a segment of the desiccant wheel 663, through a conduit 675, through a segment of the desiccant wheel 664, and through a conduit 676 from which it is vented to the atmosphere. A heat transfer fluid is circulated by a pump 677 from the heat exchanger 670 to the heat exchanger 668 and back, the flow being through lines 678 and 679; as a consequence, heat is transferred from air leaving the regeneration side of the dehumidifier to air that is about to flow in regenerating relationship with the desiccant of the wheel 664. In addition, heat transfer fluid is circulated through the heat exchanger 669, flowing thereto from the heat exchanger 631 through lines 680 and 681, and returning to the heat exchanger 631 through lines 682 and 683. In this way, heated water circulated by the pump 626 furnishes the heat required for the regeneration of the wheel 664.

Figure 27:
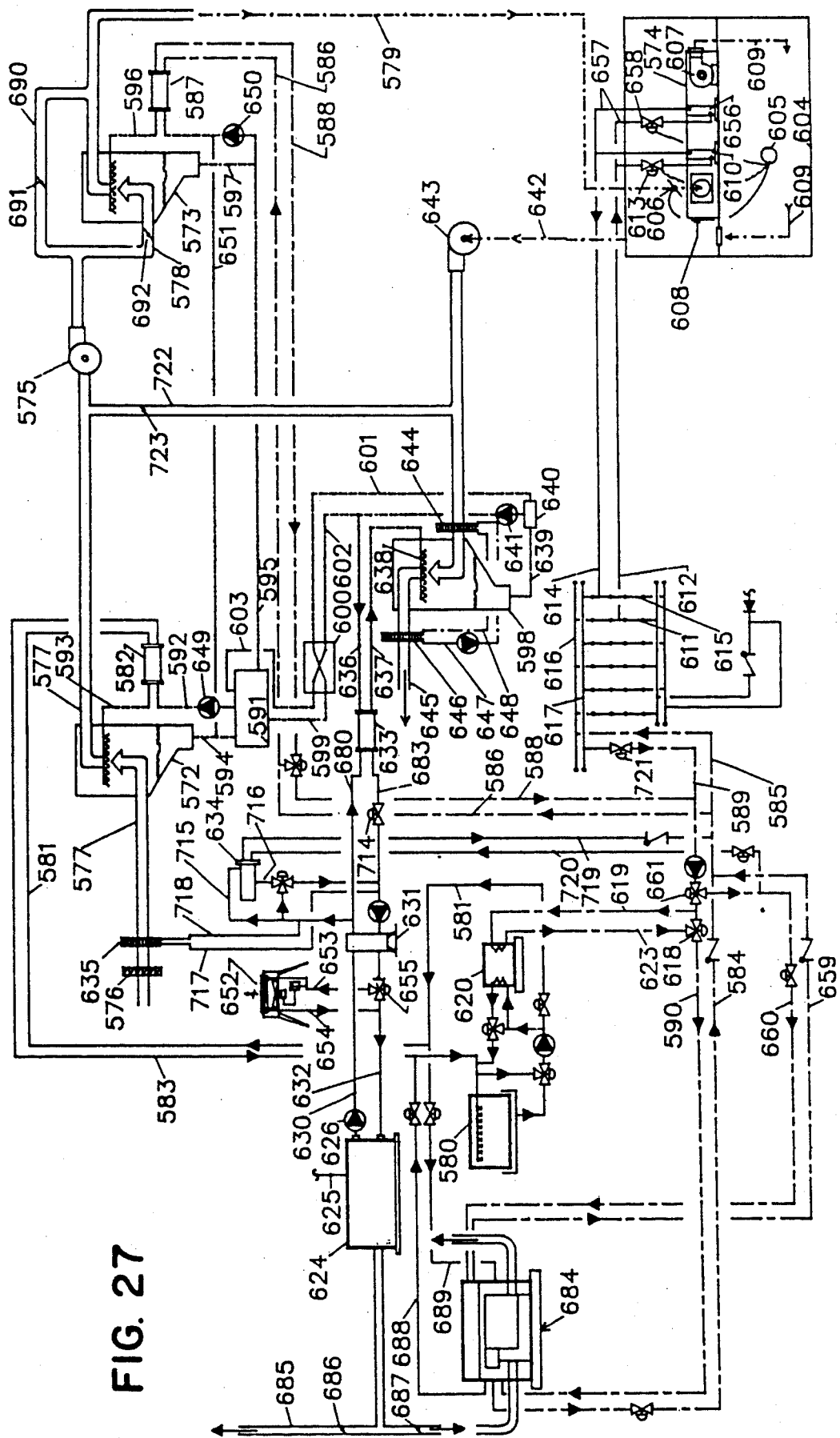
FIG. 27 is a schematic diagram of apparatus in which a heat engine drives an electric generator and furnishes heat both to regenerate a chemical desiccant and as an energy source for absorption refrigeration apparatus.

The apparatus of FIG. 27 is similar to that of FIG. 25, differing in that the compressor 340, the evaporative condenser 341, the ice storage tank 342, the water chiller 343, the high pressure receiver 377, the low pressure receiver 379 and the heat recovery unit 404 of the FIG. 25 apparatus have all been omitted from that of FIG. 27, while absorption refrigeration apparatus indicated generally at 684 has been added. Exhaust gases from the engine-generator 624 are either vented from a stack 685 or circulated through the absorption apparatus 684 to furnish energizing heat, depending on the positions of dampers 686 and 687. On summer cycle heat from the absorption apparatus 684 is rejected in the cooling tower 580, being transferred thereto by water circulated to the apparatus 684 through lines 688 and 689, while chilled water from the apparatus 684 is delivered to the line 584, used as previously described, and returned to the apparatus 684 through the line 590.

When the ambient conditions are such that the cooling tower 580 is capable of providing water at a temperature of 64° F. (18° C.) or lower, the dehumidifier 572 of FIGS. 25 and 27 is capable of producing air having a dry bulb temperature of about 90° F. (32° C.) and a moisture content of 31 grains of water vapor per pound of dry air; as a consequence, it is not then necessary for air discharged from the dehumidifier 572 to be conditioned in the dehumidifier 573. To take advantage of this situation, the apparatus includes a duct 690 which connects the duct 578 and the duct 579, by-passing the dehumidifier 573. Dampers 691 and 692 in the ducts 690 and 578 can be set to direct all or any part of the air leaving the dehumidifier 572 into the duct 690. Since the heat associated with dehumidification is transferred to cooling tower water from the dehumidifier 572 and is transferred to chilled water from the dehumidifier 573, it is usually economically advantageous to use the dehumidifier 572 to perform as much dehumidification as possible, and to minimize the use of the dehumidifier 573.

Sensible cooling of the dehumidified air of the apparatus of FIGS. 25 and 27 is also possible, and is frequently advantageous. This can be done by a cooling coil (not illustrated) positioned in heat transfer relationship with air in at least one of the ducts 577, 578, 579, and 690. Heat can be transferred from the cooling coil to water flowing in the lines 583 and 581 to and from the cooling tower 580 or to chilled water flowing in the lines 586 and 588. Relatively high temperature dehumidified air, however, is desirable, as discussed above, because insulated ducts are not required to prevent condensation. Accordingly, it is usually preferred that the temperature of the air in the duct 579 be from about 58° F. (14° C.) to about 90° F. (32° C.).

It will be appreciated that the apparatus of FIGS. 25-27 has an advantage which the apparatus of FIGS. 11, 14, 15 and 24 lacks, namely, that the primary air is dehumidified, but relatively warm, so that its distribution does not necessitate the use of insulated ducts. Conversely, the apparatus of FIGS. 11, 14, 15 and 24 has an advantage which the apparatus of FIGS. 25-27 lacks; that advantage is minimum first cost in the case of the apparatus of FIG. 15, and, in the case of the apparatus of FIGS. 11, 14 and 24, the ability to produce ice at night with low cost energy and to use the ice during the day to carry a substantial portion of the air conditioning load. An air handler indicated generally at 693 in FIG. 28 enables the use of ice or direct expansion refrigeration apparatus to produce extremely dry air at a sufficiently high temperature that it can be distributed in uninsulated ducts.

Return air from apparatus served by the air handler 693 flows through a return duct 694 and a return blower 695, while ambient air flows through a duct 696 and a louver 697 into the air handler 693. Some of the air from the blower 695 can be vented as relief air, leaving through an outlet 698, while the rest flows through vanes 699 and is mixed with ambient air. The mixture flows through the air handler in heat exchange relationship with coils 700 and 701, through a supply blower 702, in heat exchange relationship with a coil 703, and then exits in a duct 704. A pump 705 causes a heat transfer fluid to flow through a line 706, the coil 700, a line 707 and the coil 703 and back to the pump 705. The coil 701 is cooled to a low temperature, say 36° F. (2° C.); as a consequence, heat transfer fluid circulated by the pump 705 is cooled in the coil 703, transferring heat to conditioned air which enters the duct 704, and is warmed in the coil 700, heat being transferred thereto from the mixture of return air and ambient air. The air in the duct 704 should be at a temperature of at least about 58° F. (14° C.) so that insulation is not required on risers, headers, ducts and the like in which it is distributed. A safe temperature can be achieved by sizing the apparatus so that the temperature of the air in the duct 704 is about half way between the temperature, say 86° F. (30° C.), of the mixture of ambient air and return air, and the temperature, say 45° F. (7° C.), of the air leaving the blower 702. The coil 701 is served by lines 708 and 709 through which a heat transfer fluid that has been cooled by heat transfer to stored ice as in the apparatus of FIGS. 11 and 14 is circulated, or through which a refrigerant can be so circulated, in which case the coil 701 is a direct expansion coil as in the FIG. 15 apparatus.

Three way valves 710 and 711 in the lines 706 and 707 can be used to divert coolant so that, instead of flowing through the coil 700, it flows through a line 712 to other apparatus (not illustrated in FIG. 28), returning, after heat transfer thereto in the other apparatus, through a line 713 and the valve 711 to the line 707 and the coil 703. For example, the lines 712 and 713 can be connected so that heat is transferred to the heat transfer fluid circulated therethrough from the water which flows through the coils 356 of the apparatus of FIGS. 11, 14 and 24.

On winter cycle, heated fluid in the lines 680 and 683 is not required in the heat exchanger 633 of the apparatus of FIGS. 25-27, because there is no need to regenerate desiccant. Accordingly, a valve 714 can be closed, and the heat transfer fluid can flow through lines 715 and 716 to serve the heat exchanger 634 and through lines 717 and 718 to serve the heater 635. Heated fluid from the heat exchanger 634 flows through lines 719 and 720 to and from the lines 589 and 585 to serve the heat exchange coils 610, the unitary heat pumps 656, or both, in the induction mixing boxes 574, the flow being as previously described.

It will be observed that there is a valve 721 in the line 589. This valve can be kept closed to prevent any possibility of condensation on the sprinkler headers 616 and 617, on the conduits 611 and 612, on the coils 610, and the like, except when a signal from a humidistat (not illustrated in FIGS. 25-27) indicates that the humidity is sufficiently low that there is no chance of condensation. A single humidistat can be used for an entire building, or for each humidity zone of the building.

The apparatus of FIGS. 25 and 27 can be modified by elimination of the chemical dehumidifiers 572 and 573, and of the duct 579, and substitution therefor of the direct expansion compression refrigeration apparatus of FIG. 15 which includes the compressor 450, and the associated equipment, including the line 459, the evaporative condenser 341, the line 460, the coil 348, the air handler 338, the line 461 and the duct 347. The modified apparatus supplies cold dehumidified air to the duct 347.

As has been indicated above, in the apparatus of FIGS. 25–27, return air from the duct 642 enters the blower 643 from which regenerating air is discharged into the regenerator 598. While only one space 604 is shown, it will be appreciated that the return air in the duct 642 is from all of the spaces served by the air conditioning apparatus. Similarly, only a part of the return air ordinarily flows through the regenerator 598 as relief air, while recirculation air flows through a duct 722 into the duct 577 on the suction side of the blower 575. The rate of flow of recirculation air through the duct 722 is controlled by a damper 723. Typically, a mixture of partially dehumidified outside air and recirculation air may enter the blower 575 at rates, respectively, of up to 0.13 and up to 0.12 cubic foot per minute per square foot of floor space. Relief air at a rate of up to 0.13 cubic foot per minute per square foot of floor space (the same rate at which partially dehumidified outside air enters the blower 575) is discharged through the regenerator 598 or, in the case of the apparatus of FIG. 26, through the regenerator 598, through the duct 676, and through a duct 724 which provides a by-pass around the dehumidification apparatus 662.

Figure 29:
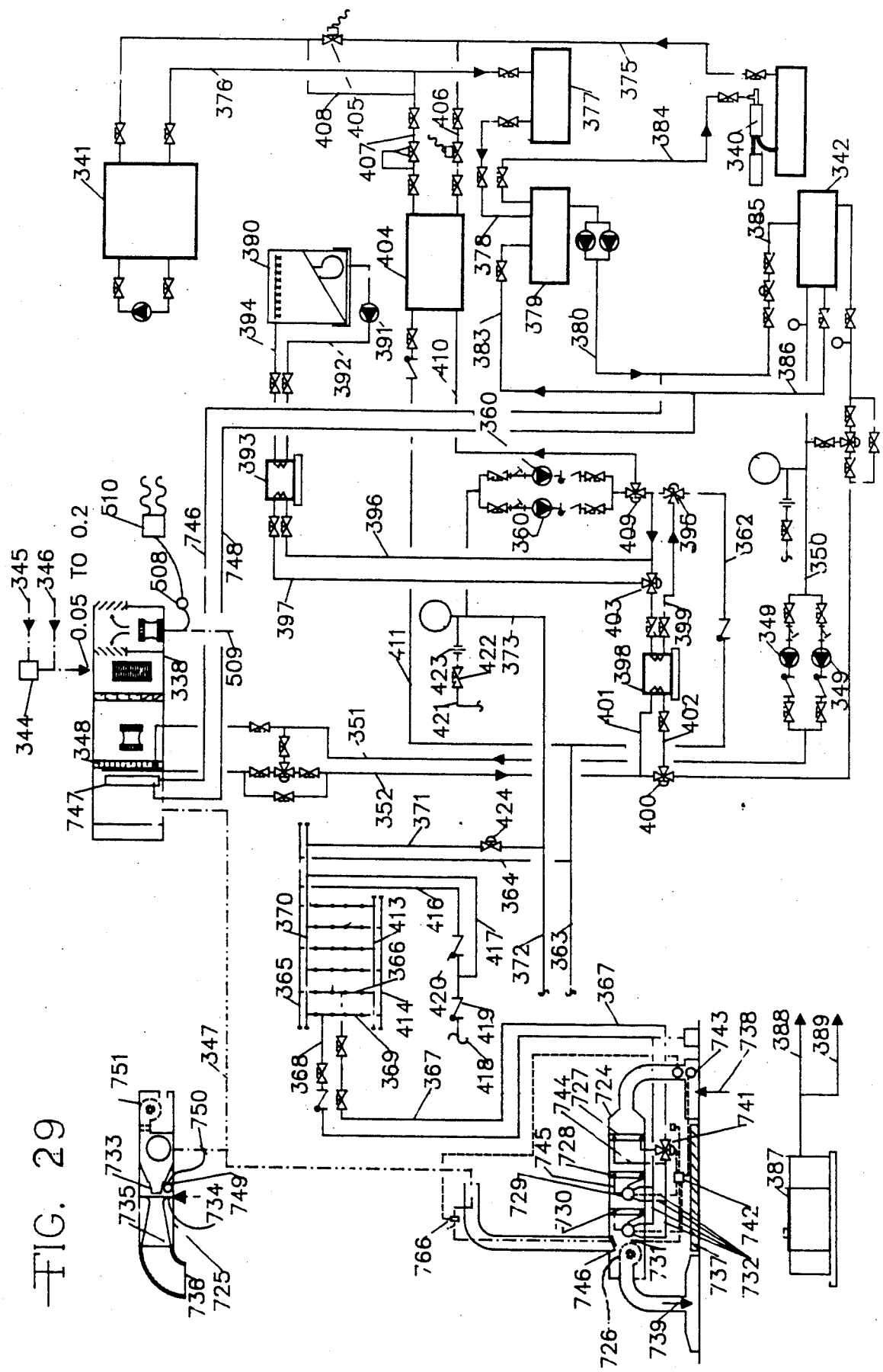
FIG. 29 is a schematic diagram showing apparatus similar to that of FIG. 11, differing mainly in that it includes induction mixing boxes of two different kinds.

The apparatus of FIG. 29 includes most of the elements of the apparatus of FIG. 11, as is indicated by the use of the same reference numerals, including the air handler 338 and the refrigeration apparatus which comprises the compressor 340, the evaporative condenser 341 and the evaporator which serves the ice storage tank 342; this evaporator operates to produce ice, usually on night cycle when the building served by the apparatus is unoccupied, while a second evaporator, as subsequently explained in detail, operates on day cycle at times when the electric utility does not impose a demand charge.

Outside air can be directed through or by-passed around the indirect evaporative cooler 344, as indicated by the arrows 345 and 346, before it is conditioned in the air handler 338 and distributed through risers (not illustrated) and ducts 347 (one of which is shown in FIG. 29) to the building. In the air handler 338, in one mode of operation, air is conditioned by contact with the coil 348 a dry bulb temperature of substantially 42° F. (6° C.). Ice water from the ice storage tank 342 at, say 38° F. (3° C.) is circulated by the pumps 349, flowing through the line 350, the pumps, 349 line 351 the coil 348 and the line 352 back to the tank 34. The flow of ice water through the coil 348 is modulated to maintain the 42° F. (6° C.) temperature of the conditioned air leaving the air handler 338. Whenever the ambient air has a low moisture content, it is economically desirable to use the indirect evaporative cooler 344 and, thereby, to reduce the requirement for ice water in the coil 348.

Conditioned air from the ducts 347 is delivered to induction mixing boxes 724 which serve perimeter zones and induction mixing boxes 725 which serve interior zones at a rate which is caused to vary as required by the air conditioning load in the spaces served by the induction mixing boxes 724 and 725. The induction boxes 724 are of the "fan/coil" type, having constant speed fans 726 and coils 727; they are also of the unitary heat pump type, having coils 728 to which heat can be pumped from condensers 729 of first heat pumps and coils 730 from which heat can be pumped to evaporators 731 of second heat pumps. Lines 732 connect the condensers 729 and the evaporators 731 to the lines 358 and 368. The induction mixing boxes 725 have a plurality of induction nozzles 733, one of which is shown in FIG. 29, through which conditioned air from the ducts 347 flows, inducing a flow of recirculated air from the space or from a plenum, as indicated by an arrow, through induced air inlets 734. The recirculated air mixes with the conditioned air in mixing portions 735 of the induction boxes 725, so that it is a mixture of conditioned air from the ducts 347 and recircullated air that is delivered to the space from discharge ends 736 of the boxes 725.

The fans 726 of the induction mixing boxes 724 have a capacity greater than the maximum flow of conditioned air to the boxes 724; as a consequence, air is caused to flow from a space served thereby into each of the induction boxes, where it is mixed with conditioned air. The mixture of air from the space and conditioned air is returned to the space from the fan discharge. The spaces served by the induction mixing boxes 724 are below, while the boxes 724 are above, ceilings 737. The air flow described above is indicated in FIG. 29 by arrows 738 and 739, the latter representing the flow of a mixture of conditioned air and recirculated air from one of the induction mixing boxes 724 and the former representing the flow of air from the space into the induction box 724.

Either chilled heat transfer fluid or evaporatively cooled heat transfer fluid is delivered to the boxes 724, being circulated by the pumps 360 through the line 362, the main header 363, the supply line 364, the header 365 of the first sprinkler grid, one of the several sprinkler conduits 366 of the first sprinkler grid, and the supply line 367, to the induction mixing boxes 724 and returning through the return line 368, one of the several sprinkler conduits 369 of the second sprinkler grid, the header 370 of the second sprinkler grid, the return line 371, the main return 372 and the line 373 back to the pumps 360. The heat transfer fluid circulated as just described is either chilled in the heat exchanger 398 by heat transfer therefrom to fluid flowing in the line 352 from the coil 348 to the ice storage tank 342 or is evaporatively cooled by heat transfer therefrom in the heat exchanger 393 to water that has been cooled in the evaporative cooler 390. When chilled water is delivered to the induction boxes 724 it is circulated through the coils 727, and is at a comparatively high temperature, sufficiently high that moisture is not condensed when room air at design conditions flows over the coils 727. In a typical instance, the water in the coils 727 will be at 58° F. (14° C.), and the room air will be at 75° F. (24° C.) and 50% relative humidity. In this mode of operation, dampers 740 can be modulated as desired to control the flow of conditioned air from the ducts 347 into each of the induction mixing boxes 724, and valves 741 can be modulated by controllers 742 to maintain the temperature sensed by thermostats 743 within control limits. While the induction boxes 724 are opperating as just described, cooling will often be required in some perimeter zones of a building while heating is required in others. This can occur because of a solar load that is imposed on different perimeter zones at different times of the day, because of differences in occupancy, or because of differences in the use of lights or of heat generating electronic apparatus, to mention a few of the possibilities. The boxes 724 are well suited to handle this situation because heat pumps associated with the condensers 729 can be energized where heat is required, and the valves 741 can be set so that the 58° F. (14° C.) water by-passes the associated coils 727; a heat transfer fluid is then circulated from the condensers 729 through lines 744, through the coils 728 and through lines 745 back to the condensers 729 so that heat is pumped from the circulated heat transfer fluid to the recirculated air where required. The induction boxes 724 can be operated in the same way when ambient conditions are such that evaporatively cooled heat transfer fluid is available at 58° F. (14° C.).

It is sometimes desirable to circulate evaporatively cooled heat transfer fluid to the induction mixing boxes 724 even when ambient conditions are such that the temperature thereof is higher than 58° F. (14° C.). For example, if the building served by the apparatus of FIG. 29 is occupied during a part of the time when the electric utility imposes no demand charge, it is less costly to use electricity during that time to carry the air conditioning load than it is to use stored ice. This can be done by circulating an evaporatively cooled heat transfer fluid to the induction boxes 724 and using the heat pumps associated with the condensers 729 or those associated with the evaporators 731 to pump heat to or from the recirculated air. Whenever the building is occupied at a time when the electric utility imposes no demand charge, it is also more energy efficient, by comparison with the use of ice for the purpose, to circulate refrigerant from the low pressure receiver 379 through a line 746 to a DX coil 747 in the air handler 40 and through a line 748 back to the low pressure receiver 379; in this mode of operation, the 42° F. (6° C.) air that is delivered through the duct 347 is produced by contact with the DX coil 747. During the time that there is a demand charge, then, ice produced during night cycle is used to provide a heat transfer fluid at 38° F. (3° C.) that is circulated from the ice storage tank 342 through the line 351 to the coil 348 in the air handler 338, returning through the line 352 and the heat exchanger 398 to the ice storage tank 342; heat is transferred in the exchanger 398 from fluid circulated by the pumps 360 to maintain its temperature at substantially 58° F. (14° C.). The extra friction introduced into the system by the DX coil 747 must be taken into account in determining whether or not there is a net saving in energy as a consequence of its use; it will often be preferable to save the energy necessary to overcome the friction rather than to save energy by using the DX coil.

A temperature sensor and controller 749 controls a damper 750 to vary the rate at which conditioned air from the ducts 347 enters each of the induction mixing boxes 725 as required to maintain a desired temperature within each of the interior spaces, the minimum damper position being one which provides the minimum ventilation air. As long as the rate of flow of conditioned air into and through the induction boxes 725 is sufficiently high, an adequate flow of recirculated air is induced to flow without the need for a blower 751 to be energized. Whenever the flow of conditioned air is inadequate to cause the required induction in any of the boxes 725, the blower 751 is energized to provide an adequate circulation of air at a temperature sufficiently high that it does not cause discomfort. As is subsequently explained in more detail, air from the blowers 751 by-passes the induction nozzles 733 in the boxes 725 but, in other functionally equivalent induction mixing boxes, blowers can discharge through induction nozzles; back draft dampers (not illustrated in FIG. 29) prevent the flow of air except as described.

Figure 30:
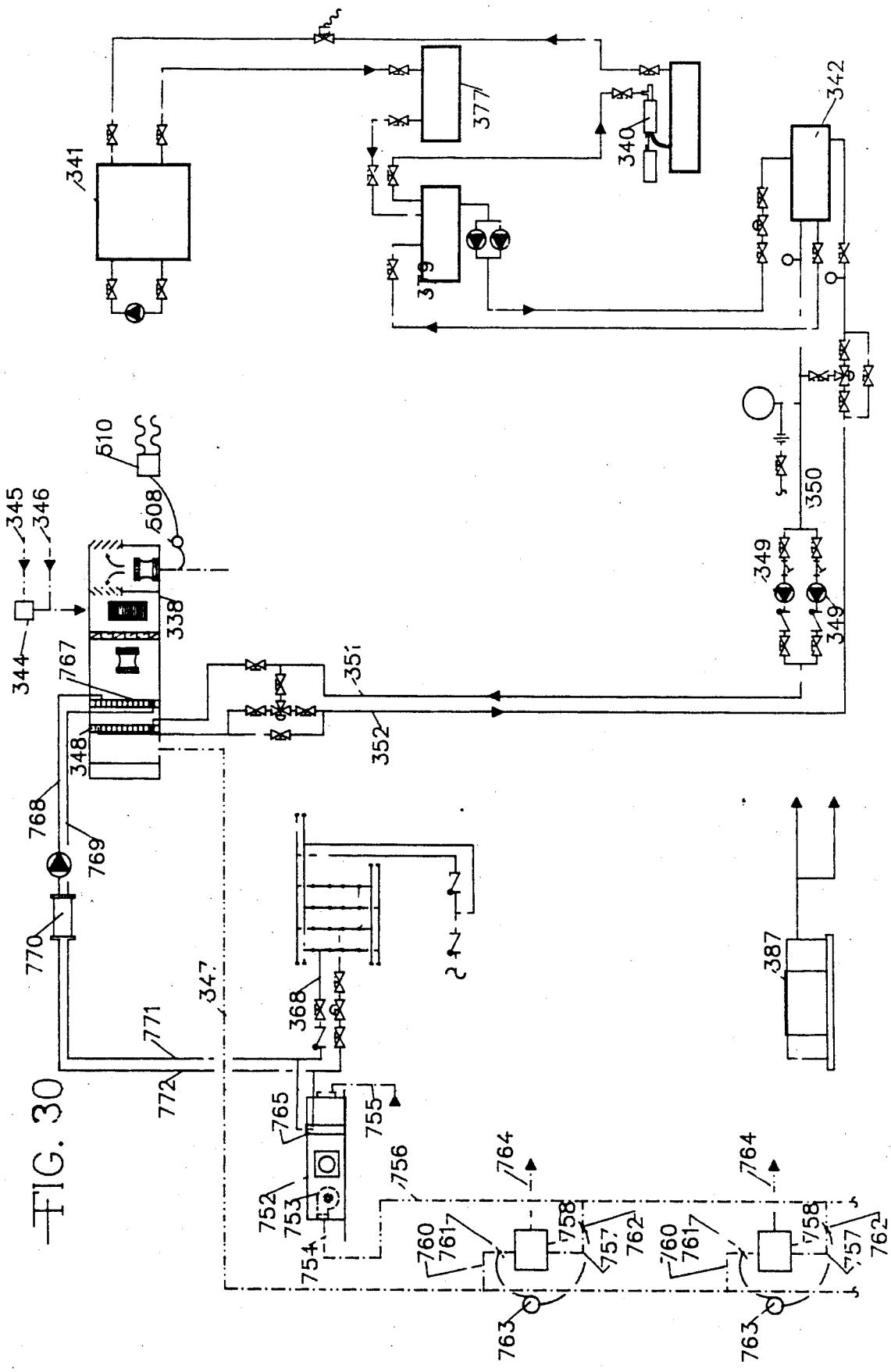
FIG. 30 is a schematic diagram showing apparatus similar to that of FIG. 29, but including an induction box and mixing boxes instead of the two kinds of induction mixing boxes of the FIG. 29 apparatus.

The apparatus of FIG. 30 includes some of the elements of the apparatus of FIG. 11, as is indicated by the use of the same reference numerals, including the air handler 338, and the refrigeration apparatus which comprises the compressor 340, the evaporative condenser 341 and the evaporator which serves the ice storage tank 342; this evaporator operates to produce ice on night cycle or whenever the electric utility does not impose a demand charge.

Outside air can be directed through or by-passed around the indirect evaporative cooler 344, as indicated by the arrows 345 and 346, before it is conditioned in the air handler 338 and distributed through risers (not illustrated) and ducts (one of which is shown in FIG. 30, designated 347) to the building. In the air handler 338, air is conditioned by contact with the coil 348 to a dry bulb temperature of substantially 42° F. (6° C.), as described with reference to FIG. 11.

The FIG. 30 apparatus comprises a plurality of induction boxes 752, each of which is substantially identical with the previously described induction mixing boxes 339 of FIGS. 11, 14, 15, 22 and 24-27, but receives no conditioned air, and is sized to serve a plurality of zones of the building, often an entire floor. Each of the induction boxes 752 has a blower 753 which discharges air, as indicated by a head 754 of an arrow, which it induces to flow, as indicated by a tail 755 of an an arrow, from an adjacent space. The discharge of air from the induction boxes 752 is into an associated duct 756, from which it is available through ducts 757 to each of a plurality of mixing boxes 758, which are of the dual duct type. Conditioned air from the ducts 347 is delivered through a duct 759 and ducts 760 to the mixing boxes 758. The proportions in which conditioned air from the ducts 347 and air from the ducts 757 enter the mixing boxes 758 are controlled, respectively, by dampers 761 in the ducts 760 and dampers 762 in the ducts 761. The dampers 761 and 762 serving each of the mixing boxes 758 work in opposition under the control of thermostat-controllers 763 so that a substantially constant volume, variable temperature flow of air is delivered through air inlets 764 to the building zone served by each.

The apparatus of FIG. 30, operated as described in the preceding paragraph, requires more dehumidified air for temperature control than is necessary for humidity control, so that there is an operating cost penalty by comparison with the same apparatus operated so that only the amount of dehumidifed air required for humidity control is used. However, there are both first cost and operating cost advantages by comparison with the conventional system described above where air cooled to about 55° F. (13° C.) is distributed as required for temperature control.

There are coils 765 in the induction boxes 752. On winter cycle, a warm heat transfer fluid can be circulated through the coils 765 so that warm air is available to the mixing boxes 758 as required for heating. The warm heat transfer fluid can be circulated from a heat exchanger (not illustrated) served, as required, by a boiler (not illustrated) through the building sprinkler system to each of the coils 765 and back to the heat exchanger.

As has been stated above, the dampers 740 of the apparatus of FIG. 29 can be controlled in any suitable manner. A particularly desirable way to control these dampers is by means of controllers 765 which modulate the dampers 740 to keep the humidity sensed by humidstats 766 within control limits; when the dampers are so controlled, the temperature in the space served by each of the induction mixing boxes 724 can be controlled as previously described, i.e., by modulating the flow of cooled water through the coils 727, by pumping heat to the coils 728 or by pumping heat from the coils 730, as required.

The air handler 338 of FIG. 30 includes a coil 767 to which a relatively high temperature, say 58° F. (14° C.), heat transfer fluid can be circulated through lines 768 and 769 from a heat exchanger 770. The heat exchanger 770 is served by heat transfer fluid which flows through lines 771 and 772 from the sprinkler grid. Use of the coil 767 is advantageous, other factors being equal, because the relatively high temperature coolant is less expensive, per ton of refrigeration, than the low temperature coolant that is circulated through the coil 348.

FIGS. 29 and 30 show two modifications of the apparatus of FIG. 11. Analogous modifications of the apparatus of FIGS. 14, 15, 22, and 24–27 can also be made, and the control device of FIG. 20 can be used in the apparatus of FIGS. 29–45, as can the humidistat 508 where humidity conditions are suitable.

Figure 31:
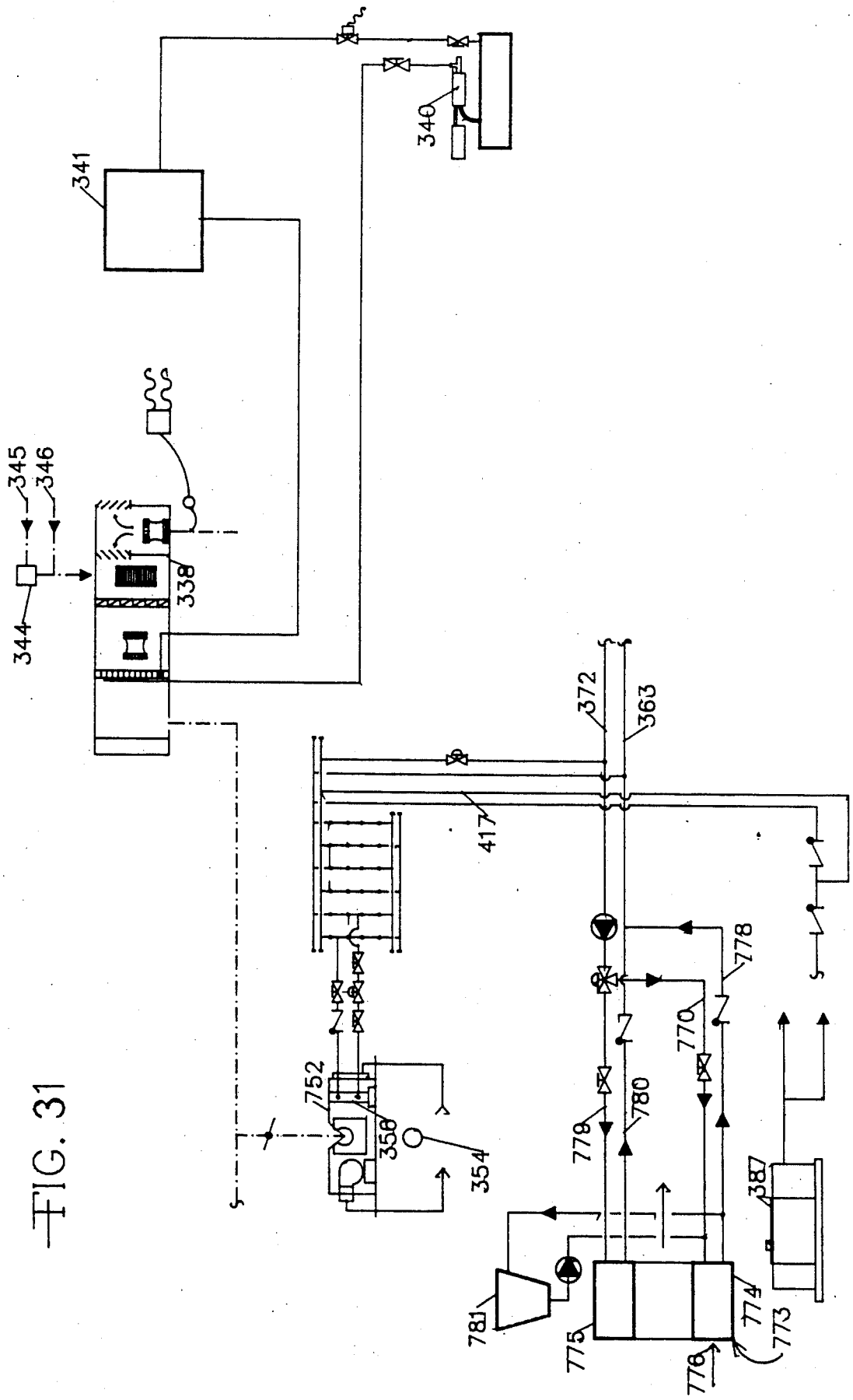
FIG. 31 is a schematic diagram showing apparatus similar to that of FIGS. 15 and 22, but differing in that compression refrigeration apparatus has been omitted and an absorption chiller/ heater has been added.
Figure 32:
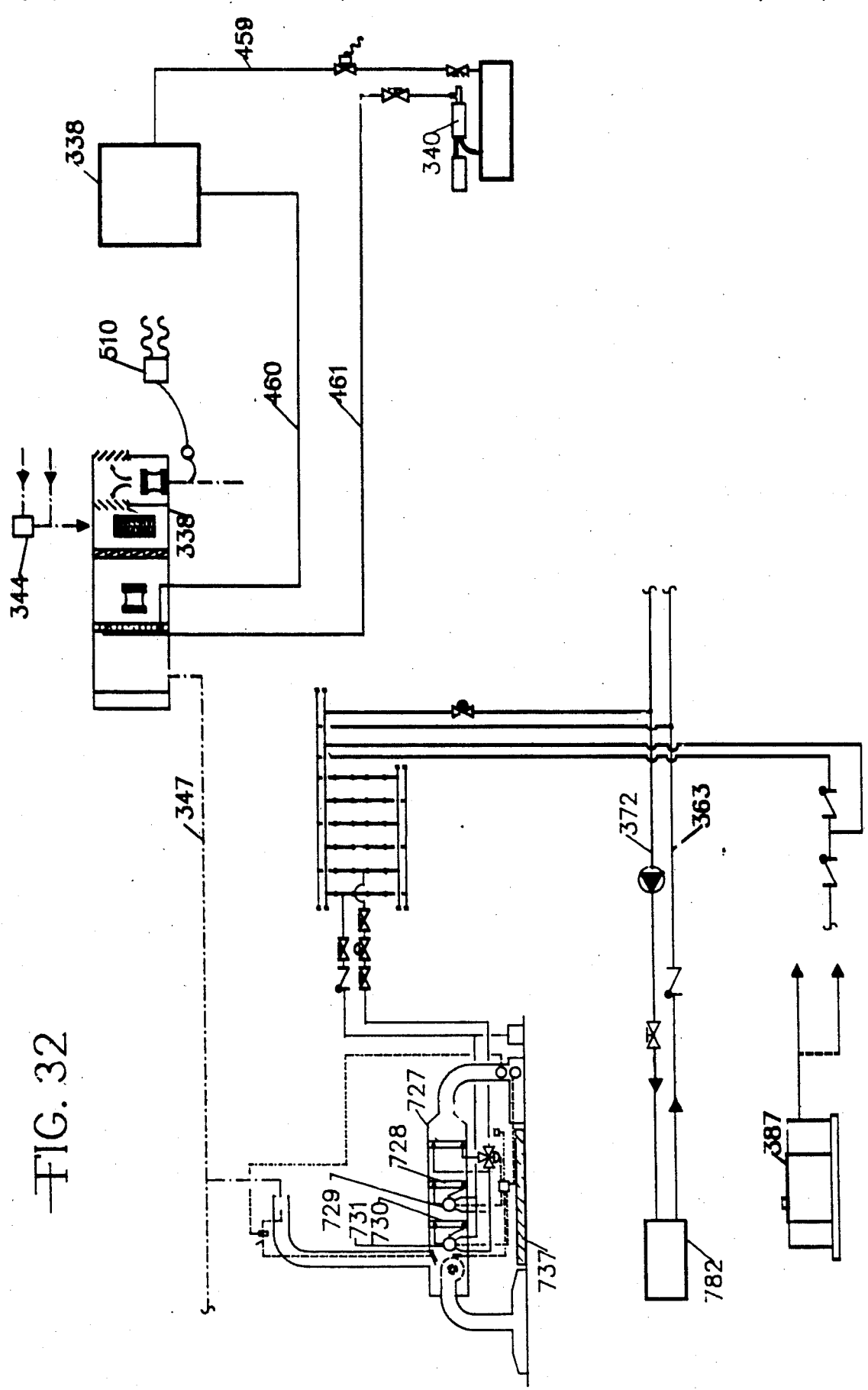
FIG. 32 is a schematic diagram showing apparatus similar to that of FIGS. 15 and 22, but differing in that compression refrigeration apparatus has been omitted and a closed circuit evaporative condenser has been added.

The apparatus of FIGS. 15 and 22 can be modified by substituting other apparatus for the refrigeration apparatus which includes the compresser 449. An example of apparatus where such substitution has been made is shown in FIGS. 31 and 32. In the FIG. 31 apparatus, cooled or warmed water for circulation through the main header 363, the sprinkler grids, the cooling coils 356, the main return 372 and back to the header 363 is provided by an absorption chiller/heater indicated generally at 773 and comprising a heater 774 and absorption refrigeration apparatus which includes an evaporator 775. Gas enters the absorption chiller/heater 773 as indicateded by an arrow 776 and is burned, providing heat, which is either transferred to water delivered through a line 777 to the chiller/heater 773 from the line 372 and returned through a line 778 to the line 363 or used to energize absorption refrigeration apparatus which includes the evaporator 775 to which heat is transferred from water which is delivered thereto from the line 372 through a line 779 and returned through a line 780 to the main header 363. When the absorption refrigeration apparatus of the chiller/heater 773 is used, heat from the absorber and from the condenser thereof is transfered to a cooling tower 781.

In the FIG. 32 apparatus, water from a closed circuit evaporative cooler 782 is the sole means for removing heat from the water circulated through the line 363, the sprinkler grids and the line 372 back to the line 363. This water is supplied, however, to the cooling coils 727, to the condensers 729 or to the evaporators 731 of the induction boxes 724, and heat is pumped to the coils 728 or from the coils 730 where heating or additional cooling of the recirculated air is required, all as previously discussed in connection with FIG. 29.

Figure 28:
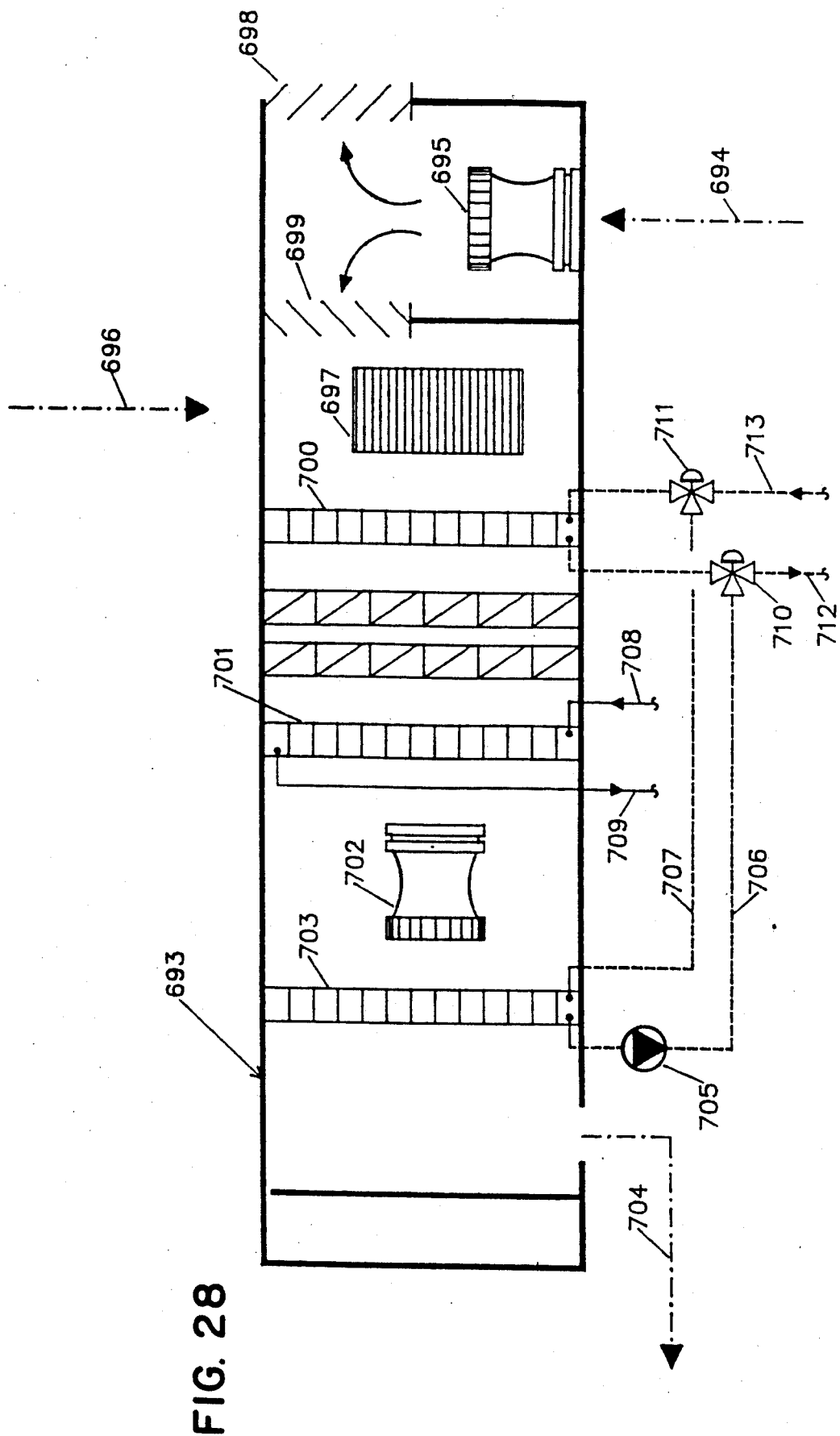
FIG. 28 is a partially schematic view of an air handler which is particularly advantageous as an element of the apparatus of FIGS. 1, 2, 6, 7, 11, 14, 15, 22, 24, 29 and 30.
Figure 33:
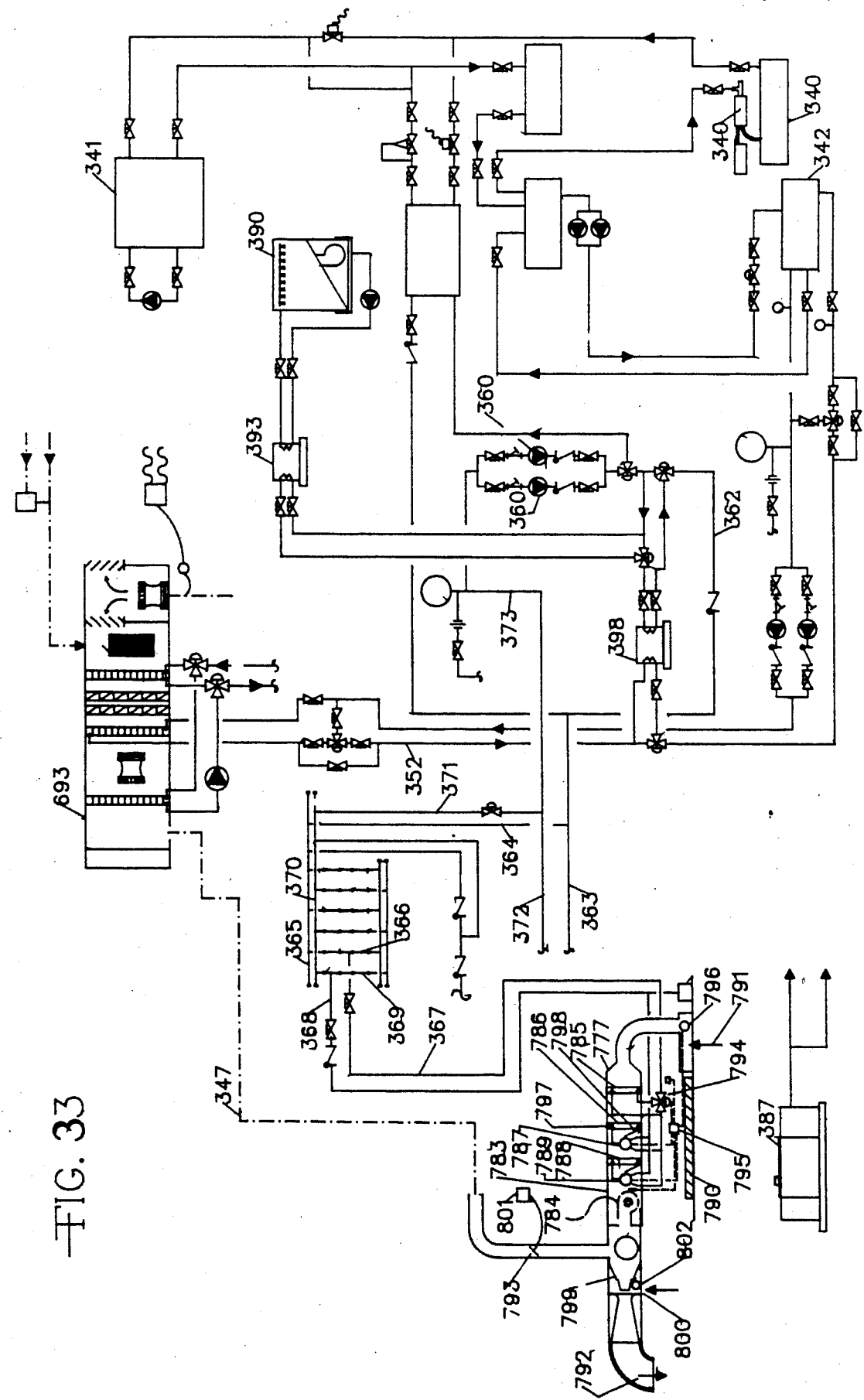
FIG. 33 is a schematic diagram showing apparatus similar to that of FIG. 11, differing mainly in that a different induction mixing box has been substituted for that shown in FIG. 11.

Apparatus otherwise similar to that of FIG. 11, but which includes the air handler 693 of FIG. 28 and induction mixing boxes 783 is shown in FIG. 33. The induction boxes 783 are of the "fan/coil" type, having constant speed fans 784 and coils 785; they are also of the unitary heat pump type, having coils 786 to which heat can be pumped from condensers 787 of first heat pumps and coils 788 from which heat can be pumped to evaporators 789 of second heat pumps.

The fans 784 of the induction mixing boxes 783 have a capacity greater than the maximum flow of conditioned air to the boxes 783; as a consequence, air is caused to flow from a space served thereby into each of the induction boxes, where it is mixed with conditioned air. The mixture of air from the space and conditioned air is returned to the space from the fan discharge. The spaces served by the induction boxes 783 are below, while the boxes 783 are above, ceilings 790. The air flow described above is indicated in FIG. 33 by arrows 791 and 792, the latter representing the flow of a mixture of conditioned air and recirculated air from one of the induction mixing boxes 783 and the former representing the flow of air from the space into the induction boxes 783.

Either chilled heat transfer fluid or evaporatively cooled heat transfer fluid is delivered to the induction mixing boxes 783, being circulated by the pumps 360 through the line 362, the main header 363, the supply line 364, the header 365 of the first sprinkler grid, one of the several sprinkler conduits 366 of the first sprinkler grid, the supply line 367, to the induction boxes 783 and returning through the return line 368, one of the several sprinkler conduits 369 of the second sprinkler grid, the header 370 of the second sprinkler grid, the return line 371, the main return 372 and the line 373 back to the pumps 360 The heat transfer fluid circulated as just described is either chilled in the heat exchanger 398 by heat transfer therefrom to fluid flowing in the line 352 from the coil 348 to the ice storage tank 342 or is cooled by heat transfer therefrom in the heat exchanger 393 to water that has been cooled in the evaporative cooler 390. When chilled water is delivered to the induction boxes 783 it is circulated through the coils 785, and is at a comparatively high temperature, sufficiently high that moisture is not condensed when room air at design conditions flows over the coils 785. In a typical instance, the water in the coils 785 will be at 58° F. (14° C.), and the room air will be at 75° F. (24° C.) and 50% relative humidity. In this mode of operation, dampers 793 can be modulated as desired to control the flow of conditioned air from the ducts 347 into each of the induction mixing boxes 783, and valves 794 can be modulated by controllers 795 to maintain the temperature sensed by thermostats 796 within control limits. While the induction boxes 783 are operating as just described, cooling will often be required in some perimeter zones of a building while heating is required in others. This can occur because of a solar load that is imposed on different perimeter zones at different times of the day, because of differences in occupancy, or because of differences in the use of lights or of heat generating electronic apparatus, to mention a few of the possibilities. The induction mixing boxes 783 are well suited to handle this situation because heat pumps associated with the consensers 787 can be energized where heat is required, and the valves 794 can be set so that the 58° F. (14° C.) water by-passes the associated coils 785; a heat transfer fluid is then circulated from the condensers 787 through lines 797, through the coils 804 and through lines 798 back to the condensers 787 so that heat is pumped from the circulated heat transfer fluid to the recirculated air where required. The induction boxes 783 can be operated in the same way when ambient conditions are such that evaporatively cooled heat transfer fluid is available at 58° F. (14° C.).

The induction mixing boxes 783 also have induction nozzles 799, one of which is shown in FIG. 33, through which conditioned air from the ducts 347 or a mixture of such air with air discharged by the fans 784 flows, inducing a flow of recirculated air from the space or from a plenum, as indicated by an arrow, through induced air inlets 800. It is advantageous for controllers 801 to modulate the dampers 793 to maintain the humidity sensed by humidistats 802 within control limits. The humidistats 802 are positioned in the induced air inlets 800 where they detect the humidity of air induced to flow from the spaces they serve. Since space air is induced to flow into the inlets 800 whether or not the fans 784 are energized, humidity control can be maintained whenever the apparatus is operating while the fans 784 are energized only when they are needed to provide task cooling or heating. For example, a motion sensor (not illustrated) can be used in conjunction with the induction boxes 783; whenever there is no motion in the space served by a given one of the induction mixing boxes 783, the fan 784 and the heat pumps which serve the condensers 787 and the evaporators 789 therein can be de-energized and the valve 794 can be set so that there is no flow of water through the coil 785. The controller 801 continues to modulate the damper 793 to maintain a desired humidity even when the space served by a given one of the boxes 783 is not occupied. As a consequence, as soon as motion is sensed in a previously unoccupied space, the fan 784 in the induction mixing box 783 which serves that space can be energized and chilled water can be used as previously described in connection with FIG. 29 with respect to the operation of the induction mixing boxes 727 to provide task heating or cooling.

Some spaces in a building are frequently occupied when the air conditioning system which serves the building is not in operation. The apparatus of FIG. 33 is well suited to provide air conditioning for the spaces that are occupied at such times. The air handler 693 can be operated to dehumidify air which is circulated on demand for ventilation and humidity control of the spaces that are occupied, and a heat transfer fluid can be circulated between the coils 700 and 701 of the air handler 693 so that the dehumidified air is essentially neutral in temperature, say 70° F. (21° C.). The fans 784 can then be energized in the induction mixing boxes 783 which serve the occupied spaces, and heat can be pumped from the coils 788 of those boxes for temperature control, as required. The heat transfer fluid can be circulated through the sprinkler system in this mode of operation, acting as a heat sink for condenser heat.

It will be appreciated that, in some instances, it will not be necessary to operate both of the heat pumps which serve the coils 786 and 788 of the induction mixing boxes 783. For example, it is often possible to design the apparatus so that, when it is in cooling mode, modulating the flow of chilled water through the coils 785 will enable the induction boxes 783 to maintain a desired temperature as heat gains in the spaces served vary from maximum to minimum. In other cases, modulating the flow of chilled water through the coils 785 and either pumping heat to the coils 786 or pumping heat from the coils 788 will enable the boxes 783 to maintain a desired temperature. Accordingly, one or both of the coils 786 and 788, and the associated heat pumps, can sometimes be omitted from the induction mixing boxes 783.

Figure 34:
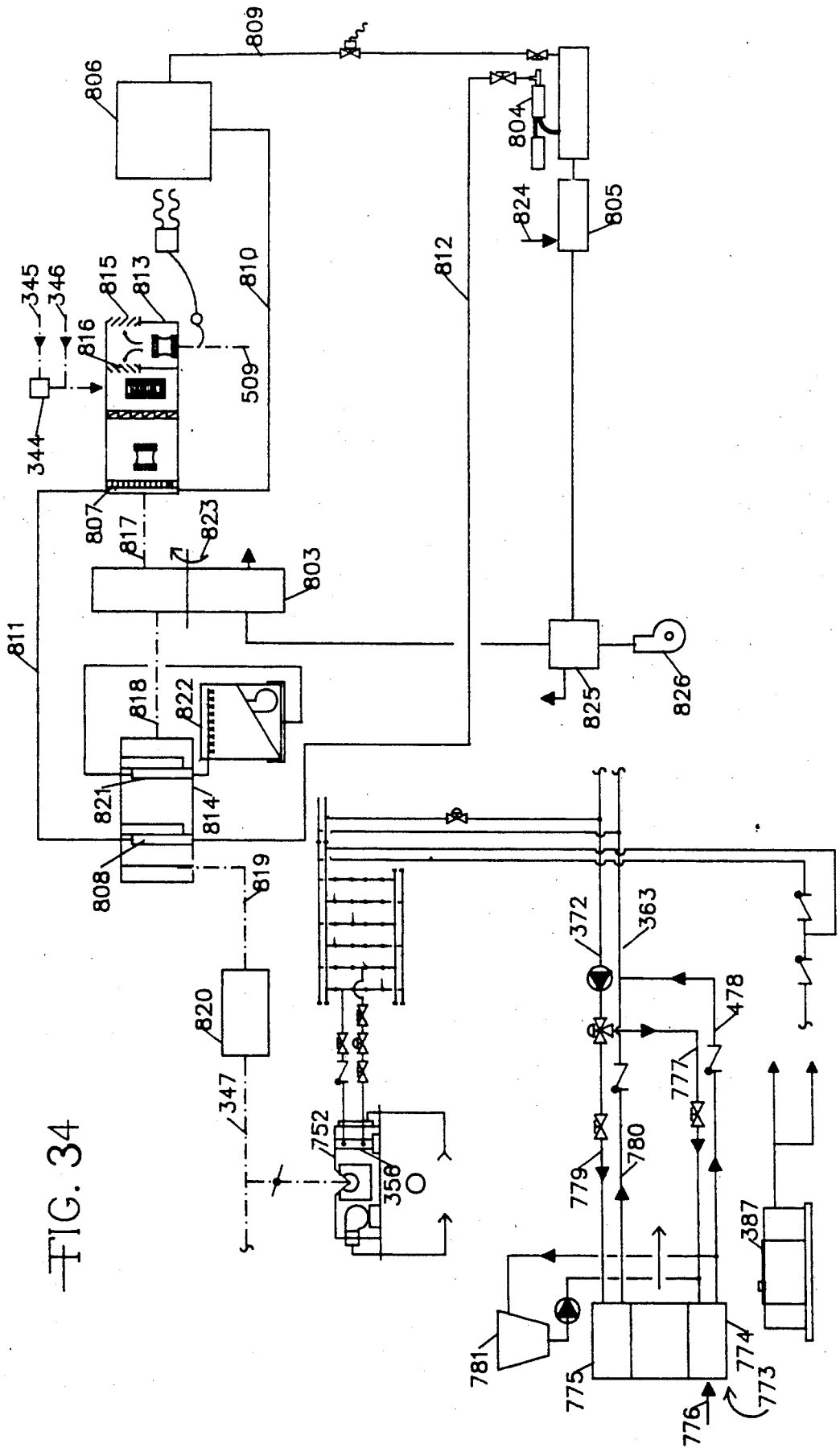
FIG. 34 is a schematic diagram showing apparatus similar to that of FIG. 31, but differing in that a combination comprising compression refrigeration apparatus driven by a gas engine and a chemical dehumidifier has been substituted for compression refrigeration apparatus.

Apparatus otherwise similar to that of FIG. 31, but in which the compression refrigeration apparatus which includes the compressor 450 has been replaced by a chemical dehumidifier 803, compression refrigeration apparatus which includes a compressor 804 and associated equipment is shown in FIG. 34. Refrigerant flows from the compressor 804, which is driven by a gas engine 805, to an evaporative condenser 806, to a DX coil 807, a DX coil 808, and back to the compressor 804, the flow being through lines 809, 810, 811 and 812. The DX coils 807 and 808 are a part of the air handling portion of the apparatus, the former being in a first air handler 813 and the latter being in a second air handler 814. Return air enters the first air handler 813 from the duct 509, some being vented through an outlet 815, and the rest flowing through an inlet 816 and being mixed with outside air which has been either directed through or by-passed around the indirect evaporative cooler 344, as indicated by the arrows 345 and 346. The mixture of outside air and recirculated air then flows in heat exchange relationship with the DX coil 807, through a duct 817, through the dehumidifier 803, through a duct 818, through the second air handler 814, a duct 819, and a washer 820 and into the ducts 347. In the second air handler 814 the air is in heat exchange relationship first with a coil 821 and then with the DX coil 808. The air is dehumidified in the dehumidifier 803 by contact with a concentrated hygroscopic liquid, e.g., alumina, silica or paper impregnated with lithium chloride, and is cooled by heat exchange first with the coil 821 and then with the coil 808. Evaporatively cooled water from a cooler 822 is circulated through the coil 821. The dehumidifier 803 is a wheel which rotates as indicated by an arrow 823 so that the air being dehumidified passes through successive segments of the wheel as they are advanced by rotation while regenerating air passes, as subsequently described, through different successive segments as they are advanced.

As an example of the operation of the apparatus of FIG. 34, outside air having a dry bulb temperature of 95° F. (35° C.) and containing 99 grains of water vapor per pound of dry air can be mixed with return air to produce a mixture having a dry bulb temperature of 90° F. (32° C.) and containing 90 grains of water vapor per pound of dry air. This mixture can then be cooled to a dry bulb temperature of 51° F. (11° C.) by contact with the coil 807 and dehumidified to a moisture content of 51 grains of water vapor per pound of dry air. In the dehumidifier 803 the air can be dehumidified to a moisture content of 10 grains of water vapor per pound of dry air and heated to a dry bulb temperature of 100° F. (38° C.). This air can then be cooled sensibly by contact with the coil 821 to a dry bulb temperature of 95° F. (35° C.) and by contact with the coil 808 to a dry bulb temperature of 57° F. (14° C.) without, in either case, affecting its moisture content. Finally, the air can be washed adiabatically in the washer 820 so that it enters the ducts 347 at a dry bulb temperature of 40° F. (4° C.) and containing about 37 grains of water vapor per pound of dry air.

It will be appreciated from the foregoing example of its operation that the apparatus of FIG. 34 can be used to produce the low temperature, dry air that can be circulated in a small quantity as described above to achieve substantial savings in the original construction cost of air conditioning apparatus according to the instant invention. The FIG. 34 apparatus differs from that previously described because it accomplishes this result using gas as an energy source, and without requiring electricity from a utility or either ice or desiccant storage. As is indicated by an arrow gas enters the engine 805 as a fuel; the gas is converted by the engine 805 to shaft work which drives the compressor 804 and heat in the form of hot gases. The hot gases flow through a segment of a heat exchanger 824 and are vented while a blower 825 directs air through the other side of the heat exchanger 824 and through a segment of the dehumidifier 803 to effect regeneration of that segment. Rotation of the dehumidifier causes successive segments thereof to present themselves for regeneration. It will be appreciated that a diesel or other combustion engine could be used in place of the gas engine 805, and that a gas turbine, diesel or other engine could also be use to drive an electric generator to power an electic motor to drive the compressor 804. Where a combustion engine which has a cooling jacket is used, heat from the jacket is available in addition to heat from the combustion products. Further, the gas turbine or other engine could be sized to provide the heat required by the absorption chiller heater 773.

Figure 35:
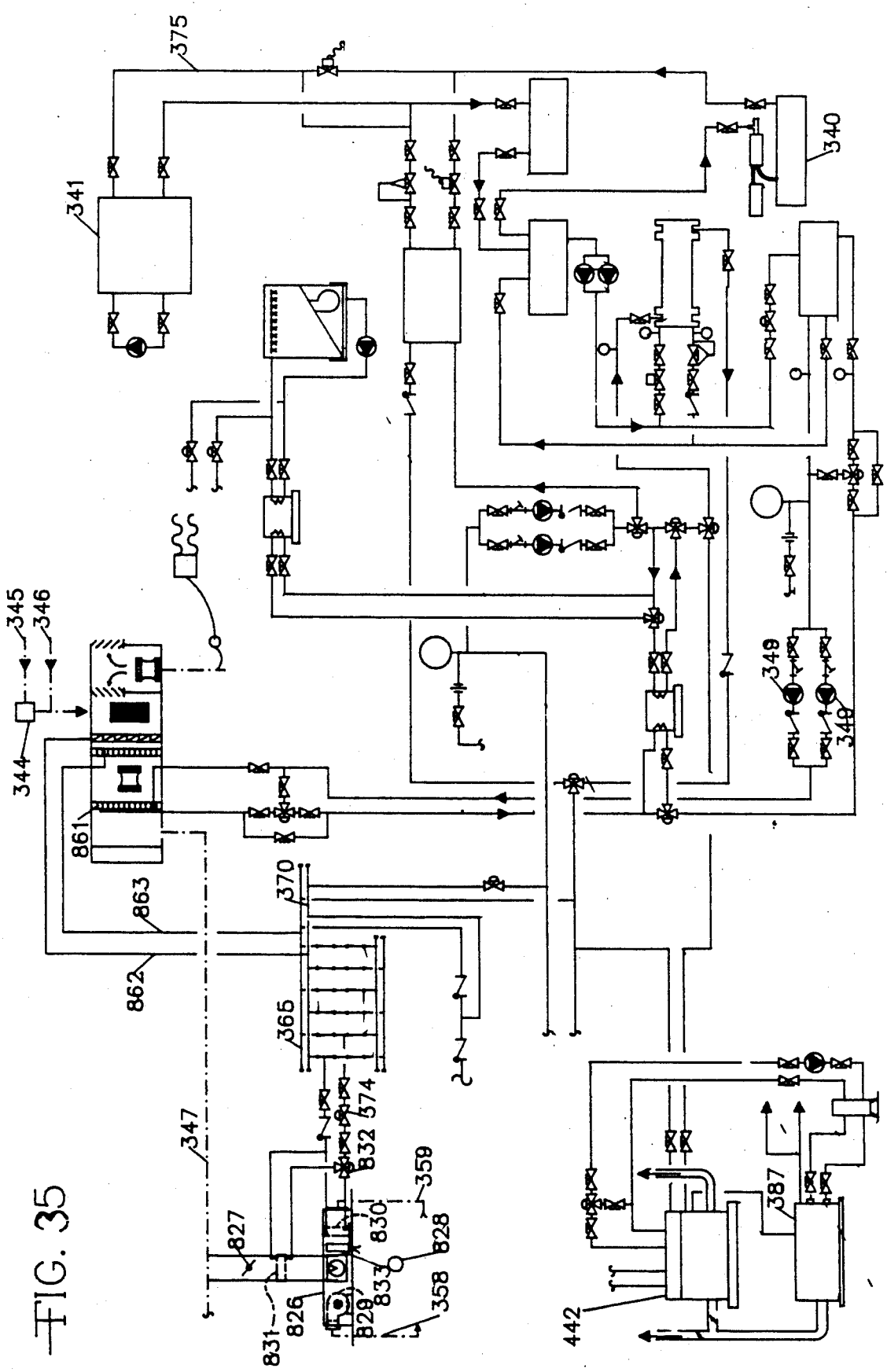
FIG. 35 is a schematic diagram showing apparatus similar to that of FIG. 14 but differing in that a reheat coil has been added to an induction mixing box which is an essential part of the apparatus.

Apparatus similar to that of FIG. 14, except that the induction mixing boxes 339 have been replaced by induction mixing boxes 826, is shown in FIG. 35. Conditioned air from the ducts 347 is delivered to the induction boxes 826 at a rate which varies, depending upon the settings of individual dampers 827, each of which is actuated by a thermostat/humidistat-controller 521. The induction mixing boxes 826 are of the "fan/coil" type, having constant speed fans 829, coils 830 and coils 831. The fans 829 have a capacity greater than the maximum flow of conditioned air to the boxes 826 when the dampers 827 are in their full open positions; as a consequence, there is a flow of recirculated air therethrough as previously described and as indicated by an arrow having the head 358 and the tail 359.

The thermostat/humidistat controllers 828 actuate the dampers 827 to establish and maintain a desired humidity in the space served by each of the induction mixing boxes 826, opening the dampers when the humidity is too high, and closing them when the humidity is too low. The minimum damper settings are those at which each of the induction boxes 826 furnishes the minimum ventilation air. When humidity control has been established and the flow of conditioned air at the rate required to maintain the desired humidity is insufficient to counteract heat gains in the space served by one of the induction mixing boxes 826, a three-way valve 832 is set by the thermostat/humidistat controller 828 to cause chilled water circulated by the pumps 360 as previously described to flow through the coil 830 in that box, and the rate of flow is modulated by the valve 374 which is set as required by the thermostat/humidistat controller 828 to maintain the desired temperature. When the flow of conditioned air at the rate required for humidity control is more than sufficient to counteract heat gains in the space served by one of the induction boxes 826, the thermostat/humidistat controller 828 sets the three-way valve 832 to cause chilled water to flow through the coil 831 in that box, and actuates the valve 374 in that box to modulate the flow of chilled water through the coil 831 to maintain the set temperature, increasing the flow when the temperature is too low and vice versa. The chilled water is used to counteract heat gains when it is circulated through the coils 830, and for reheat when it is circulated through the coils 831. This is possible because the water is at about 58° F. (14° C.) while the room air which flows in heat exchange relationship with the coils 830 is at about 75° F. (24° C.) and the conditioned air which flows in heat exchange relationship with the coils 831 is at about 40° F. (4° C.)

The induction mixing boxes 826 also include electric heaters 833 positioned for heat exchange with air from the space that is caused to flow therethrough. The heaters 833 can be used in place of or to supplement the coils 831 when reheat is required. Similarly, the induction boxes 826 can include electric heaters (not illustrated) positioned for heat exchange With conditioned air or with a mixture of conditioned air and recirculated air, and any of the heaters, or any combination of the heaters, can be used in place of or to supplement the coils 831 for reheat. It is also possible to circulate warm water to the coils 830 of the induction mixing boxes 826 or to the coils 356 of the induction mixing boxes 339 (see, for example, FIG. 11) as required for reheat, but this requires a second circulating system and, therefore, usually is economically undesirable.

Figure 36:
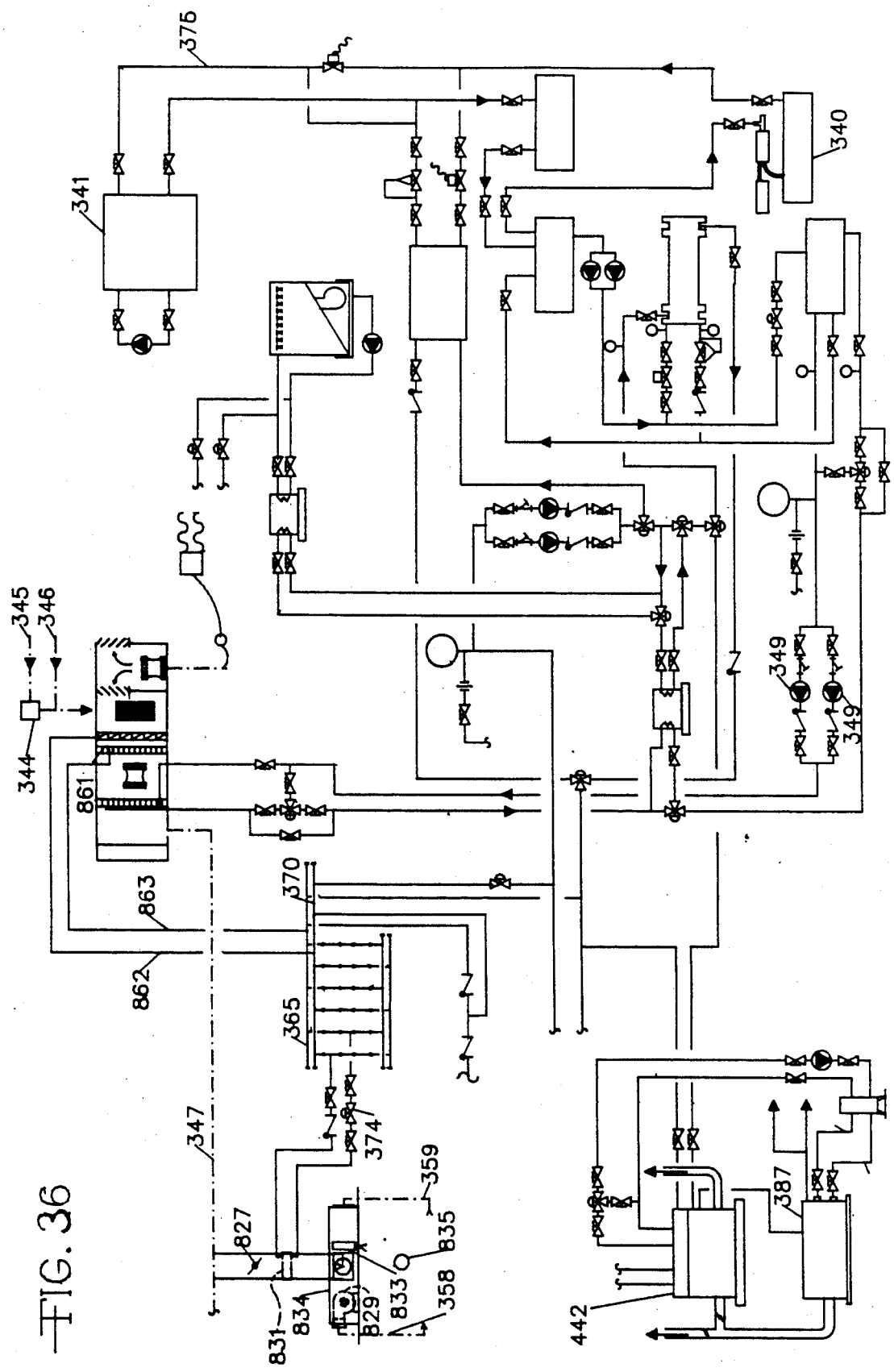
FIG. 36 is schematic diagram showing apparatus similar to that of FIG. 35, but differing in that a cooling coil has been ommitted from the induction mixing box which is an essential part of the apparatus.

Apparatus which is the same as that of FIG. 35 except that the induction boxes 826 have been replaced by induction mixing boxes 834 is shown in FIG. 36. The boxes 834 are of the "fan/coil" type, having the fans 829 and the coils 831, but they are controlled by thermostat controllers 835 which modulate the dampers 827 for temperature control between settings that provide the minimum ventilation air and full open positions; whenever the setting that provides the minimum ventilation air more than counteracts heat gains in a given space, the controller 835 for the induction box 834 which serves that space modulates the valve 374 of that box as required to provide the requisite reheat.

Figure 37:
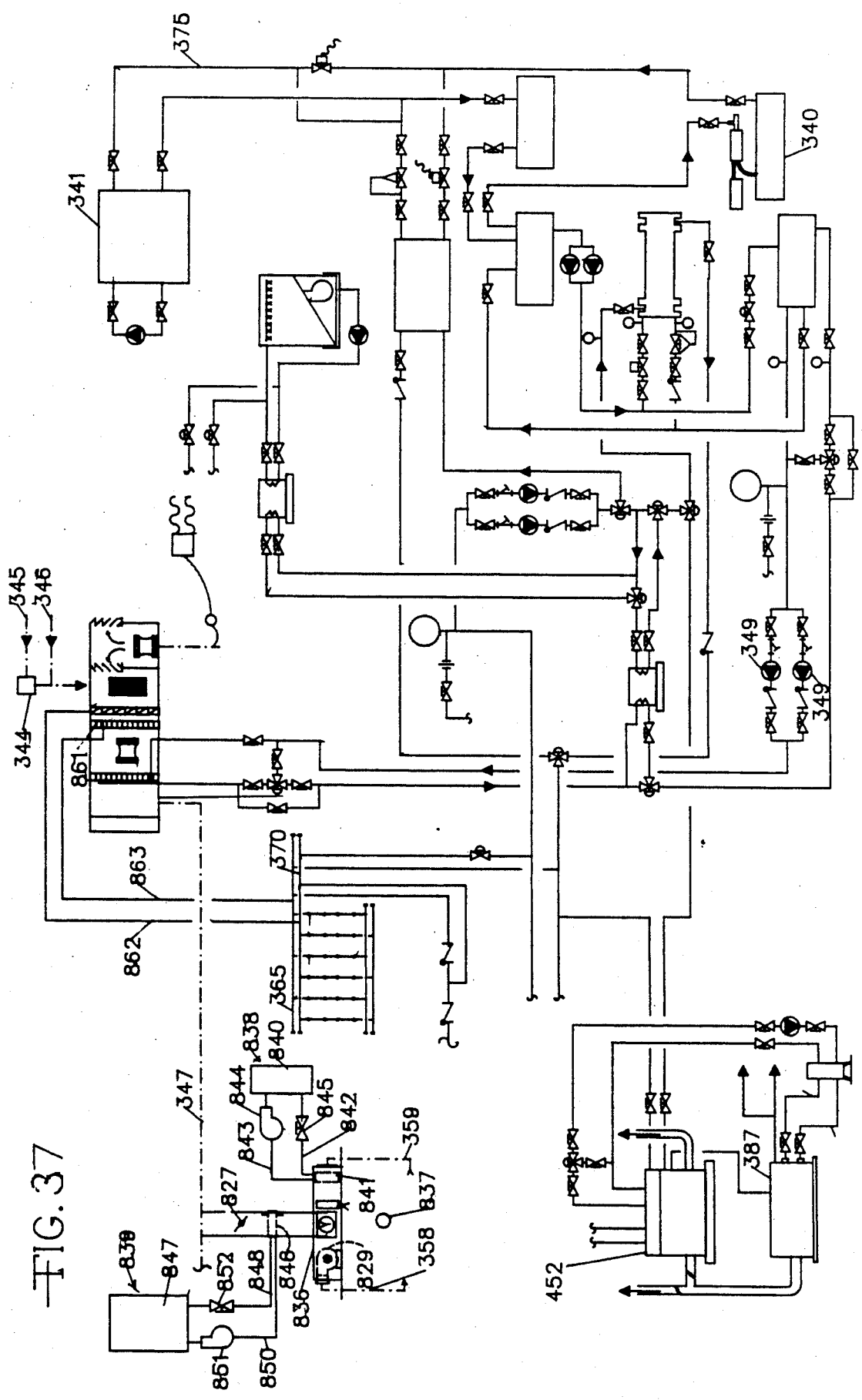
FIG. 37 is a schematic diagram showing apparatus similar to that of FIG. 35, but differing in that reheat and cooling coils of the induction mixing box have been replaced by heat pipes.

Apparatus which is the same as that of FIG. 35 except that the induction boxes 826 have been replaced by induction mixing boxes 836 is shown in FIG. 37. The boxes 836, which are controlled, as is subsequently explained in more detail, by thermost/humidistat-controllers 837, have heat pipes indicated generally ar 838 and 839. The heat pipe 838 has a condensing section 840, an evaporating section 841, a vapor pipe 842, a liquid return line 834 and a pump 844 in the liquid return line 850. The pump 844 is operable to pump condensate from the condensing section 840 to the evaporating section 841. A valve 845 controls the operation of the heat pipe 837. The heat pipe 839 has a condensing section 846, an evaporating section 847, a vapor pipe 848, a liquid return line 850 and a pump 851 in the liquid return line 850. The pump 851 is operable to pump condensate from the condensing section 846 to the evaporating section 847. A valve 852 controls the operation of the heat pipe 839.

When the induction mixing boxes 836 are operating, the dampers 827 are modulated by the thermostat/humidistatcontrollers 837 as required for humidity control When cold primary air at the rate of flow required to control humidity is insufficient to counteract heat gains in the space served by one of the boxes 836, the relevant thermostat/humidistatcontroller 837 senses a temperature above the set point and, in response, activates the associated heat pipe 838 by energizing the pump 844 and opening the valve 845 thereof. The liquid of the heat pipe 838 is then pumped into the evaporating section 840, where it is vaporized by heat transferred thereto from air flowing through the induction box from the space. The vapor which results flows through the vapor pipe to the condensing section 841 where it is condensed by heat transfer therefrom to air in the plenum with which it is in heat transfer relationship. It will be appreciated that the heat pipe 838 must be in a cooled plenum to be capable of transferring heat from recirculated air as just described; as previously described, the sprinkler systems of FIGS. 16 and 17 can be used to cool the plenum to enable the heat pump 838 to operate. When one of the heat pipes 838 is not energized, the associated thermostat/humidistat-controller 837, in response to a sensed temperature below the set point, activates the relevant one of the heat pipes 839 by energizing the pump 851 and opening the valve 852. The liquid of the heat pipe 839 is then pumped into the evaporating section 847, where it is vaporized by heat transferred thereto from air in the plenum. The vapor which results flows through the vapor pipe to the condensing section 846 where it is condensed by heat transfer therefrom cold primary air flowing in heat transfer relationship therewith. The heat pipe 839 is capable of operating either in a cooled plenum or in a plenum that is heated to a temperature several degrees above the space temperature because it is transferring heat to cold primary air.

Figure 38:
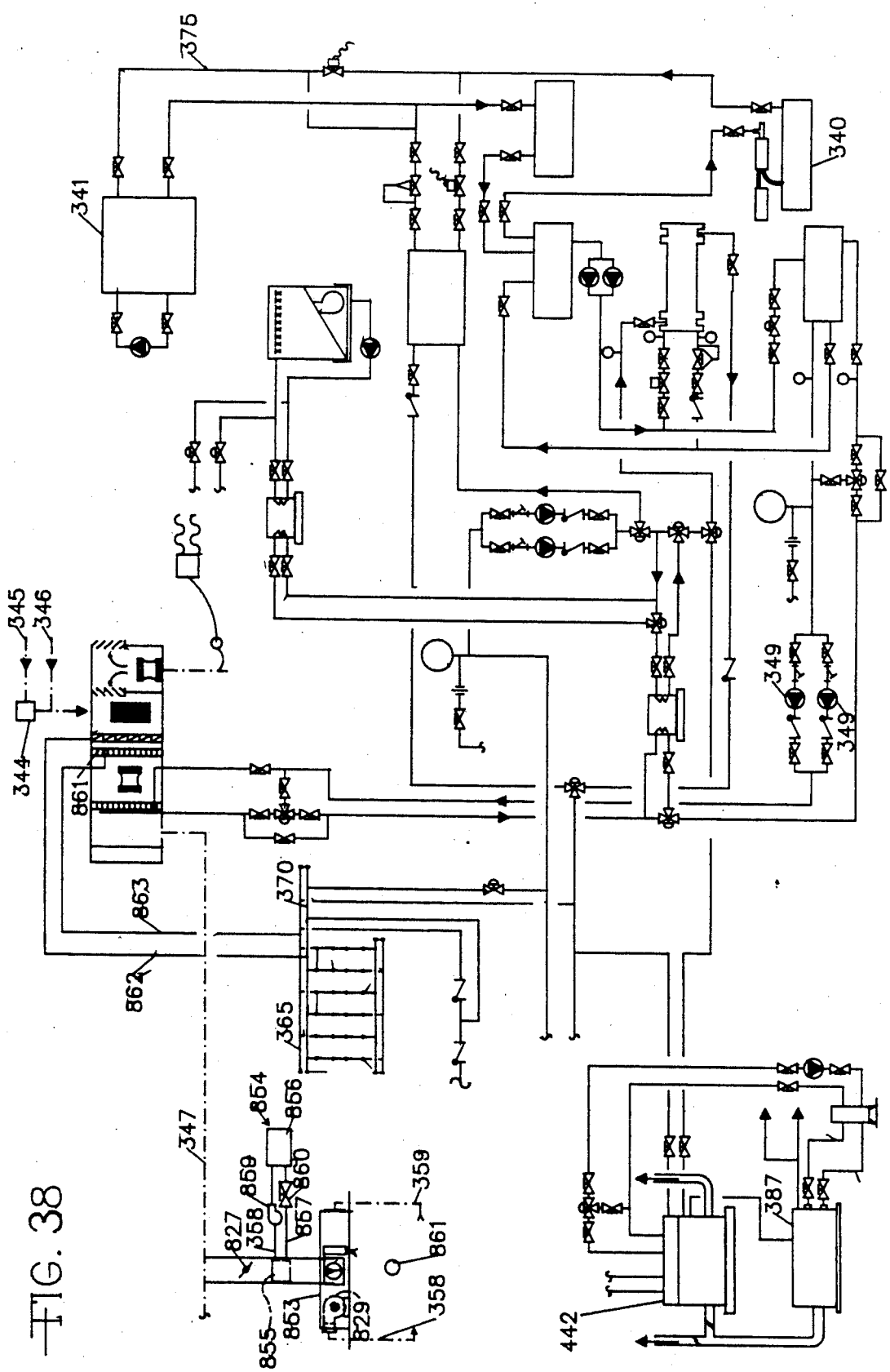
FIG. 38 is a schematic diagram showing apparatus similar to that of FIG. 37, but differing in that one of the heat pipes has been ommited from the induction mixing box.

The apparatus of FIG. 38 is the same as that of FIG. 37 except that the induction boxes 836 have been replaced by induction mixing boxes 853 which have heat pipes indicated generally ar 854. The heat pipes 854 have a condensing section 855, an evaporating section 856, a vapor pipe 857, a liquid return line 858 and a pump 859 in the liquid return line 858. The pump 859 is operable to pump condensate from the condensing section 854 to the evaporating section 856. A valve 859 controls the operation of the heat pipe 854.

The air handlers 338 of the apparatus of FIGS. 35-38 have coils 861 connected by lines 862 and 863 to the headers 365 and 370. Relatively high temperature water in the the coils 861 can carry a substantial proportion of the air conditioning load at a lower cost per ton of refrigeration, by comparison with the cost when lower temperature water from the ice storage tank 342 is used, provided that any electricity used to produce the high temperature water does not contribute to a demand charge, for example, because the absorption apparatus 444 is used to cool the water, because electricity from the engine generator 387 is used, or because electricity from a utility is used at a time when its use does not contribute to a demand charge. The apparatus of FIGS. 37 and 38 does not use high temperature water to remove heat from air circulated through the induction mixing boxes 836 and 853; as a consequence, the only use for high temperature water in the apparatus of these Figures is in the coils 861.

One of the induction mixing boxes 725 of the apparatus of FIG. 29 is shown in more detail in FIGS. 39 and 40. Conditioned air enters the box 725 through an inlet 864 at a rate which depends upon the setting of the damper 750 and is discharged through the nozzles 733. When the rate of flow of conditioned air through the nozzles 733 is sufficiently high, recirculated air is induced to flow at a substantial rate through the induced air inlet 734, mixing with the conditioned air in the mixing portion 735. In this mode of operation, a back-draft damper 865 prevents a flow of air from the nozzles 733 to the right in FIG. 39 through an air inlet 866, while the flow of air through the induced air inlet 734 opens a back-draft damper 867. When the flow of conditioned air to the induction box 725 is throttled to such an extent that its flow through the nozzles 733 is not capable of inducing an adequate flow of recirculated air through the inlet 734, the blower 751 is energized, inducing air to flow through the inlet 866 to the suction side of the blower 751; this air is discharged into a passage 868 which bypasses the nozzles 733, forces the back-draft damper 867 to move to a "closed" position, and mixes with the conditioned air in the mixing portion 735. Accordingly, whether or not the blower 751 is energized, it is a mixture of conditioned air and recirculated air that is discharged from the induction mixing box 725 into the space it serves.

Figure 41:
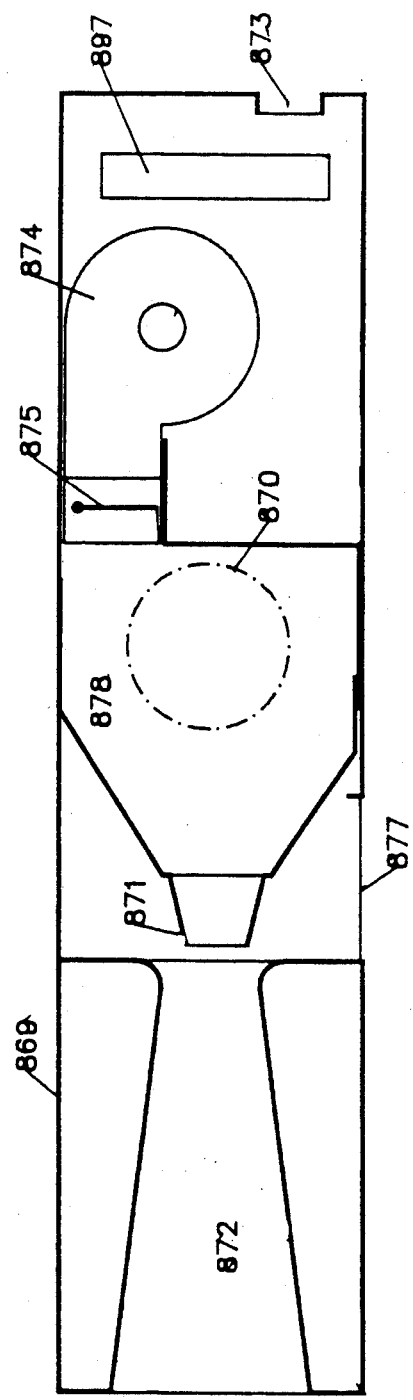
FIG. 41 is a schematic diagram in elevation showing another embodiment of an induction mixing box similar to that of FIG. 39.
Figure 42:
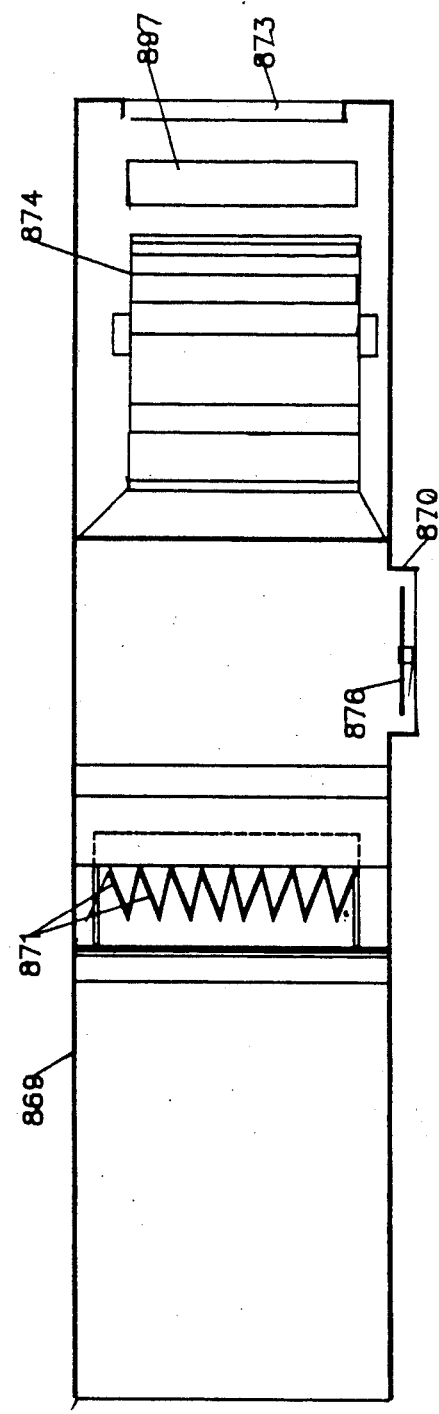
FIG. 42 is a schematic diagram in plan showing further details of the induction mixing box of FIG. 41.

An induction mixing box that is functionally equivalent to the induction box 725 is designated 869 in FIGS. 41 and 42. The box 869 has a conditioned air inlet 870, induction nozzles 871, a mixing portion 872, an air inlet 873, a blower 874, a back-draft damper 875, a conditioned air damper 876 (FIG. 42) and an induced air inlet 877 (FIG. 41). Conditioned air enters the box 869 through the inlet 870 at a rate which depends upon the setting of the damper 876 and is discharged through the nozzles 871. When the rate of flow of conditioned air through the nozzles 871 is sufficiently high, this flow induces recirculated air to flow at a substantial rate through the induced air inlet 878, mixing with the conditioned air in the mixing portion 872. In this mode of operation, the back-draft damper 875 prevents a flow of air from the nozzles 871 to the right in FIG. 41 through the air inlet 873. When the flow of conditioned air to the induction box 869 is throttled to such an extent that its flow through the nozzles 871 is not capable of inducing an adequate flow of recirculated air through the inlet 877, the blower 874 is energized, inducing air to flow through the inlet 873 to the suction side of the blower 874; this air is discharged into a chamber 878 from which it flows through the nozzles 871, forcing the back-draft damper 875 to move to an "open" position, and mixes with the conditioned air in the chamber 878 and with air induced to flow through the inlet 877 in the mixing portion 872. Accordingly, whether or not the blower 874 is energized, air is induced to flow through the inlet 877 and it is a mixture of conditioned air and recirculated air that is discharged from the box 869 into the space it serves.

Figure 43:
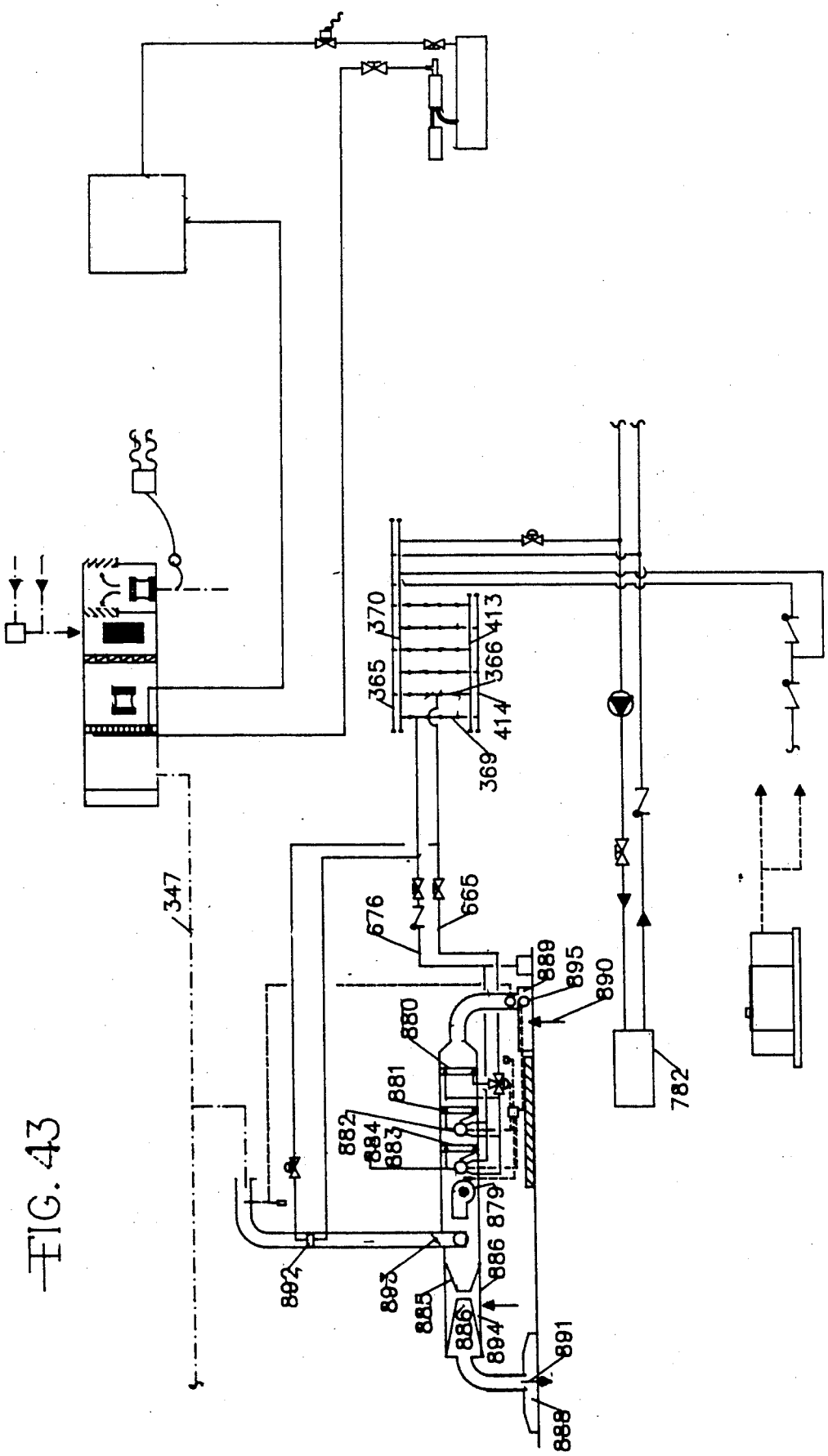
FIG. 43 is a schmetic diagram showing apparatus similar to that of FIG. 32 but differing in that it shows another embodiment of an induction mixing box.

Apparatus similar to that of FIG. 31, but wherein the induction boxes 347 have been replaced by induction mixing boxes 878, is shown in FIG. 43. The boxes 878 are of the "fan/coil" type, having constant speed fans 879 and coils 880; they are also of the unitary heat pump type, having coils 881 to which heat can be pumped from condensers 882 of first heat pumps and coils 883 from which heat can be pumped to evaporators 884 of second heat pumps; finally, they are of the induction type, having a plurality of induction nozzles 885, one of which is shown in FIG. 43, through which conditioned air from the ducts 347 flows, inducing a flow of recirculated air from the space or from a plenum, as indicated by an arrow, through induced air inlets 886. Air which enters the induction boxes 878 through the induced air inlets 886 mixes with air discharged from the induction nozzles 885 in mixing portions 887 of the boxes 878, so that it is a mixture of these streams that is delivered to the spaces from discharge ends 888 of the induction mixing boxes 878.

The fans 879 of the induction mixing boxes 878 have a capacity greater than the maximum flow of conditioned air to the boxes 878; as a consequence, when the fans 879 are operating, air is caused to flow through an air inlet 889 from a space served thereby into each of the boxes, where it is mixed with conditioned air. The mixture of air from the space and conditioned air flows through the induction nozzles 885, inducing a further flow of recirculated air through the induced air inlets 886; the air delivered to the spaces is a mixture of the air which flows through the nozzles 885 and the the air that its flow induces. An arrow 890 indicates the flow of air through the air inlets 889, while an arrow 891 indicates the flow of an air mixture from the induction boxes 878 to the spaces they serve.

Evaporatively cooled heat transfer fluid is delivered to the boxes 878, being circulated thereto as previously described from the closed circuit evaporative cooler 782. This water is supplied to the cooling coils 880, to the condensers 882 or the evaporators 884, as required, so that the required cooling can be done by the coils 880 or by the coils 883 or the required heating can be done by the coils 881. The apparatus also includes a coil 892 positioned for heat transfer with conditioned air before it flows through the nozzles 885. Heat transfer from this coil will often provide all the reheat that is necessary, in which case the coils 881, the condensers 882 and the first heat pumps can be omitted. Similarly, chilled water can be circulated to the coils 880 and used as previously described, and will often provide all of the supplemental cooling that is required, beyond that done by the conditioned air from the ducts 347.

The induction mixing box 878 is admirably suited for task cooling when a damper 893 is controlled by a humidistat-controller 894 to maintain the humidity in a space it serves at a predetermined level while the operation of the fan 879, of the coils 880 and 892 and of the first and second heat pumps if they are present is controlled by a thermostat-controller 895 in cooperation with a signal indicating that the space served is occupied. The signal can be from a motion sensor (not illustrated) or can be one which an occupant of the space served actuates, e.g., by turning on the lights or by turning a separate switch to the on position. When there is no signal indicating that the space is occupied, the fan 879 is not energized and the first and second heat pumps, if they are present, are not energized; as a consequence, the coils 880, 881 and 883 are essentially ineffective to counteract heat gains or losses in the space. The coil 892, however, is operated by the controller 895 as previously described for reheat if the space temperature is below the set point. Whenever there is a signal which indicates that the space served is occupied, the fan 879 is operated and chilled or evaporatively cooled water is made available to the coil 880 and to the condenser 882 and the evaporator 884 if the first and second heat pumps are used.

The induction mixing box 725 (FIGS. 39 and 40) has a coil 896 and the induction box 869 (FIGS. 41 and 42) has a coil 897; either of these boxes can be substituted for the induction mixing box 878 (FIG. 43) and operated as just described in the preceding paragraph when its coil (896 or 897) is connected between the lines 665 and 676, and chilled 58° F. (14° C.) heat transfer fluid is supplied to the sprinkler system as previously described.

Figure 44:
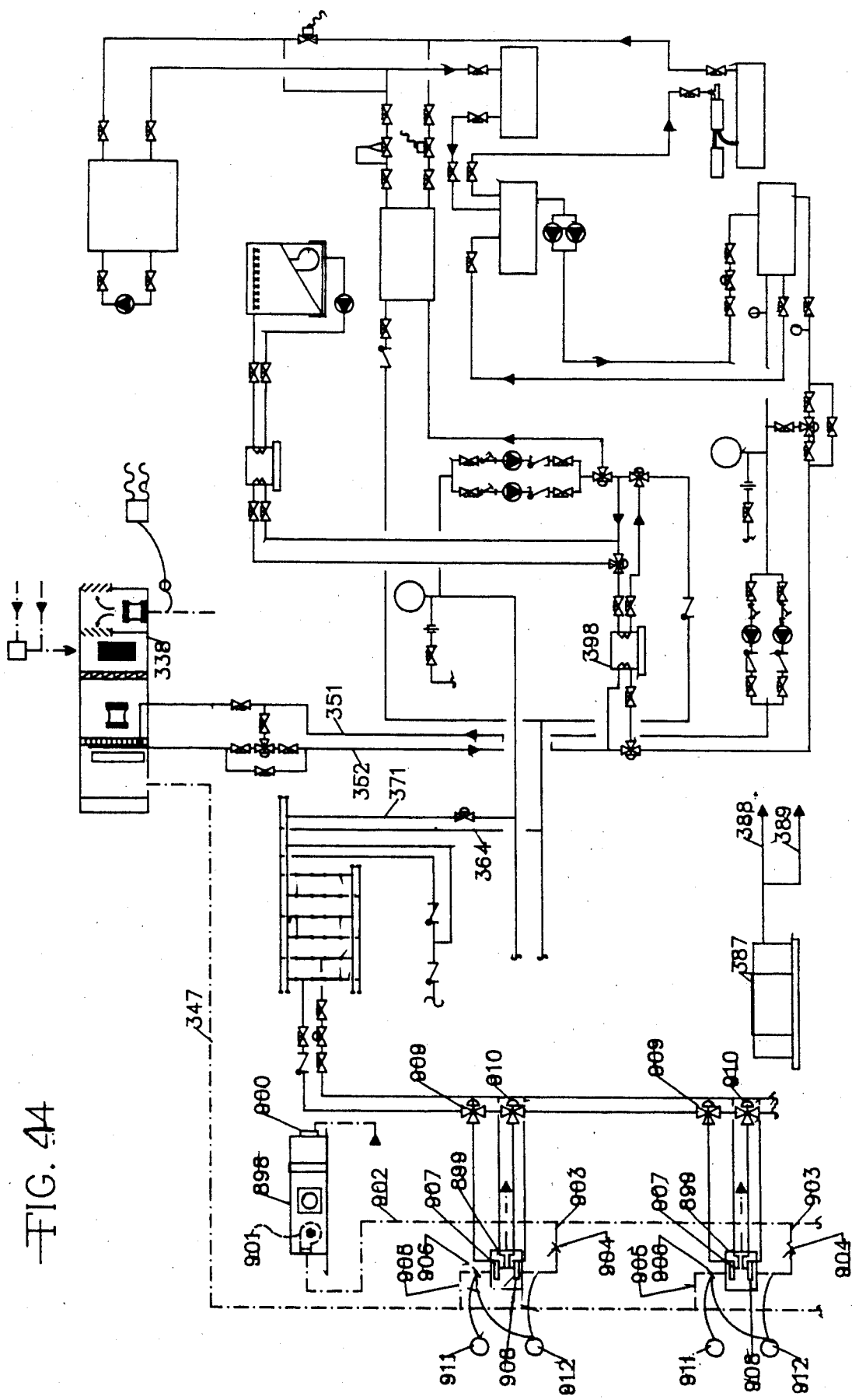
FIG. 44 is a schmetic diagram showing apparatus similar to that of FIG. 30, but differing in that cooling and reheat coils have been added to mixing boxes of the dual duct type which are part of the apparatus.

Apparatus which includes many of the elements of that of FIG. 11 (but not the water chiller 343 and associated apparatus), and which additionally includes an induction box 898 and mixing boxes 899 is shown in FIG. 44. The induction box 898 has an inlet 900 for recirculated air and a blower 901 which induces air from the zone served by the box 898 to flow through the inlet 900 and discharges that air into a duct 902 from which it is delivered to the mixing boxes 899, flowing through ducts 903 at a rate which is determined by the settings of dampers 904. Conditioned air from one of the ducts 347 is also delivered to the mixing boxes 899, flowing thereto through ducts 905 at rates which depend upon the settings of dampers 906.

The mixing boxes 899 have coils 907 positioned for heat exchange with cold primary air entering from the ducts 905 and coils 908 positioned for heat exchange with recirculated air from the ducts 903. The flow of heat transfer fluid to the coils 907 and 908 is determined by the positions of valves 909 and of valves 910, respectively.

The dampers 904 and 906 and the valves 909 and 910 are controlled by humidistat controllers 911 and thermostat controllers 912. In operation, the dampers 906 are modulated as required to maintain a set humidity in the space served by each of the mixing boxes 899, and the dampers 904 are modulated in opposition to maintain a substantially constant flow of total air to the space served by each of the mixing boxes 899. When one of the thermostat controllers 912 senses a space temperature above the set point, it opens the associated one of the valves 910 to enable a heat transfer fluid at about 58° F. (14° C.) to flow through the associated coil 908, and modulates that valve as required to maintain the set temperature. Should the space temperature remain above the set point with the associated valve 908 in a full open position, the thermostat controller 912 overrides the associated humidistat controller 911 and modulates the dampers 904 and 906 in opposition to maintain the set temperature; during this time, the valve 910 is kept in its full open position. When one of the thermostat controllers senses a space temperature below the set point, it opens the associated one of the valves 909 and modulates that valve as required to maintain the set temperature. The valve 910 is closed while the associated valve 909 is being modulated for reheat.

The apparatus of FIG. 44 is also admirably suited for task cooling. Whenever there is no signal indicating that the space served is occupied, the damper 904 serving that space is closed, and the associated damper 906 is modulated by the humidistat controller 911 as required for humidity control. If the thermostat controller 912 senses a temperature below the set point, it modulates the valve as required for reheat. As soon as there is a signal indicating that the space is occupied, operation as described above is resumed.

Figure 45:
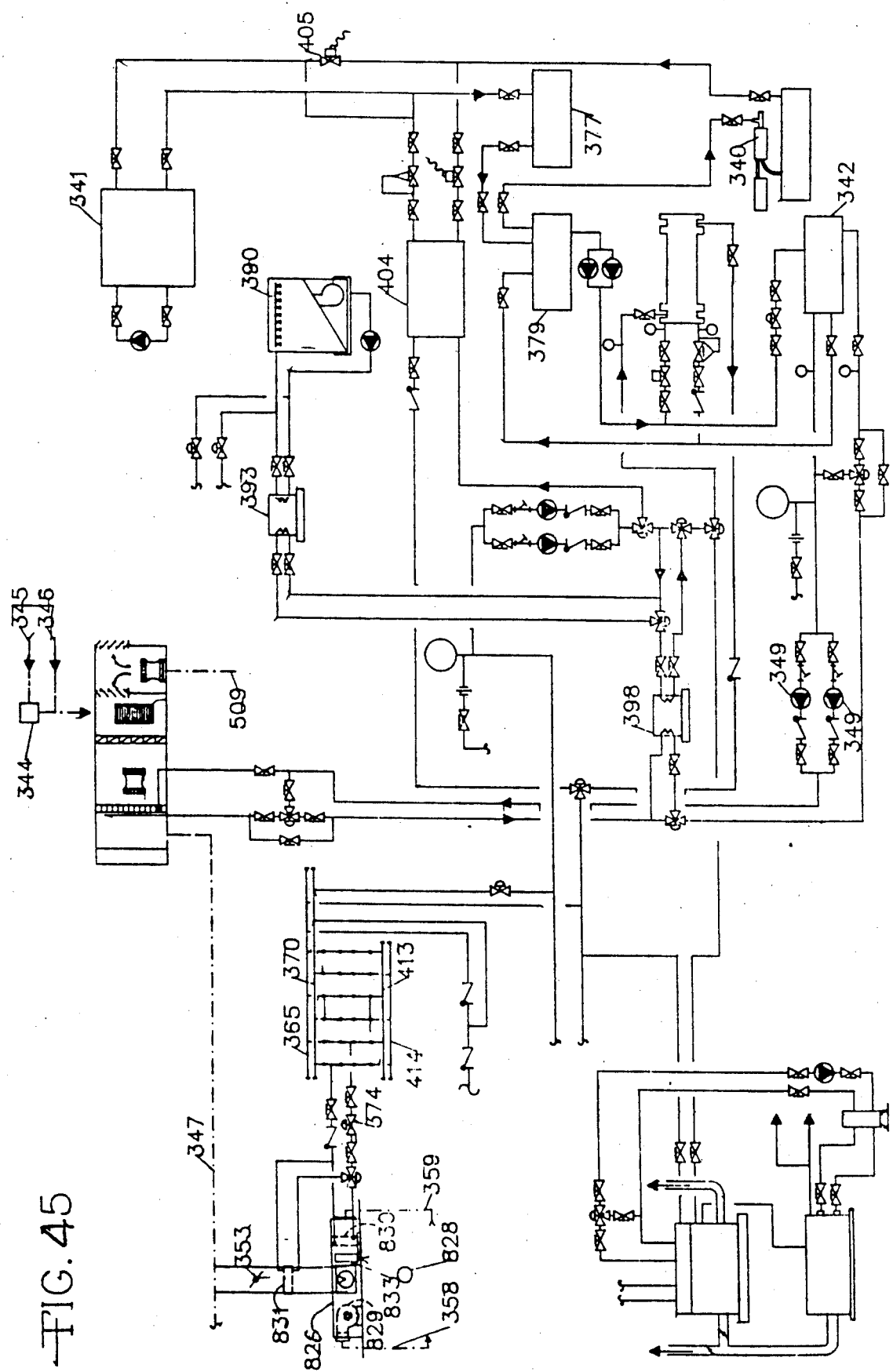
FIG. 45 is a schmetic diagram showing apparatus similar to that of FIG. 35 differing in that a humdistat which measures the moisture content of the return air has been omitted and thermostat/humidistat-controllers associated with each of several induction mixing boxes have been added.

Apparatus which is the same as that of FIG. 35 except that the humidistat 508 and the controller 510 have been omitted and the thermostat controller 828 has been replaced by a humidistat/thermostat controller 913 is shown in FIG. 45. Each of the humidistat/thermostat controllers 913 controls the associated damper 353 as previously discussed to maintain the humidity of the space it serves within control limits, controls the coil 833 as required to maintain temperature when the amount of conditioned air required for humidity control is too little to overcome heat gains, and controls the coil 831 as required to maintain temperature when the amount of conditioned required for humidity control more than overcomes heat gains. Because the apparatus of FIG. 45 has no humidistat measuring the overall or average humidity of the building in which the mixing boxes 826 are situated, the option of using a single humidity reading to control the apparatus is not available.

Which apparatus is optimum for any given installation depends upon such factors as the local climate, including both temperatures and humidities and the local rate structures for electricity, gas and fuel oil, including not only cost per unit of energy, but also demand charges and incentives. In general, it is necessary to provide conditioned air at a sufficiently low humidity that only a small quantity thereof is required for humidity control, to deliver only a small quantity of the low humidity conditioned air, and to circulate a heat transfer fluid, preferably, in most cases, through at least a part of a sprinkler system, for on site use, i.e., in or adjacent a space being conditioned, rather than in an equipment room, to remove sensible heat. It is usually important to vary the rate at which the low humidity air is delivered so that humidity control is achieved, but over dehumidification is avoided. The low humidity conditioned air can be made by chemical dehumidification, using ice that was produced on night cycle, or using a low temperature coil from which heat is transferred directly to the refrigerant of a refrigeration unit. Similarly, the heat can be removed from water that is circulated to carry the sensible heat load by absorption refrigeration apparatus, by compression refrigeration, or with ice. When cogeneration is used, it is important to waste neither the shaft work nor the heat; the heat can be used on winter cycle for heating and on summer cycle either to regenerate a desiccant or as an energy source for absorption refrigeration apparatus, while the shaft work can be used, summer and winter, either to generate electricity or to drive compressors, pumps, blowers and the like.

Most of the apparatus that is shown in the attached drawings transfers heat to evaporatively cooled water. This is advantageous over transferring heat to water that has been chilled by refrigeration, because there are substantial savings in energy. However, ground water, for example from wells, when it is available, may also be at least equally advantageous, particularly in climates where high humidity limits the use of evaporative cooling. When used, ground water should usually be circulated through a heat exchanger and returned to the ground. A suitably treated heat transfer fluid can then be chilled by heat exchange with the ground water and used in place of the evaporatively cooled water that has been described above. For example, the apparatus of FIG. 27 can be modified by elimination of the dehumidifier 572 and of the cooling tower 580, and by connecting ground water to the heat exchanger 620 and to the lines 688 and 689.

It is important that air conditioning apparatus introduce sufficient fresh or ventilation air into a building to prevent the accumulation of excessive concentrations of such inert gases as radon. Apparatus for determining the concentrations of such inert gases and for controlling ventilation air to keep their concentrations within safe limits is not presently available; occupants are not capable of detecting dangerously high concentrations of these gases. As a consequence, there is presently no mechanism for monitoring a variable to determine whether or not ventilation is adequate in a building. The apparatus of the instant invention makes the occupants of a building sensors to detect the inadequacy of ventilation; this occurs because the primary, conditioned air is relied upon to control humidity, and is circulated at a rate which is at least adequate for ventilation and at a sufficiently low moisture content that it also provides humidity control. If the apparatus is properly designed, and if it provides humidity control, it also provides adequate ventilation; if the apparatus fails to provide humidity control, ventilation may be inadequate, but the problem will be solved to quiet the complaints of the occupants.

The apparatus of FIG. 29 is admirably suited for a building which is equipped with lighting fixtures that are disclosed in U.S. Pat. No. 3,828,180. These fixtures are water-cooled, and also have dampers which snap open when the fixture temperature exceeds a set point, for example, because the water flow has been stopped. When the dampers are open, air can flow through the fixtures either into the plenum above the ceilings 737 and from thence into the induction mixing boxes 724, or directly into the recirculated air inlets of the boxes 724. It is thus possible to use heat from the lights when needed or to reject that heat when that is desirable.

By way of example, the lighting fixtures of said U.S. Pat. No. 3,828,180 can be zoned so that those which serve interior portions of the building constitute one zone and there is an additional zone corresponding with each of the induction mixing boxes 724. Since there is always a heat gain in interior portions of a building, winter and summer, it is preferable that the lighting fixtures which serve the interior portions of the building receive chilled water from the sprinkler system whenever the air conditioning apparatus is operating; accordingly, there is usually no need to provide valves to control the flow of chilled water through these fixtures. Any given perimeter zone, however, may have greater or lesser heat gains or losses than other perimeter zones, or may have heat losses when other perimeter zones have heat gains. Therefore, it is desirable that there be individual control of the flow of heat transfer fluid to the lights to the perimeter zone served by each of the induction boxes 724. On summer cycle, the flow of cold, dehumidified air to each induction mixing box 724 is then controlled to maintain a desired humidity, and heat is pumped or transferred to the heat transfer fluid to cool the recirculated air if further sensible cooling is required; the heat transfer fluid is circulated to the lights that serve all of the zones where the induction mixing boxes 724 are operating in this way. However, when the minimum flow of dehumidified air required for ventilation or for humidity control causes too low a temperature in any zone, the flow of heat transfer fluid to the lights serving that zone can be stopped so that lighting heat will cause the dampers in the fixtures to open and air heated by the lights will flow into the plenum and into the induction mixing boxes 724. So long as lighting heat is capable of causing sufficient reheat, the flow of heat transfer fluid can be modulated to maintain the desired temperature. Heat is pumped from the circulated heat transfer fluid only if lighting heat is incapable of maintaining the desired temperature.

The FIG. 29 apparatus with the lighting fixtures of said U.S. Pat. No. 3,828,180 can operate in the same manner on winter cycle; whenever lighting intensity is comparatively high, heat from the lights supplemented by the heat pumps in the induction mixing boxes 724 will provide all of the heat required when the building is occupied and heat from the heat recovery unit 404 supplemented by the heat pumps will provide all of the heat that is required when the building is not occupied.

The apparatus of FIG. 29 can also be modified to accomodate a space that sometimes requires a several fold increase in the rate at which conditioned air is supplied; a laboratory, for example, has such a requirement whenever an exhaust hood is operated. For example, the requirement of a laboratory for conditioned air may jump from 0.2 cfm per square foot of floor space to 1.0 cfm when the exhaust fan in its hood is energized. The apparatus of FIG. 29 can satisfy this requirement when a velocity sensor is added to the conditioned air inlet and, whenever the exhaust fan in the hood is energized, the flow of conditioned air to the induction box 724 is controlled to maintain the required velocity, for example, that which corresponds to a flow of 1.0 cfm per square foot of floor space. Heat can be pumped to or from recirculated air as previously described, or heat can be transferred to recirculated air from an electric heater or transferred from recirculated air to a heat transfer fluid, as required to maintain the temperature desired in the space.

It will be appreciated that various changes and modifications can be made from the specific details of the invention as shown in the attached drawings and described with reference thereto without departing from the spirit and scope thereof as defined in the appended claims.

For example, lithium chloride solutions have been described as aqueous desiccants, but other solutions are also operable, including other lithium halides, calcium chloride, and even glycol solutions. In one aspect, the invention involves the use of air conditioning apparatus to perform one function on day cycle and a different function on night cycle, one function during winter operation and a different function during summer operation, and minimizing the size of equipment required by storing what is made during one mode of operation for use at a different time in a different mode of operation. For example, on summer operation, ice is produced on night cycle is used on day cycle to minimize energy requirements and to enable a given air conditioning job to be performed with smaller equipment than would otherwise be required. Similarly, on winter-night cycle, heat is stored and ice is made; both are used on day cycle.

The apparatus of FIG. 31 can be modified by adding a heat engine (not illustrated) to drive the compressor 340, and heat from the engine can be supplied to energize the absorption apparatus which includes the evaporator 775 or to heat the water which flows through the lines 777 and 778. Similarly, heat from the cogenerator 387 can be supplied to energize the absorption apparatus which includes the evaporator 775 or to heat the water which flows through the lines 777 and 778. Also, the refrigeration apparatus which includes the compressor 340 can be replaced by a centrifugal package chiller Which circulates a glycol, e.g., 30 to 50 percent by weight ethylene glycol.

It will be appreciated that apparatus which includes a reheat coil, e.g., the reheat coil 831 of FIG. 35, or a coil to which heat is pumped for reheat, e.g., the coil 728 of the induction mixing box 724 of FIG. 29 and a cooling coil should be operated so that the cooling coil and the reheat coil do not operate at the same time as they would be, in essence, opposing one another. When cooling is required, reheat is not, and vice versa.

The apparatus of FIG. 28 can be modified by using a heat pipe to transfer heat from air cooled by heat exchange with the coil 701 to incoming air. For example, the condensing section of a heat pipe can be substituted for the coil 703 and the evaporating section of the heat pipe can be substituted for the coil 700; a pump in a liquid return line would then pump condensate from the condensing section to the evaporating section, and a valve in a vapor pipe would control the operation of the heat pipe.

For purposes of illustration, some of the reheat coils, for example the coil 831 in FIG. 35, some of the dampers, for example the damper 793 in FIG. 33, and the condensing sections of some of the heat pipes, for example, the condensing section 846 in FIG. 37, appear to be in ducts which serve associated induction mixing boxes. Ordinarily, the dampers, reheat coils and condensing sections would all be a part of the induction boxes they serve, although it would also be possible for them to be contained in associated ducts.

The various cogenerators to which reference is made herein can be diesel engines, Otto cycle, or gas turbine (Brayton cycle) engines. A Stirling engine can also be used, with its shaft coupled directly to an electric generator or to a second Stirling engine, which then acts as a heat pump.

I claim:

1. Apparatus for air conditioning a plurality of spaces, said apparatus comprising a plurality of air outlets, means for dehumidifying outside air or a mixture of outside air and return air, cooling means including a plurality of coils and means for transferring heat from each of said coils to a heat sink, each of said coils being operable to serve one of the spaces by lowering the temperature thereof when heat is transferred therefrom to the heat sink, means for circulating dehumidified air to said air outlets, at a rate per unit of area in the spaces served by said air outlets which varies between a predetermined minimum rate greater than zero and a maximum rate, the maximum rate being substantially less than that which would be required to maintain the design temperature in each of the spaces at the maximum design cooling load with air at a dry bulb temperature of 55° F., means operable to control its moisture content and temperature so that the dehumidified air is incapable, at the rate at which it is required for humidity control, of maintaining the desired space temperature at the maximum design cooling load, a sensor for measuring the absolute or relative humidity of at least one of the spaces served by said air outlets, means responsive to said sensor, and operable to control the rate at which dehumidified air is delivered by each of said air outlets to the space it serves to one not less than the predetermined minimum rate and higher than that minimum when required to maintain the moisture content of the space served within control limits, and means operable to control the rate at which dehumidified air is delivered to said air outlets so that dehumidified air is available at the rate required from time to time by said air outlets.

2. Apparatus as claimed in claim 1 which includes compression refrigeration apparatus having a compressor, said refrigeration apparatus being operable
    (a) when the compressor thereof is connected in a first manner, to make ice by pumping heat from water to a heat sink and to store such ice, and
    (b) when the compressor thereof is connected in a second manner, to chill water by pumping heat from water to a heat sink,
a heat engine operable to generate shaft work and heat, means for operably connecting said heat engine in driving relationship with the compressor of said compression refrigeration apparatus, an electric motor, means for connecting said electric motor to a source for electricity, means for operably connecting said electric motor in driving relationship with the compressor of said compression refrigeration apparatus, wherein said means for dehumidifying air comprises an air handler, and means for transferring heat from air in said air handler to ice which has been produced by said compression refrigeration apparatus, and which additionally includes means for circulating chilled water produced by said compression refrigeration apparatus
    (c) to a coil in said air handler which is positioned for heat transfer thereto from air being conditioned in said air handler before heat is transferred from the air to ice or (d) to each of said coils of said cooling means, and means for connecting the compressor of said compression refrigeration apparatus alternately in the first manner and in the second manner.

3. Apparatus as claimed in claim 2 wherein said heat engine is operably connected in driving relationship with an electric generator which is operably connected to energize said electric motor.

4. Apparatus as claimed in claim 3 which additionally includes means for operably connecting said electric motor for energization by electricity from a utility.

5. Apparatus as claimed in claim 1 wherein said means for dehumidifying air comprises an air handler having two coils positioned for heat transfer with air which flows through said air handler, compression refrigeration apparatus including a compressor, said apparatus being operable (a) when the compressor thereof is connected in a first manner, to make ice by pumping heat from water to a heat sink and to store such ice, and (b) when the compressor thereof is connected in a second manner, to cool a first one of the two coils of said air handler by pumping heat therefrom to a heat sink, means for transferring heat from the second one of the two coils of said air handler to ice made and stored by said refrigeration apparatus with the compressor thereof connected in the first manner, and means for causing air to be conditioned to flow through said air handler in heat transfer relationship with the two coils therein, and then to discharge conditioned air from said air handler.

6. An air conditioning system comprising apparatus as claimed in claim 5, wherein said means for transferring heat from each of said coils to a heat sink is operable to transfer heat to ice made and stored by said refrigeration apparatus with the compressor thereof connected in the first manner, or to cause said refrigeration apparatus, with the compressor thereof connected in the second manner, to pump heat to a heat sink.

7. Air conditioning apparatus comprising means for dehumidifying air, said last named means including a dehumidifier which employs a desiccant, a precooling coil, a postcooling coil, means for transferring heat from said precooling and postcooling coils, and means for causing air to be dehumidified to flow in heat exchange relationship with said precooling coil, in dehumidifying relationship with said dehumidifier, and then in heat exchange relationship with said postcooling coil, an air outlet which includes means operable to cause a flow of recirculated air from the space, and, when dehumidified air is delivered thereto, to deliver to the space it serves a mixture of dehumidified air and recirculated air, means for circulating dehumidified air from said postcooling coil to said air outlet, means operable to control its moisture content and temperature so that the dehumidified air is incapable, at the rate at which it is required for humidity control, of maintaining the desired space temperature at the maximum design cooling load, a sensor for measuring the absolute or relative humidity of the space served by said air outlet, means responsive to said sensor, and operable to control the rate at which dehumidified air is delivered by said air outlet to the space to maintain the moisture content of the space within control limits, and means operable to control the rate at which dehumidified air is delivered to said air outlet so that dehumidified air is available at the rate required from time to time by said air outlet.

8. Apparatus as claimed in claim 7 wherein said means for transferring heat from said precooling and postcooling coils comprises compression refrigeration apparatus, and which additionally includes a combustion engine, means operatively connecting said combustion engine in driving relationship with the compressor of said compression refrigeration apparatus, and means for transferring heat from said combustion engine to desiccant of said dehumidifier to enable regeneration thereof.

9. Apparatus as claimed in claim 8 wherein said combustion engine is a gas turbine.

10. Apparatus as claimed in claim 8 wherein said combustion engine is a diesel.

11. Apparatus as claimed in claim 7 wherein said means for transferring heat from said precooling and postcooling coils comprises compression refrigeration apparatus having a compressor driven by an electric motor, and which additionally includes a combustion engine operatively connected in driving relationship with an electric generator, and means operatively connecting said generator to introduce electricity into an electric grid which serves the building.

12. Apparatus as claimed in claim 7 wherein said air outlet is an induction mixing box and which additionally includes cooling means comprising a coil positioned for heat transfer with air recirculated by said induction mixing box, with dehumidified air delivered to said induction mixing box, or with the mixture of the two, and means for transferring heat from said coil.

13. Apparatus as claimed in claim 12 which includes a plurality of said induction mixing boxes, each serving one of a plurality of spaces, and which additionally includes a control for each of said coils, said control being effective in a first position and ineffective in a second position to prevent the transfer of heat from the associated one of said coils.

14. Apparatus as claimed in claim 13 wherein each of said controls is responsive to a signal from a sensor which indicates occupancy of the space and assumes the second position in response to such a signal indicating that the space served by the associated one of said coils is occupied.

15. Apparatus as claimed in claim 7 wherein said air outlet is an induction mixing box and which additionally includes cooling means which comprises a coil positioned for heat transfer with air recirculated by said induction mixing box, with dehumidified air delivered to said induction mixing box, or with the mixture of the two, and a heat pump operable to pump heat to or from said coil.

16. Apparatus as claimed in claim 7 which includes a plurality of said air outlets, each of which is a fan powered induction mixing box, each serving one of a plurality of spaces, and which additionally includes cooling means and a control for the fan of each of said mixing boxes, said cooling means comprising a coil positioned for heat transfer with air recirculated by each of said induction mixing boxes, with dehumidified air delivered to each of said induction mixing boxes, or with the mixture of the two, and means for transferring heat from each of said coils, each of said controls being effective in a first position and ineffective in a second position to prevent the operation of the fan of the associated one of said mixing boxes.

17. Apparatus as claimed in claim 16 wherein each of said controls is responsive to a signal from a sensor which indicates occupancy of the space and assumes the second position in response to such a signal indicating that the space served by the associated one of said mixing boxes is occupied.

18. Air conditioning apparatus comprising means for dehumidifying air, said last-named means including a dehumidifier which employs a desiccant, a precooling coil, a postcooling coil, and a washer, means for transferring heat from said precooling and postcooling coils, and means for causing air to be dehumidified to flow in heat exchange relationship with said precooling coil, in dehumidifying relationship with said dehumidifier, in heat exchange relationship with said postcooling coil, and then through said washer, a plurality of air outlets each of which includes means operable to cause a flow of recirculated air from the space, and, when dehumidified air is delivered thereto, to deliver to the space it serves a mixture of dehumidified air and recirculated air, an induction unit operable to cause a flow of recirculated air from the space and to return that air to the space, cooling means for transferring heat from air recirculated by said induction unit, means for circulating dehumidified air discharged from said washer to said air outlets, means operable to control its moisture content and temperature so that the dehumidified air is incapable, at the rate at which it is required for humidity control, of maintaining the desired space temperature at the maximum design cooling load, a sensor for measuring the absolute or relative humidity of the space served by said air outlets, means responsive to said sensor, and operable to control the rate at which dehumidified air is delivered by each of said air outlets to the space it serves to maintain the moisture content of the space served within control limits, and means operable to control the rate at which dehumidified air is delivered to said air outlets so that dehumidified air is available at the rate required from time to time by each of said air outlets.

19. Apparatus as claimed in claim 18 wherein said means for transferring heat from said precooling and postcooling coils comprises compression refrigeration apparatus, and which additionally includes a combustion engine, means operatively connecting said combustion engine in driving relationship with the compressor of said compression refrigeration apparatus, and means for transferring heat from said combustion engine to desiccant of said dehumidifier to enable regeneration thereof.

20. Apparatus as claimed in claim 19 wherein said combustion engine is a gas turbine.

21. Apparatus as claimed in claim 19 wherein said combustion engine is a diesel.

22. Apparatus as claimed in claim 19 wherein said combustion engine is a stirling engine.

23. Apparatus as claimed in claim 18 wherein said means for transferring heat from said precooling and postcooling coils comprises compression refrigeration apparatus having a compressor driven by an electric motor, and which additionally includes a combustion engine operatively connected in driving relationship with an electric generator, and means operatively connecting said generator to introduce electricity into an electric grid which serves the building.

24. Apparatus for air conditioning a space, said apparatus comprising means for dehumidifying air, an air outlet which includes means operable to cause a flow of recirculated air from the space, and, when dehumidified air is delivered thereto, to deliver to the space it serves a mixture of dehumidified air and recirculated air, cooling means including a coil and means for transferring heat from said coil to a heat sink, said coil being operable to lower the temperature of the space it serves when heat is transferred therefrom to the heat sink, means for circulating dehumidified air to said air outlet, means operable to control its moisture content and temperature so that the dehumidified air is incapable, at the rate at which it is required for humidity control, of maintaining the desired space temperature at the maximum design cooling load, a sensor for measuring the absolute or relative humidity of the air said air outlet is operable to cause to circulate, means responsive to said sensor, and operable to prevent said cooling means from transferring heat to the heat sink except in response to a signal which indicates a dew point below a given temperature, and means operable to control the rate at which dehumidified air is delivered to said air outlet so that dehumidified air is available at the rate required from time to time by said air outlet.

25. Apparatus as claimed in claim 4 wherein said cooling means comprises a coil positioned for heat transfer with air recirculated by said air outlet, with dehumidified air delivered to said air outlet, or with the mixture of the two, and which additionally includes second cooling means for transferring heat from a heat transfer fluid circulated in heat exchange relationship therewith, and a circulating system operatively associated with said coil and with said second cooling means for circulating a heat transfer fluid to and from said coil, and to and from said second cooling means, said second cooling means being operable to cool the heat transfer fluid to a temperature below the dry bulb temperature but above the dew point the apparatus is designed to maintain in the space.

26. Apparatus as claimed in claim 24 wherein said cooling means comprises a coil positioned for heat transfer with air recirculated by said air outlet, with dehumidified air delivered to said air outlet, or with the mixture of the two, and which additionally includes means for pumping heat from said coil to a heat sink.

27. Apparatus as claimed in claim 26 wherein said means for pumping heat from said coil to a heat sink is also operable to pump heat to said coil from a heat sink.

28. Air conditioning apparatus as claimed in claim 24 which additionally includes means for heating air recirculated by said air outlet, dehumidified air delivered to said air outlet, or the mixture of the two before the mixture is delivered to the space by said air outlet.

29. Apparatus as claimed in claim 28 wherein said means for heating air comprises a coil positioned for heat transfer with air recirculated by said air outlet, with dehumidified air delivered to said air outlet, or with the mixture of the two, and which additionally includes heating means for transferring heat to a heat transfer fluid circulated in heat exchange relationship therewith, and a circulating system operatively associated with said coil and with said heating means for circulating a heat transfer fluid to and from said coil, and to and from said heating means.

30. Apparatus as claimed in claim 28 wherein said means for heating air comprises a coil positioned for heat transfer with air recirculated by said air outlet, with dehumidified air delivered to said air outlet, or with the mixture of the two, and which additionally includes means for pumping heat to said coil from a heat sink.

31. Apparatus as claimed in claim 24 wherein said means for dehumidifying air comprises a coil, means for causing air to be dehumidified to flow in heat exchange relationship with said coil, and means for transferring heat from said coil to dehumidify the air flowing in heat exchange relationship with said coil.

32. Apparatus as claimed in claim 31 wherein said means for transferring heat from said coil comprises means for circulating a liquid having a low freezing temperature through said coil to remove heat from and to dehumidify the air flowing in heat exchange relationship with said coil.

33. Apparatus as claimed in claim 32 which additionally includes means operable to cause a liquid which is miscible with water and forms therewith a liquid having a low freezing point to flow over said coil to prevent the accumulation of frost thereon.

34. Apparatus as claimed in claim 31 wherein said means for transferring heat from said coil comprises directexpansion compression refrigeration apparatus operatively connected to transfer heat from said coil to refrigerant of said refrigeration apparatus to cool and dehumidify the air which flows in heat exchange relationship with said coil.

35. Apparatus as claimed in claim 24 wherein said means for dehumidifying air includes a dehumidifier which employs a desiccant, and means for causing air to be dehumidified to flow in dehumidifying relationship with said dehumidifier.

36. Apparatus as claimed in claim 24 which additionally includes means for withdrawing air from the space and venting a part of the withdrawn air, wherein said sensor is operable to sense the humidity of the withdrawn air, and wherein said means responsive to said sensor is operable to increase or decrease the rate at which dehumidified air is delivered to each of said air outlets as required to maintain the withdrawn air at a predetermined humidity.

37. Apparatus as claimed in claim 26 which additionally includes means for withdrawing air from the space and venting a part of the withdrawn air, and means including a humidistat operable to sense the humidity of the withdrawn air and to increase or decrease the rate at which dehumidified air is delivered to said air outlet as required to maintain the withdrawn air at a predetermined humidity.

38. Apparatus as claimed in claim 24 which includes a plurality of said air outlets, and wherein a single one of said sensors is operable to measure the humidity of the air several of said air outlets are operable to cause to recirculate.

39. Apparatus as claimed in claim 24 which includes a plurality of said air outlets, and wherein a single one of said sensors is operable to measure the humidity of return air from spaces in which several of said air outlets are operable to cause air to recirculate.

40. Apparatus as claimed in claim 24 which includes a plurality of air outlets and a plurality of sensors for measuring the absolute or relative humidity of the air said air outlets are operable to cause to recirculate, and wherein each of said sensors is operable to measure the humidity of a space served by a single air outlet.

41. Apparatus as claimed in claim 24 wherein said air outlet is an induction mixing box and wherein said cooling means comprises a coil positioned for heat transfer with air recirculated by said induction mixing box, with dehumidified air delivered to said induction mixing box, or with the mixture of the two.

42. Apparatus as claimed in claim 24 which additionally includes an induction unit operable to cause a flow of recirculated air from the space and to return that air to the space.

43. Apparatus as claimed in claim 42 wherein said induction unit is operably connected to receive dehumidified air from said means for dehumidifying air, and is operable, when dehumidified air is delivered thereto, to deliver to the space it serves a mixture of dehumidified air and recirculated air.

44. Apparatus as claimed in claim 43 wherein said cooling means comprises a coil positioned for heat transfer with air recirculated by said induction unit, with dehumidified air delivered to said induction unit, or with the mixture of the two.

45. Apparatus as claimed in claim 24 wherein said air outlet is an induction mixing box operable to cause a flow of recirculated air from the space it serves, and, when dehumidified air is delivered thereto, to deliver to the space it serves a mixture of dehumidified air and recirculated air, and means for circulating dehumidified air to said induction mixing box, and wherein said cooling means comprises a coil positioned for heat transfer with air recirculated by each of said induction mixing box, with dehumidified air delivered to to said induction mixing box, or with the mixture of the two.

46. Apparatus as claimed in claim 24 wherein said air outlet is an induction box that is operably connected to deliver a mixture of dehumidified air and recirculated air to each of a plurality of mixing boxes, wherein each of said mixing boxes is operably connected to deliver the mixture of dehumidified air and recirculated air to a space to be conditioned, and wherein each of said mixing boxes includes means for varying the rate at which it delivers the mixture of dehumidified air and recirculated to the space it serves.

47. Apparatus as claimed in claim 24 wherein said air outlet is an induction box that is operably connected to deliver a mixture of dehumidified air and recirculated air to each of a plurality of mixing boxes, wherein each of said mixing boxes is operably connected to receive dehumidified air and to deliver to the space it serves a mixture of the dehumidified air with the mixture of dehumidified air and recirculated air, and wherein each of said mixing boxes includes means for varying the rates at which it receives (1) the dehumidified air and (2) the mixture of dehumidified air and recirculated air.

48. Apparatus as claimed in claim 47 wherein each of said last-named means is responsive to the temperature of the space served by the associated one of said mixing boxes, and is operable to modulate the rate at which dehumidified air is received by the associated one of said mixing boxes to maintain such temperature within control limits.

49. Apparatus as claimed in claim 24 wherein said air outlet is an induction mixing box and wherein said cooling means comprises a coil positioned for heat transfer with air recirculated by said induction mixing box, with dehumidified air delivered to said induction mixing box, or with the mixture of the two, and means for transferring heat from said coil.

50. Apparatus as claimed in claim 49 which includes a plurality of said induction mixing boxes, each serving one of a plurality of spaces, and which additionally includes a control for each of said coils, said control being effective in a first position and ineffective in a second position to prevent the transfer of heat from the associated one of said coils.

51. Apparatus as claimed in claim 50 wherein each of said controls is responsive to a signal from a sensor which indicates occupancy of the space and assumes the second position in response to such a signal indicating that the space served by the associated one of said coils is occupied.

52. Apparatus as claimed in claim 24 which includes a plurality of said air outlets, each of which is a fan powered induction mixing box, each serving one of a plurality of spaces, and wherein said cooling means comprises a coil positioned for heat transfer with air recirculated by each of said induction mixing boxes, with dehumidified air delivered to each of said induction mixing boxes, or with the mixture of the two, and means for transferring heat from each of said coils, and which additionally includes a control for the fan of each of said mixing boxes, said control being effective in a first position and ineffective in a second position to prevent the operation of the fan of the associated one of said mixing boxes.

53. Apparatus as claimed in claim 52 wherein each of said controls is responsive to a signal from a sensor which indicates occupancy of the space and assumes the second position in response to such a signal indicating that the space served by the associated one of said mixing boxes is occupied.

54. An air outlet comprising an inlet for dehumidified air, means for delivering dehumidified air supplied to said inlet to a space to be conditioned, and means operable to cause a flow of recirculated air from the space, and, when dehumidified air is delivered thereto, to deliver to the space a mixture of dehumidified air and recirculated air, cooling means for transferring heat from air recirculated by said air outlet, dehumidified air delivered to said air outlet, or the mixture of the two before the mixture is delivered to the space by said air outlet, a sensor for measuring the absolute or relative humidity of the space served by said air outlet, and means responsive to said sensor, and operable to prevent said cooling means from transferring heat from air recirculated by said air outlet, dehumidified air delivered to said air outlet, or the mixture of the two before the mixture is delivered to the space, except in response to a signal which indicates a dew point below a given temperature.

55. Air conditioning apparatus comprising an induction mixing box to serve each of a plurality of spaces to be air conditioned, each of said induction mixing boxes having an outlet and a conditioned air inlet and being operable to deliver air through said outlet to condition the space it serves and to cause air introduced into said conditioned air inlet to flow through said outlet to the space, each of said induction mixing boxes also having a heat transfer device and a fan operable to induce air to flow from the space in heat exchange relationship with said heat transfer device and then through the outlet to the space, said apparatus also comprising means for dehumidifying air, means operable to control its moisture content and temperature so that the dehumidified air is incapable, at the rate at which it is required for humidity control, of maintaining the desired space temperature at the mixture design cooling load, means for delivering dehumidified air to the conditioned air inlet of each of said induction mixing boxes, and means including a humidistat operable to prevent the transfer of heat to said heat transfer device except in response to a signal which indicates a dew point below a given temperature.

56. Apparatus as claimed in claim 55 which additionally includes means for withdrawing air from each of the spaces and venting a part of the withdrawn air, and wherein said means including a humidistat is operable to sense the humidity of the withdrawn air and to prevent the transfer of heat to said heat transfer device except in response to a signal from said humidistat which indicates the withdrawn air has a dew point below a given temperature.

57. Apparatus as claimed in claim 55 wherein said heat transfer devices are coils, wherein said apparatus includes means for chilling water and a system for circulating the chilled water to said coils, and which additionally includes a control for said circulating system, said control being effective in a first position and ineffective in a second position to prevent the circulation of chilled water to said coils.

58. Apparatus as claimed in claim 57 wherein said control is responsive to a signal from said humidistat and assumes the second position in response to such a signal indicating that the sensed humidity is below a predetermined level.

59. Apparatus as claimed in claim 58 which additionally includes means for withdrawing air from each of the spaces and venting a part of the withdrawn air, and wherein said means including a humidistat is operable (1) to sense the humidity of the withdrawn air and to prevent the circulation of chilled water to said coils except in response to a signal which indicates the withdrawn air has a dew point below a predetermined temperature.

60. Apparatus as claimed in claim 55 which additionally includes a control for said fans, said control being effective in a first position and ineffective in a second position to prevent the operation of said fans.

61. Apparatus as claimed in claim 60 wherein said control is responsive to a signal from a humidistat and assumes the second position in response to such a signal indicating that the sensed humidity is below a predetermined level.

62. Apparatus as claimed in claim 61 which additionally includes means for withdrawing air from each of the spaces and venting a part of the withdrawn air, and wherein said means including a humidistat is operable (1) to sense the humidity of the withdrawn air and to prevent the transfer of heat to said heat transfer device except when said humidistat senses a dew point below a given temperature, and (2) to transmit a signal from said humidistat to said control.

63. Apparatus as claimed in claim 55 wherein said heat transfer devices are coils, wherein said apparatus includes means for chilling water and a system for circulating the chilled water to said coils, and which additionally includes a control for said circulating system, said control being effective in a first position and ineffective in a second position to prevent the circulation of chilled water to said coils.

64. Apparatus as claimed in claim 63 wherein said control is responsive to a signal from a sensor and assumes the second position in response to such a signal indicating that the space served by the associated one of said coils is occupied.

65. Apparatus as claimed in claim 55 wherein said heat transfer devices are coils, wherein said apparatus includes means for chilling water and a system for circulating the chilled water to said coils, and which additionally includes a control for each of said induction mixing boxes, each of said controls being effective in a first position and ineffective in a second position to prevent the operation of the fan and the circulation of chilled water to the associated one of said coils.

66. Apparatus as claimed in claim 65 wherein each of said controls is responsive to a signal from a sensor which indicates occupancy of the space and assumes the second position in response to such a signal indicating that the space served by the associated one of said coils is occupied.

67. Apparatus as claimed in claim 55 which additionally includes a control for each of said fans, said control being effective in a first position and ineffective in a second position to prevent the operation of the associated one of said fans.

68. Apparatus as claimed in claim 67 wherein each of said controls is responsive to a signal from a sensor which indicates occupancy of the space and assumes the second position in response to such a signal indicating that the space served by the associated one of said fans is occupied.

69. Apparatus as claimed in claim 55 wherein each of said induction mixing boxes additionally includes nozzle means and is operable to cause dehumidified air which enters said conditioned air inlet to flow through said nozzle means and to induce a flow of air from the space into said induction mixing box, mixture of the induced air with the dehumidified air, and delivery of the mixture of induced air and dehumidified air to the space.

70. Apparatus for air conditioning a plurality of spaces, said apparatus comprising a plurality of air outlets, a first dehumidifier which comprises a rotatable, sectored wheel including a support impregnated with a desiccant, a second dehumidifier which employs a desiccant, means for causing outside air or a mixture of outside air and return air to be dehumidified to flow in dehumidifying relationship with said first and second dehumidifiers, cooling means including a plurality of coils and means for transferring heat from each of said coils to a heat sink, each of said coils being operable to serve one of the spaces by lowering the temperature thereof when heat is transferred therefrom to the heat sink, means for circulating dehumidified air from said second dehumidifier to said air outlets, at a rate per unit of area in the spaces served by said air outlets which varies between a predetermined minimum rate greater than zero and a maximum rate, the maximum rate being substantially less than that which would be required to maintain the design temperature in each of the spaces at the maximum design cooling load with air at a dry bulb temperature of 55° F., means operable to control its moisture content and temperature so that the dehumidified air is incapable, at the rate at which it is required for humidity control, of maintaining the desired space temperature at the maximum design cooling load, a sensor for measuring the absolute or relative humidity of at least one of the spaces served by said air outlets, means responsive to said sensor, and operable to control the rate at which dehumidified air is delivered by each of said air outlets to the space it serves to one not less than the predetermined minimum rate and higher than that minimum when required to maintain the moisture content of the space served within control limits, and means operable to control the rate at which dehumidified air is delivered to said air outlets so that dehumidified air is available at the rate required from time to time by each of said air outlets.

71. Apparatus as claimed in claim 70 wherein said first dehumidifier includes means for passing regenerating air through a given sector of said wheel and then from said first dehumidifier, and means for causing said wheel to rotate so that successive sectors thereof are presented repeatedly (a) for the passing therethrough of air to be dehumidified and (b) for the passing therethrough of regenerating air.

72. Apparatus as claimed in claim 71 wherein the regenerating air is relief air from the building served by the apparatus.

73. Apparatus as claimed in claim 70 wherein said air outlets are induction mixing boxes and wherein said cooling means comprises a coil positioned for heat transfer with air recirculated by each of said induction mixing boxes, with dehumidified air delivered to each of said induction mixing boxes, or with the mixture of the two, and means for transferring heat from said coils.

74. Apparatus as claimed in claim 73 which additionally includes a control for each of said coils, said control being effective in a first position and ineffective in a second position to prevent the transfer of heat from the associated one of said coils.

75. Apparatus as claimed in claim 74 wherein each of said controls is responsive to a signal from a sensor which indicates occupancy of the space and assumes the second position in response to such a signal indicating that the space served by the associated one of said coils is occupied.

76. Apparatus as claimed in claim 70 wherein said air outlets are fan powered induction mixing boxes and wherein said cooling means comprises a coil positioned for heat transfer with air recirculated by each of said induction mixing boxes, with dehumidified air delivered to each of said induction mixing boxes, or with the mixture of the two, and means for transferring heat from said coils.

77. Apparatus as claimed in claim 76 which additionally includes a control for the fan of each of said mixing boxes, said control being effective in a first position and ineffective in a second position to prevent the operation of the fan of the associated one of said mixing boxes.

78. Apparatus as claimed in claim 77 wherein each of said controls is responsive to a signal from a sensor which indicates occupancy of the space and assumes the second position in response to such a signal indicating that the space served by the fan of the associated one of said mixing boxes is occupied.

79. Apparatus for air conditioning a plurality of spaces, said apparatus comprising a plurality of air outlets, means for dehumidifying outside air or a mixture of outside air and return air, said last named means including a dehumidifier which employs a liquid desiccant, means for transferring heat from the liquid desiccant, and means for causing air to be dehumidified to flow in said dehumidifier in dehumidifying relationship with the liquid desiccant from which heat of sorption has been or is being transferred by said heat transferring means, cooling means including a plurality of coils and means for transferring heat from each of said coils to a heat sink, each of said coils being operable to serve one of the spaces by lowering the temperature thereof when heat is transferred therefrom to the heat sink, means for circulating dehumidified air from said dehumidifier to said air outlets, at a rate per unit of area in the spaces served by said air outlets which varies between a predetermined minimum rate greater than zero and a maximum rate, the maximum rate being substantially less than that which would be required to maintain the design temperature in each of the spaces at the maximum design cooling load with air at a dry bulb temperature of 55° F., means operable to control its moisture content and temperature so that the dehumidified air is incapable, at the rate at which it is required for humidity control, of maintaining the desired space temperature at the maximum design cooling load, a sensor for measuring the absolute or relative humidity of at least one of the spaces served by said air outlets, means responsive to said sensor, and operable to control the rate at which dehumidified air is delivered by each of said air outlets to the space it serves to one not less than the predetermined minimum rate and higher than that minimum when required to maintain the moisture content of the space served within control limits, and means operable to control the rate at which dehumidified air is delivered to said air outlets so that dehumidified air is available at the rate required from time to time by each of said air outlets.

80. Apparatus as claimed in claim 79 wherein said air outlets are induction mixing boxes and wherein said cooling means comprises a coil positioned for heat transfer with air recirculated by each of said induction mixing boxes, with dehumidified air delivered to each of said induction mixing boxes, or with the mixture of the two, and means for transferring heat from said coils.

81. Apparatus as claimed in claim 80 which additionally includes a control for each of said coils, said control being effective in a first position and ineffective in a second position to prevent the transfer of heat from the associated one of said coils.

82. Apparatus as claimed in claim 81 wherein each of said controls is responsive to a signal from a sensor which indicates occupancy of the space and assumes the second position in response to such a signal indicating that the space served by the associated one of said coils is occupied.

83. Apparatus as claimed in claim 79 wherein said air outlets are fan powered induction mixing boxes and wherein said cooling means comprises a coil positioned for heat transfer with air recirculated by each of said induction mixing boxes, with dehumidified air delivered to each of said induction mixing boxes, or with the mixture of the two, and means for transferring heat from said coils.

84. Apparatus as claimed in claim 83 which additionally includes a control for the fan of each of said mixing boxes, said control being effective in a first position and ineffective in a second position to prevent the operation of the fan of the associated one of said mixing boxes.

85. Apparatus as claimed in claim 84 wherein each of said controls is responsive to a signal from a sensor which indicates occupancy of the space and assumes the second position in response to such a signal indicating that the space served by the fan of the associated one of said mixing boxes is occupied.

86. Apparatus for air conditioning a plurality of spaces, said apparatus comprising a plurality of air outlets, a first dehumidifier which comprises a rotatable, sectored wheel including a support impregnated with a desiccant, a second dehumidifier which employs a desiccant, a washer, means for causing outside air or a mixture of outside air and return air to be dehumidified to flow in dehumidifying relationship with said first and second dehumidifiers, and then through said washer, cooling means including a plurality of coils and means for transferring heat from each of said coils to a heat sink, each of said coils being operable to serve one of the spaces by lowering the temperature thereof when heat is transferred therefrom to the heat sink, means for circulating dehumidified air discharged from said washer to said air outlets, at a rate per unit of area in the spaces served by said air outlets which varies between a predetermined minimum rate greater than zero and a maximum rate, the maximum rate being substantially less than that which would be required to maintain the design temperature in each of the spaces at the maximum design cooling load with air at a dry bulb temperature of 55° F., means operable to control its moisture content and temperature so that the dehumidified air is incapable, at the rate at which it is required for humidity control, of maintaining the desired space temperature at the maximum design cooling load, a sensor for measuring the absolute or relative humidity of at least one of the spaces served by said air outlets, means responsive to said sensor, and operable to control the rate at which dehumidified air is delivered by each of said air outlets to the space it serves to one not less than the predetermined minimum rate and higher than that minimum when required to maintain the moisture content of the space served within control limits, and means operable to control the rate at which dehumidified air is delivered to said air outlets so that dehumidified air is available at the rate required from time to time by each of said air outlets.

87. Apparatus as claimed in claim 86 wherein said first dehumidifier includes means for passing regenerating air through a given sector of said wheel and then from said first dehumidifier, and means for causing said wheel to rotate so that successive sectors thereof are presented repeatedly (a) for the passing therethrough of air to be dehumidified and (b) for the passing therethrough of regenerating air.

88. Apparatus as claimed in claim 87 wherein the regenerating air is relief air from the building served by the apparatus.

89. Apparatus for air conditioning a plurality of spaces, said apparatus comprising a plurality of air outlets, means for dehumidifying outside air or a mixture of outside air and return air, said last-named means including a dehumidifier which employs a liquid desiccant, means for transferring heat from the liquid desiccant, a washer, and means for causing air to be dehumidified to flow in said dehumidifier in dehumidifying relationship with the liquid desiccant from which heat of sorption has been or is being transferred by said heat transferring means, and then through said washer, cooling means including a plurality of coils and means for transferring heat from each of said coils to a heat sink, each of said coils being operable to serve one of the spaces by lowering the temperature thereof when heat is transferred therefrom to the heat sink, means for circulating dehumidified air discharged from said washer to said air outlets, at a rate per unit of area in the spaces served by said air outlets which varies between a predetermined minimum rate greater than zero and a maximum rate, the maximum rate being substantially less than that which would be required to maintain the design temperature in each of the spaces at the maximum design cooling load with air at a dry bulb temperature of 55° F., means operable to control its moisture content and temperature so that the dehumidified air is incapable, at the rate at which it is required for humidity control, of maintaining the desired space temperature at the maximum design cooling load, a sensor for measuring the absolute or relative humidity of at least one of the spaces served by said air outlets, means response to said sensor, and operable to control the rate at which dehumidified air is delivered by each of said air outlets to the space it serves to one not less than the predetermined minimum rate and higher than that minimum when required to maintain the moisture content of the space served within control limits, and means operable to control the rate at which dehumidified air is delivered to said air outlets so that dehumidified air is available at the rate required from time to time by each of said air outlets.

* * * * *